US012625463B2

(12) United States Patent
Murakami et al.

(10) Patent No.: US 12,625,463 B2
(45) Date of Patent: *May 12, 2026

(54) PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Ryuta Murakami, Suntou-gun (JP); Tadashi Horikawa, Numazu (JP); Shunsuke Uratani, Mishima (JP); Yuichiro Inaba, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,881

(22) Filed: May 13, 2024

(65) Prior Publication Data

US 2024/0295851 A1 Sep. 5, 2024

Related U.S. Application Data

(60) Division of application No. 18/212,783, filed on Jun. 22, 2023, now Pat. No. 12,019,392, which is a (Continued)

(30) Foreign Application Priority Data

Jun. 14, 2016 (JP) ................................ 2016-118181

(51) Int. Cl.

| | |
|---|---|
| ***G03G 21/18*** | (2006.01) |
| ***G03G 15/00*** | (2006.01) |
| ***G03G 21/16*** | (2006.01) |

(52) U.S. Cl.

CPC ......... *G03G 21/186* (2013.01); *G03G 15/757* (2013.01); *G03G 21/1647* (2013.01); (Continued)

(58) Field of Classification Search

CPC ............ G03G 21/186; G03G 21/1647; G03G 21/18; G03G 21/1864; G03G 15/757; G03G 2221/1657; G03G 2221/183

See application file for complete search history.

(56) References Cited

U.S. PATENT DOCUMENTS 4,975,743 A 12/1990 Surti
5,303,004 A 4/1994 Maruyama et al.
(Continued)

FOREIGN PATENT DOCUMENTS

AU 8081798 A 10/1998
CN 1184957 A 6/1998
(Continued)

OTHER PUBLICATIONS

Dec. 21, 2023 Office Action in Chinese Patent Application No. 202111358283.3 (with English translation).
(Continued)

*Primary Examiner* — Walter L Lindsay, Jr.
*Assistant Examiner* — Milton Gonzalez
(74) *Attorney, Agent, or Firm* — Venable LLP

(57) ABSTRACT

A process cartridge includes a frame having a side surface at a side of the process cartridge. A photosensitive drum is supported by the frame, the photosensitive drum being rotatable about an axis thereof, the photosensitive drum including a first end positioned at the side of the process cartridge and a second end opposite to the first end in a direction of the axis of the photosensitive drum. A projection is positioned coaxial with the photosensitive drum and at the side of the process cartridge, with the projection projecting from the side surface of the frame in the axial direction of the photosensitive drum with at least a tip of the projection being exposed to outside of the process cartridge. A gear is positioned at the side of the process cartridge, with the gear
(Continued)

being rotatable about an axis thereof, the gear having a plurality of teeth, with at least some of the teeth being exposed teeth that are uncovered by the frame and exposed to outside of the process cartridge, and with a tip of at least one of the exposed teeth facing the axis of the photosensitive drum.

17 Claims, 37 Drawing Sheets

Related U.S. Application Data division of application No. 18/113,174, filed on Feb. 23, 2023, now Pat. No. 11,803,153, which is a division of application No. 17/686,550, filed on Mar. 4, 2022, now Pat. No. 11,720,055, which is a division of application No. 17/331,758, filed on May 27, 2021, now Pat. No. 11,392,081, which is a division of application No. 16/219,207, filed on Dec. 13, 2018, now Pat. No. 11,169,483, which is a continuation of application No. PCT/JP2017/022763, filed on Jun. 14, 2017.

(52) U.S. Cl.
CPC ......... *G03G 21/18* (2013.01); *G03G 21/1864* (2013.01); *G03G 2221/1657* (2013.01); *G03G 2221/183* (2013.01)

(56) References Cited

U.S. PATENT DOCUMENTS 5,500,714 A 3/1996 Yashiro et al.
5,809,380 A 9/1998 Katakabe et al.
5,860,048 A 1/1999 Bonanno
5,903,803 A 5/1999 Kawai et al.
6,128,454 A 10/2000 Kawai et al.
6,169,866 B1 1/2001 Watanabe et al.
6,282,389 B1 8/2001 Matsuzaki et al.
6,289,189 B1 9/2001 Numagami et al.
6,301,457 B1 10/2001 Chadani et al.
6,324,363 B1 11/2001 Watanabe et al.
6,385,416 B1 5/2002 Horikawa et al.
6,553,189 B2 4/2003 Miyamoto et al.
6,681,088 B2 1/2004 Kanno et al.
6,735,405 B2 5/2004 Yokoi et al.
6,836,639 B2 12/2004 Karakama et al.
6,898,392 B2 5/2005 Karakama et al.
6,987,938 B2 1/2006 Murakami et al.
7,024,131 B2 4/2006 Komatsu et al.
7,099,607 B2 8/2006 Suzuki et al.
7,110,703 B2 9/2006 Uratani et al.
7,156,797 B2 1/2007 Komatsu et al.
7,206,534 B2 4/2007 Murakami
7,283,765 B2 10/2007 Uratani et al.
7,366,440 B2 4/2008 Horikawa
7,386,241 B2 6/2008 Mori et al.
7,415,227 B2 8/2008 Shimura et al.
7,457,570 B2 11/2008 Kasai et al.
7,822,364 B2 10/2010 Takigawa et al.
7,933,534 B2 4/2011 Hoshi et al.
8,208,830 B2 6/2012 Uratani et al.
8,249,485 B2 8/2012 Horikawa et al.
8,515,306 B2 8/2013 Kawai et al.
8,571,445 B2 10/2013 Komatsu et al.
8,620,181 B2 12/2013 Murakami
8,682,211 B2 3/2014 Hoshi et al.
8,755,713 B2 6/2014 Kawai et al.
8,879,954 B2 11/2014 Nonaka et al.
8,909,096 B2 12/2014 Fukui et al.
8,942,592 B2 1/2015 Uratani et al.
8,948,660 B2 2/2015 Baker et al.
9,052,638 B2 6/2015 Matsumaru et al.
9,069,289 B2 6/2015 Batori et al.
9,116,466 B2 8/2015 Makiguchi et al.
9,164,430 B2 10/2015 Murakami et al.
9,182,733 B2 11/2015 Horikawa et al.
9,188,906 B2 11/2015 Batori et al.
9,188,940 B2 11/2015 Fukui et al.
9,213,267 B2 12/2015 Hoshi et al.
9,229,371 B2 1/2016 Murakami et al.
9,322,458 B2 4/2016 Matsuda et al.
9,465,318 B2 10/2016 Takeuchi et al.
9,523,942 B2 12/2016 Takeuchi et al.
9,599,932 B2 3/2017 Takeuchi et al.
9,772,598 B2 9/2017 Komatsu et al.
9,778,613 B2 10/2017 Komatsu et al.
9,989,892 B2 6/2018 Takeuchi et al.
10,095,161 B2 10/2018 Takeuchi et al.
10,289,062 B2 5/2019 Kim et al.
2003/0142994 A1 7/2003 Harada et al.
2004/0037590 A1 2/2004 Morioka et al.
2005/0111882 A1 5/2005 Sudo et al.
2005/0163535 A1 7/2005 Okada et al.
2006/0029421 A1 2/2006 Ishii et al.
2006/0072936 A1 4/2006 Numagami et al.
2006/0104673 A1 5/2006 Sasae et al.
2007/0077100 A1 4/2007 Suzuki et al.
2007/0147883 A1 6/2007 Sato et al.
2007/0147895 A1 6/2007 Hayakawa
2008/0138114 A1 6/2008 Chadani et al.
2008/0138115 A1 6/2008 Chadani et al.
2008/0152388 A1 6/2008 Ueno et al.
2008/0181661 A1 7/2008 Mase et al.
2009/0169259 A1 7/2009 Ebara et al.
2009/0203494 A1 8/2009 Koizumi
2010/0034561 A1 2/2010 Batori et al.
2010/0054798 A1 3/2010 Sato
2011/0026971 A1 2/2011 Ino et al.
2013/0216265 A1 8/2013 Peng et al.
2013/0236209 A1 9/2013 Furuichi
2013/0287448 A1 10/2013 Baker et al.
2014/0270845 A1 9/2014 Kawalami et al.
2014/0270851 A1 9/2014 Matsuda et al.
2015/0093146 A1 4/2015 Sato et al.
2015/0220020 A1 8/2015 Hayashi et al.
2015/0277281 A1* 10/2015 Mushika ............ G03G 21/1896
399/119
2016/0246250 A1 8/2016 Kamoshida et al.
2017/0261926 A1 9/2017 Kashida et al.
2017/0277076 A1 9/2017 Itabashi et al.
2017/0293255 A1 10/2017 Uratani et al.
2017/0336754 A1* 11/2017 Itabashi ............. G03G 21/1676
2017/0371296 A1 12/2017 Kamoshida et al.
2018/0046130 A1 2/2018 Komatsu et al.
2019/0129356 A1 5/2019 Murakami et al.
2019/0179258 A1 6/2019 Kashiide et al.
2019/0243306 A1 8/2019 Inaba et al.

FOREIGN PATENT DOCUMENTS

CN 1431564 A 7/2003
CN 1648489 A 8/2005
CN 1758159 A 4/2006
CN 101627343 A 1/2010
CN 103309208 A 9/2013
CN 103885313 A 6/2014
CN 104541212 A 4/2015
CO 14235212 1/2015
CO 16088043 11/2016
EP 1 666 986 A2 6/2006
EP 2 574 989 A 3/2013
EP 3 470 931 A 4/2019
JP H08-328449 A 12/1996
JP H10-039715 2/1998
JP H10-104997 A 4/1998
JP H10-186851 A 7/1998
JP 2000-214646 A 8/2000
JP 2000-267374 A 9/2000
JP 2000-347487 A 12/2000
JP 2001-092333 A 4/2001

(56) References Cited

FOREIGN PATENT DOCUMENTS

| | | | |
|---|---|---|---|
| JP | 2002-328499 | A | 11/2002 |
| JP | 2005-114159 | A | 4/2005 |
| JP | 2005-221825 | | 4/2005 |
| JP | 2005-214233 | A | 8/2005 |
| JP | 2006-139070 | A | 6/2006 |
| JP | 2006-171632 | A | 6/2006 |
| JP | 2007-086665 | A | 4/2007 |
| JP | 2007-133438 | A | 5/2007 |
| JP | 2007-178606 | A | 7/2007 |
| JP | 2008-185827 | A | 8/2008 |
| JP | 2008-268685 | A | 11/2008 |
| JP | 2009-151201 | A | 7/2009 |
| JP | 2009-151207 | A | 7/2009 |
| JP | 2009-175667 | A | 8/2009 |
| JP | 2010-032917 | A | 2/2010 |
| JP | 2013-545134 | A | 12/2013 |
| JP | 2000-098809 | A | 4/2020 |
| KR | 100266421 | B1 | 9/2000 |
| KR | 2015-0018905 | A | 2/2015 |
| KR | 101536553 | B | 7/2015 |
| RU | 2 519 516 | C2 | 6/2014 |
| TW | 201337477 | A | 9/2013 |
| WO | 2008/078836 | A1 | 7/2008 |
| WO | 2016/084986 | A | 6/2016 |
| WO | 2017/217557 | A1 | 12/2017 |

OTHER PUBLICATIONS

Dec. 21, 2023 Office Action in Chinese Patent Application No. 202111360503.6 (with English translation).
Dec. 29, 2023 Office Action in Chinese Patent Application No. 202111351132.5 (with English translation).
Jan. 10, 2024 Office Action in Chinese Patent Application No. 202111351133.X (with English translation).
Jan. 3, 2024 Office Action in Chinese Patent Application No. 202111358285.2 (with English translation).
Jan. 10, 2024 Office Action in Chinese Patent Application No. 202111351131.0 (with English translation).
Jan. 31, 2024 Notice of Allowance in Taiwanese Patent Application No. 112113683.
Feb. 2, 2024 Office Action in Australian Patent Application No. 2023202739.
Mar. 7, 2024 Extended Search Report in European Patent Application No. 23 21 9129.6.
Jan. 13, 2024 Notice of Allowance in Chinese Patent Application No. 202111365398.5.
International Search Report and Written Opinion for International Patent Application No. PCT/JP2017/022763, mailed Aug. 15, 2017.
Office Action in Taiwanese Patent Application No. 106119850, dated Jun. 8, 2018.
Apr. 29, 2020 Office Action in Colombian Patent Application No. NC2018/0014306.
Jul. 27, 2020 Office Action in Korean Patent Patent Application No. 10-2019-7001309.
Jul. 10, 2020 Office Action in Chilean Patent Application No. 201803560.
Nov. 24, 2020 Office Action in Chinese Patent Application No. 201780036685.7 (with English translation).
Office Action dated Nov. 24, 2020 in counterpart Colombian Patent Application No. NC2018/0014306, together with English translation thereof.
Jan. 22, 2021 Notice of Allowance in Korean Patent Application No. 10-2020-7030784.
Mar. 1, 2021 Office Action in United Kingdom Patent Application No. GB2100623.4.
Feb. 3, 2021 Notice of Allowance in Colombian Patent Application No. NC2020/0011887.
Sep. 2, 2019 Decision to Grant in Russian Patent Application No. 2019100445 (with English translations).
Sep. 17, 2019 Office Action in Indonesian Patent Application No. P00201811224.
Sep. 23, 2019 Office Action in Korean Patent Application No. 10-2019-7001309.
Nov. 13, 2019 Office Action in Chilean Patent Application No. 201803580.
Feb. 12, 2020 Notice of Acceptance in Australian Patent Application No. 2017284517.
Feb. 12, 2020 Communication in European Patent Application No. 17 813 450.8.
Apr. 22, 2021 Office Action in Taiwanese Patent Application No. 108101654.
Mar. 24, 2022 Notice of Allowance in Korean Patent Application No. 10-2021-7011675.
English translation of Japanese Patent Application Publication No. 2009-151207.
English translation of Japanese Patent Application Publication No. 2002-328499.
English translation of Japanese Patent Application Publication No. 2000-267374.
English translation of Japanese Patent Application Publication No. H10-104997.
Jan. 13, 2022 Office Action in Chilean Patent Application No. 202001169.
Nov. 22, 2021 Extended Search Report in European Patent Application No. 21 186 006.9.
Jun. 29, 2021 Notice of Allowance in Colombian Patent Application No. NC2018/0014306.
Jul. 1, 2021 Notice of Acceptance in Australian Patent Application No. 2020200517.
Jul. 7, 2021 Office Action in Indian Patent Application No. 201947001140.
May 19, 2021 Office Action in Russian Patent Application No. 2019136069 (with English translation).
May 13, 2021 Office Action in Chilean Patent Application No. 20201166.
May 13, 2021 Office Action in Chilean Patent Application No. 20201168.
May 13, 2021 Office Action in Chilean Patent Application No. 20201169.
Apr. 20, 2022 Office Action in Malaysian Patent Application No. PI2018002485.
May 18, 2022 Office Action in Australian Patent Application No. 2021203408.
May 31, 2022 Decision to Grant in Russian Patent Application No. 2019136069 (with English translation).
Aug. 23, 2022 Office Action in Japanese Patent Application No. 2021-182715.
May 13, 2022 Decision to Grant in Russian Patent Application No. 2019136069 (with English translation).
Sep. 28, 2022 Office Action in Taiwanese Patent Application No. 110144128.
May 31, 2022 Office Action in German Patent Application No. 11 2017 002 962.7 (with English translation).
Sep. 15, 2022 Office Action in Chilean Patent Application No. 202102063.
Sep. 15, 2022 Office Action in Chilean Patent Application No. 202102183.
May 11, 2023 Office Action in Chilean Patent Application No. 202102183.
Mar. 13, 2023 Office Action in Indian Patent Application No. 202248020194.
Mar. 13, 2023 Office Action in Indian Patent Application No. 202248020269.
Mar. 13, 2023 Office Action in Indian Patent Application No. 202248020149.
Jun. 20, 2023 Office Action in Brazilian Patent Application No. 112018074598-7.
Oct. 30, 2023 Notice of Allowance in Korean Patent Application No. 10-2023-7015991.
Oct. 2, 2024 Notice of Allowance in Singapore Patent Application No. 10202402219P.

(56) References Cited

OTHER PUBLICATIONS

Oct. 30, 2024 Notice of Allowance in Taiwanese Patent Application No. 113116201.
Mar. 24, 2025 Notice of Allowance in Korean Patent Application No. 10-2024-7003418.
Mar. 22, 2025 Office Action in Chinese Patent Application No. 202411338017.8 (with English translation).
Jan. 22, 2025 Office Action in Malaysian Patent Application No. P12022003823.
Dec. 12, 2024 Notice of Allowance in Chinese Patent Application No. 202111358285.2.
Feb. 3, 2025 Notice of Acceptance in Australian Patent Application No. 2023202739.
Oct. 8, 2025 Office Action in Malaysian Patent Application Pub. No. P12023003997.
Dec. 12, 2025 Extended Search Report in European Patent Application Pub. No. 25 193 852.8.
Jan. 19, 2026 Examination Report in Australian Patent Application Pub. No. 2025200587.
Feb. 11, 2026 Office Action in Philippines Patent Application Pub. No. 1/2018/502622.

* cited by examiner (a)

(b)

(a)

(b)

(a)

(b)

(a)

(b)

(a)

(b)

PROCESS CARTRIDGE AND ELECTROPHOTOGRAPHIC IMAGE FORMING APPARATUS

TECHNICAL FIELD

The present invention relates to a process cartridge and an electrophotographic image forming apparatus using the same.

Here, the process cartridge is a cartridge which is integrally formed with a photosensitive member and a process means actable on the photosensitive member so as to be dismountably mounted to a main assembly of the electrophotographic image forming apparatus.

For example, a photosensitive member and at least one of a developing means, a charging means and a cleaning means as the process means are integrally formed into a cartridge. Also, the electrophotographic image forming apparatus forms an image on a recording material using an electrophotographic image forming process.

Examples of the electrophotographic image forming apparatus include an electrophotographic copying machine, an electrophotographic printer (LED printer, laser beam printer, etc.), a facsimile machine, a word processor, and the like.

BACKGROUND ART

In an electrophotographic image forming apparatus (hereinafter also simply referred to as "image forming apparatus"), a drum type electrophotographic photosensitive member as an image bearing member, that is, a photosensitive drum (electrophotographic photosensitive drum) is uniformly charged. Subsequently, the charged photosensitive drum is selectively exposed to form an electrostatic latent image (electrostatic image) on the photosensitive drum. Next, the electrostatic latent image formed on the photosensitive drum is developed as a toner image with toner as developer. Then, the toner image formed on the photosensitive drum is transferred onto a recording material such as recording sheet, plastic sheet, and so on, and heat and pressure are applied to the toner image transferred onto the recording material to fix the toner image on the recording material, so that image recording is carried out.

Such an image forming apparatus generally requires toner replenishment and maintenance of various process means. In order to facilitate toner replenishment and maintenance, process cartridges dismountably mountable to the image forming apparatus main assembly have been put into cartridges by integrating photosensitive drums, charging means, developing means, cleaning means and the like in the frame.

With this process cartridge system, a part of the maintenance operation of the apparatus can be carried out by the user him/herself without relying on a service person in charge of after-sales service. Therefore, it is possible to improve the usability of the apparatus remarkably, and it is possible to provide an image forming apparatus excellent in usability. For this reason, this process cartridge system is widely used with image forming apparatus.

As described in JP H08-328449 (page 20, FIG. 16), a well-known image forming apparatus of the type described above includes a drive transmission member having a coupling at the free end thereof for transmitting drive to the process cartridge from the main assembly of the image forming apparatus, which is spring biased toward the process cartridge.

When an opening and closing door of the image forming apparatus main assembly is closed, the drive transmission member of this image forming apparatus is pressed by the spring and moves toward the process cartridge. By doing so, the drive transmission member engages (couples) with the coupling of the process cartridge and the drive transmission to the process cartridge is enabled. Also, when the opening/closing door of the image forming apparatus main assembly is opened, the drive transmission member moves in a direction away from the process cartridge against the spring by a cam. By this, the drive transmitting member disestablishes the engagement (coupling) with the coupling of the process cartridge, so that the process cartridge can be dismounted from the main assembly of the image forming apparatus.

SUMMARY OF THE INVENTION

Problems to be Solved by the Invention

The object of the present invention is to further develop the aforementioned prior art.

Means for Solving the Problem

Typical structure of the invention of this application is, A process cartridge detachably mountable to a main assembly of an electrophotographic image forming apparatus, said process cartridge comprising a photosensitive member; a coupling portion provided at an end portion of said photosensitive member and including a driving force receiving portion for receiving a driving force for rotating said photosensitive member, from an outside of said process cartridge; and a gear portion including gear teeth for receiving a driving force from an outside of said process cartridge, independently from said coupling portion, wherein said gear teeth include an exposed portion exposed to an outside of said process cartridge, wherein at least a part of said exposed portion (a) faces an axis of said photosensitive member, (b) is disposed outside of said driving force receiving portion in an axial direction of said photosensitive member, and (c) is in a neighborhood of a peripheral surface of said photosensitive member.

Another structure is,

A process cartridge detachably mountable to a main assembly of an electrophotographic image forming apparatus, said main assembly including a drive output member having an output gear portion and an output coupling portion which are coaxial with each other, said process cartridge comprising a photosensitive member; an input coupling portion provided at an end portion of said photosensitive member and capable of coupling with the output coupling portion; and an input gear portion capable of meshing engagement with said output gear portion; wherein said input gear portion is configured such that said input gear portion and said output gear portion attract toward each other by rotations thereof in the state that said input gear portion and said output gear portion are in meshing engagement with each other.

A further structure is,

A process cartridge detachably mountable to a main assembly of an electrophotographic image forming apparatus, said process cartridge comprising a photosensitive member; a coupling portion provided at an end portion of said photosensitive member and including a driving force receiving portion for receiving a driving force for rotating said photosensitive member, from an outside of said process cartridge; and a gear portion including a gear tooth for receiving, independently of said coupling portion, a driving force from a outside of said process cartridge; wherein said gear tooth is a helical gear tooth, and includes an exposed portion exposed to an outside of said process cartridge, wherein at least a part of said exposed portion is disposed outside of said driving force receiving portion in an axial direction of said photosensitive member and is faced to an axis of said photosensitive member.

A further structure is,

A process cartridge detachably mountable to a main assembly of an electrophotographic image forming apparatus, said process cartridge comprising a photosensitive member; a coupling portion provided at an end portion of said photosensitive member and including a driving force receiving portion configured to receive a driving force for rotating said photosensitive member from an outside of said process cartridge; a gear portion including a gear tooth for receiving, independently of said coupling portion, a driving force from a outside of said process cartridge; and a developer carrying member configured to carry the developer to develop a latent image formed on said photosensitive member, said developer carrying member being rotatable in a clockwise direction as seen in such a direction that said gear portion rotates in the clockwise direction; wherein said gear teeth include an exposed portion exposed to an outside of said process cartridge, wherein at least a part of said exposed portion is faced to a axis of said photosensitive member and is disposed outside of said driving force receiving portion in an axial direction of said photosensitive member.

A further structure is,

A process cartridge detachably mountable to a main assembly of an electrophotographic image forming apparatus, said process cartridge comprising a photosensitive member; an alignment portion provided coaxially with said photosensitive member; and gear portion including a gear tooth for receiving a driving force from an outside of said process cartridge; wherein said gear teeth include an exposed portion exposed to an outside of said process cartridge, wherein at lease a part of said stopper is (a) faced to an axis of said photosensitive member, (b) is disposed outside beyond said alignment portion in the axial direction of said photosensitive member and (c) is disposed adjacent to a peripheral surface of said photosensitive member in a plane perpendicular to the axis of said photosensitive member.

A further structure is,

A process cartridge detachably mountable to a main assembly of an electrophotographic image forming operation, the main assembly including a drive output member having an output gear portion and a main assembly side alignment portion which are coaxial with each other, said process cartridge comprising a photosensitive member; a cartridge side alignment portion engageable with the main assembly side alignment portion to effect alignment between said photosensitive member and the drive output member; and an input gear portion capable of meshing engagement with said output gear portion; wherein said input gear portion is configured such that said input gear portion and said output gear portion attract toward each other by rotations thereof in the state that said input gear portion and said output gear portion are in meshing engagement with each other.

A further structure is,

A process cartridge detachably mountable to a main assembly of an electrophotographic image forming apparatus, said process cartridge comprising a photosensitive member; an alignment portion provided coaxially with said photosensitive member; and a gear portion including a gear tooth for receiving a driving force from an outside of said process cartridge, wherein said gear tooth is a helical gear tooth, and includes an exposed portion exposed to an outside of said process cartridge, wherein at least a part of said exposed portion is disposed outside of said alignment portion in an axial direction of said photosensitive member and is faced to the axis of said photosensitive member.

A further structure is,

A process cartridge detachably mountable to a main assembly of an electrophotographic image forming apparatus, said process cartridge comprising a photosensitive member; an alignment portion provided coaxially with said photosensitive member; a gear portion including a gear tooth configured to receive a driving force from an outside of said process cartridge; and a developer carrying member configured to carry the developer to develop a latent image formed on said photosensitive member, said developer carrying member being rotatable in a clockwise direction as seen in such a direction that said gear portion rotates in the clockwise direction, wherein said gear teeth include an exposed portion exposed to an outside of said process cartridge, and wherein at least a part of said exposed portion is faced to the axis of said photosensitive member and is disposed outside of said alignment portion in the axial direction of said photosensitive member.

Effect of the Invention

It is possible to further develop the aforementioned prior art.

DETAILED DESCRIPTION OF THE INVENTION

Embodiment 1

Embodiments of the present invention will be described in detail with reference to the accompanying drawings.

A rotational axis direction of an electrophotographic photosensitive drum is defined as the longitudinal direction.

In the longitudinal direction, the side at which the electrophotographic photosensitive drum receives the driving force from the main assembly of the image forming apparatus is a driving side and the opposite side thereof is a non-driving side.

Figure 2:
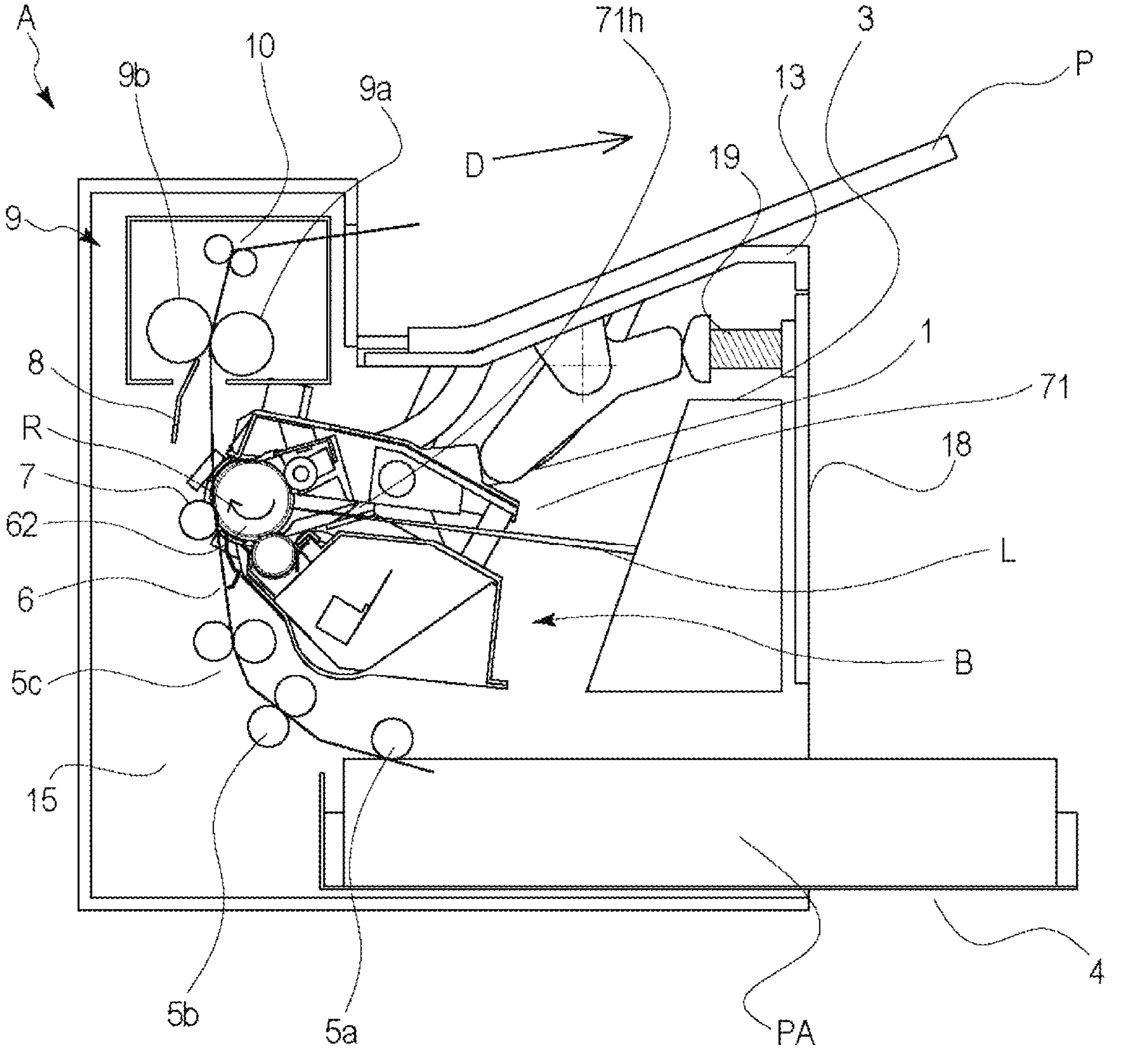
FIG. 2 is a sectional view of the image forming apparatus main assembly and the process cartridge of the electrophotographic image forming apparatus according to Embodiment 1.
Figure 3:
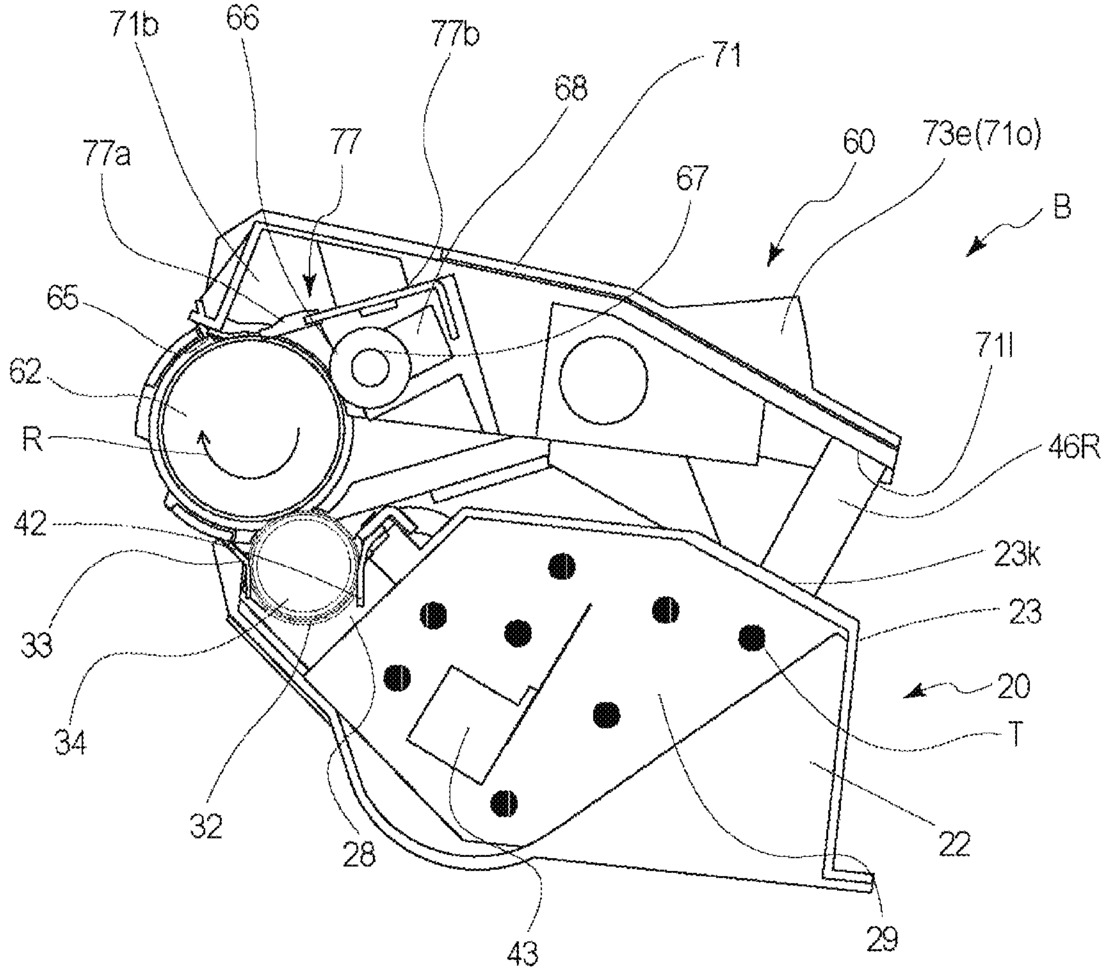
FIG. 3 is a sectional view of the process cartridge according to Embodiment 1.

Referring to FIG. 2 and FIG. 3, the overall structure and the image forming process will be described.

FIG. 2 is a cross-sectional view of the main assembly of the electrophotographic image forming apparatus (the electrophotographic image forming apparatus main assembly, the image forming apparatus main assembly) An and the process cartridge (hereinafter referred to as cartridge B) of the electrophotographic image forming apparatus according to an embodiment of the present invention.

FIG. 3 is a cross-sectional view of cartridge B.

Here, the apparatus main assembly A is a part of the electrophotographic image forming apparatus excluding the cartridge B.

<Entire Configuration of Electrophotographic Image Forming Apparatus>

An electrophotographic image forming apparatus (image forming apparatus) shown in FIG. 2 is a laser beam printer using an electrophotographic process in which the cartridge B is dismountably mounted to the apparatus main assembly A, An exposure device 3 (laser scanner unit) for forming a latent image on the electrophotographic photosensitive drum 62 as the image bearing member of the cartridge B at the time when the cartridge B is mounted in the apparatus main assembly An is provided. Also, below the cartridge B, there is provided a sheet tray 4 containing recording materials (hereinafter referred to as a sheet material PA) to be subjected to image formation. The electrophotographic photosensitive drum 62 is a photosensitive member (electrophotographic photosensitive member) used for forming an electrophotographic image.

Further, in the apparatus main assembly A, a pickup roller 5*a*, a pair of feeding rollers 5*b*, a pair of feeding rollers 5*c*, a transfer guide 6, a transfer roller 7, a feeding guide 8, a fixing device 9, a pair of discharge rollers 10, a discharge tray 11, and so on are sequentially arranged. In addition, the fixing device 9 comprises a heating roller 9*a* and a pressure roller 9*b*.

<Image Forming Process>

Next, the image forming process will be briefly explained. Based on the print start signal, the electrophotographic photosensitive drum (hereinafter referred to as photosensitive drum 62 or simply drum 62) is rotationally driven in the direction of an arrow R at a predetermined circumferential speed (process speed).

The charging roller (charging member) 66 to which the bias voltage is applied contacts with the outer peripheral surface of the drum 62 to uniformly charge the outer peripheral surface of the drum 62.

The exposure device 3 outputs a laser beam L in accordance with image information. The laser beam L passes through the laser opening 71*h* provided in the cleaning frame 71 of the cartridge B and scans and is incident on the outer peripheral surface of the drum 62. By this, an electrostatic latent image corresponding to the image information is formed on the outer peripheral surface of the drum 62.

On the other hand, as shown in FIG. 3, in the developing unit 20 as a developing device, the toner T in the toner chamber 29 is stirred and fed by the rotation of the feeding member (stirring member) 43 to a toner supply chamber 28.

The toner T is carried on the surface of the developing roller 32 by the magnetic force of the magnet roller 34 (stationary magnet). The developing roller 32 is a developer carrying member which carries a developer (toner T) on the surface thereof in order to develop a latent image formed on the drum 62.

While the toner T is triboelectrically charged by the developing blade 42, the layer thickness on the peripheral surface of the developing roller 32 as the developer carrying member is regulated.

The toner T is supplied to the drum 62 in accordance with the electrostatic latent image to develop the latent image. By this, the latent image is visualized into a toner image. The drum 62 is an image bearing member for carrying the latent image and the image (toner image, developer image) formed with toner on the surface thereof. Also, as shown in FIG. 2, the sheet material PA stored in the lower portion of the apparatus main assembly An is fed out of the sheet tray 4 in timed relation with the output of the laser beam L, By the pickup roller 5*a*, the feeding roller pair 5*b*, and the feeding roller pair 5*c*. Then, the sheet material PA is fed to the transfer position between the drum 62 and the transfer roller 7 along the transfer guide 6. At this transfer position, the toner image is sequentially transferred from the drum 62 to the sheet material PA.

The sheet material PA to which the toner image is transferred is separated from the drum 62 and fed to the fixing device 9 along a conveyance guide 8. And, the sheet material PA passes through the nip portion between a heating roller 9*a* and a pressure roller 9*b* which constitute the fixing device 9. Pressure and heat fixing process are performed in this nip portion, so that the toner image is fixed on the sheet material PA. The sheet material PA subjected to the fixing process of the toner image is fed to the discharge roller pair 10 and discharged to the discharge tray 11.

On the other hand, as shown in FIG. 3, after the image transfer, residual toner remaining on the outer circumferential surface of the drum 62 after the transfer is removed by the cleaning blade 77 and is used again for the image forming process. The toner removed from the drum 62 is stored in a waste toner chamber 71*b* of the cleaning unit 60. The cleaning unit 60 is a unit including the photosensitive drum 62.

In the above description, the charging roller 66, the developing roller 32, the transfer roller 7, and the cleaning blade 77 act as a process means acting on the drum 62.

<Entire Cartridge Structure>

Figure 4:
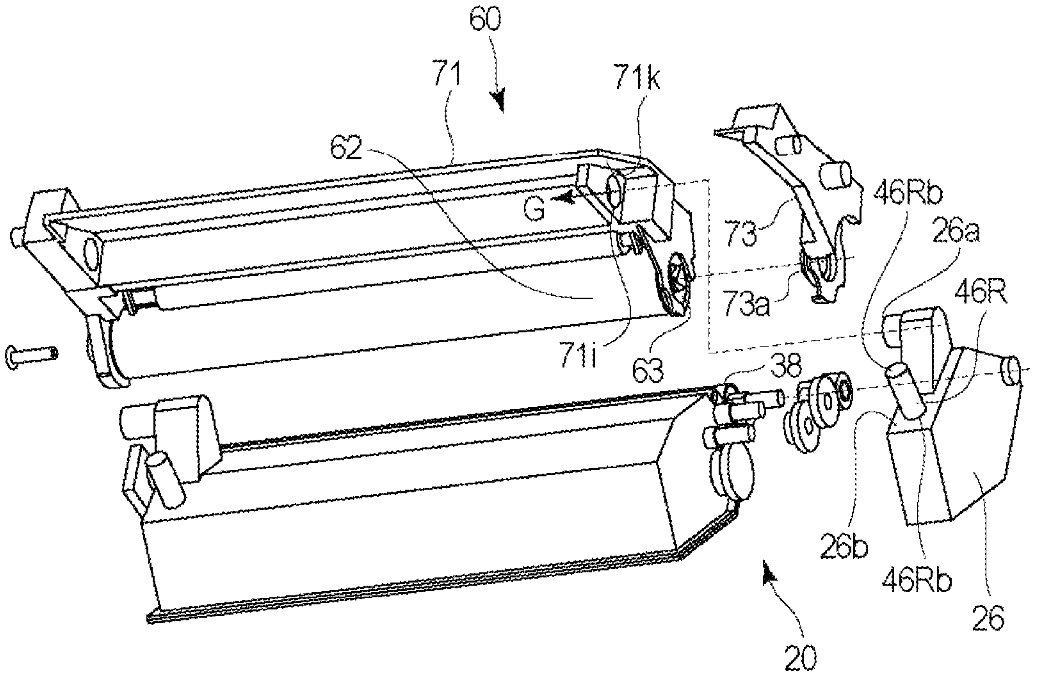
FIG. 4 is a perspective view of the image forming apparatus main assembly in a state in which the opening and closing door of the electrophotographic image forming apparatus according to Embodiment 1 is opened.
Figure 5:
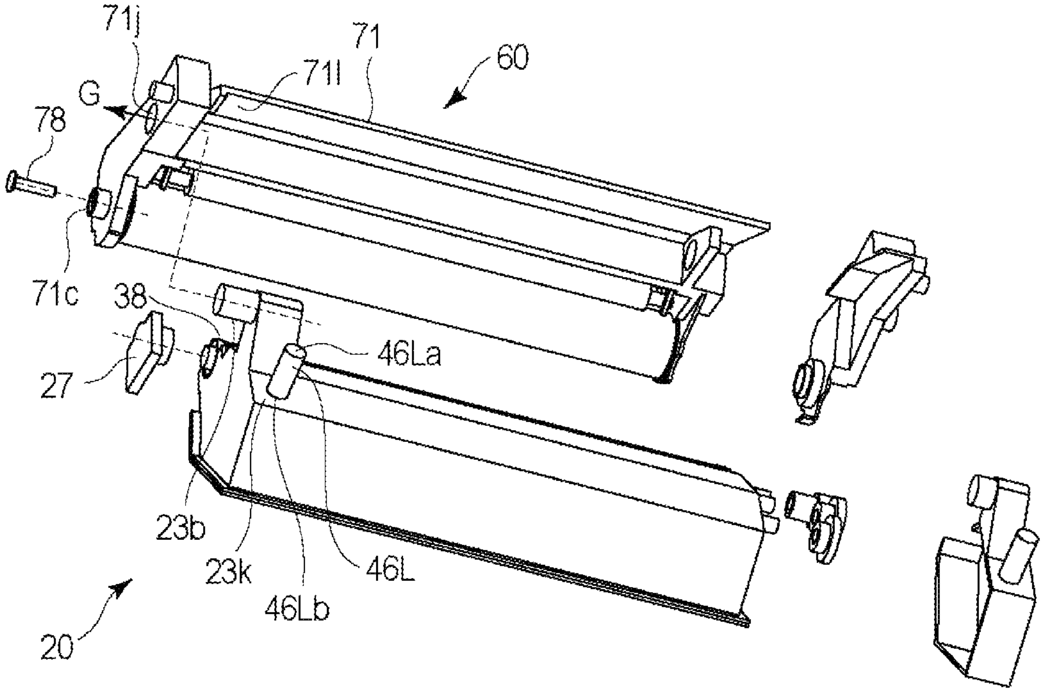
FIG. 5 is a perspective view of the process cartridge and the driving side positioning portion of the image forming apparatus main assembly in a state in which the process cartridge is mounted on the electrophotographic image forming apparatus main assembly according to Embodiment 1.

Next, the overall structure of the cartridge B will be described referring to FIGS. 3, 4, and 5. FIG. 3 is a sectional view of the cartridge B, and FIG. 4 and FIG. 5 are perspective views illustrating the structure of the cartridge B.

In the description of this embodiment, the screws for joining the parts are omitted.

The cartridge B includes a cleaning unit (photosensitive member holding unit, drum holding unit, image bearing member holding unit, first unit) 60 and a developing unit (developer carrying member holding unit, second unit) 20.

Generally, the process cartridge is a cartridge in which at least one of the electrophotographic photosensitive member and the process means acting thereon are integrally formed into a cartridge, and the process cartridge is mountable to and dismountable from the main assembly (apparatus main assembly) of the electrophotographic image forming apparatus. Examples of process means include charging means, developing means and cleaning means.

As shown in FIG. 3, the cleaning unit 60 includes a drum 62, a charging roller 66, a cleaning member 77, and a cleaning frame 71 for supporting them. On the drive side of the drum 62, the drive side drum flange 63 provided on the drive side is rotatably supported by the hole 73*a* of a drum bearing 73. In a broad sense, the drum bearing 73 plus the cleaning frame 71 can be called a cleaning frame.

As shown in FIG. 5, on the non-driving side, the hole portion (not shown) of the non-driving side drum flange is rotatably supported by the drum shaft 78 press-fitted in the hole portion 71*c* provided in the cleaning frame 71 and is constituted to be supported.

Each drum flange is a supported portion rotatably supported by the bearing portion.

In the cleaning unit 60, the charging roller 66 and the cleaning member 77 are disposed in contact with the outer peripheral surface of the drum 62.

The cleaning member 77 includes a rubber blade 77*a* which is a blade-shaped elastic member formed of rubber as an elastic material, and a support member 77*b* which supports the rubber blade. The rubber blade 77*a* is counterdirectionally in contact with the drum 62 with respect to the rotational direction of the drum 62. In other words, the rubber blade 77*a* is in contact with the drum 62 so that the tip portion thereof faces the upstream side in the rotational direction of the drum 62.

As shown in FIG. 3, the waste toner removed from the surface of the drum 62 by the cleaning member 77 is stored in the waste toner chamber 71*b* formed by the cleaning frame 71 and the cleaning member 77.

Also, as shown in FIG. 3, a scooping sheet 65 for preventing the waste toner from leaking from the cleaning frame 71 is provided at the edge of the cleaning frame 71 so as to be in contact with the drum 62.

The charging roller 66 is rotatably mounted in the cleaning unit 60 by way of charging roller bearings (not shown) at the opposite end portions in the longitudinal direction of the cleaning frame 71.

Furthermore, the longitudinal direction of the cleaning frame 71 (the longitudinal direction of the cartridge B) is substantially parallel to the direction (the axial direction) in which the rotational axis of the drum 62 extends. Therefore, in the case of simply referring to the longitudinal direction or merely the axial direction without particular notice, the axial direction of the drum 62 is intended.

The charging roller 66 is pressed against the drum 62 by the charging roller bearing 67 being pressed toward the drum 62 by the biasing member 68. The charging roller 66 is rotationally driven by the drum 62.

As shown in FIG. 3, the developing unit 20 includes a developing roller 32, a developing container 23 which supports the developing roller 32, a developing blade 42, and the like. The developing roller 32 is rotatably mounted in the developing container 23 by bearing members 27 (FIG. 5) and 37 (FIG. 4) provided at the opposite ends.

Also, inside the developing roller 32, a magnet roller 34 is provided. In the developing unit 20, a developing blade 42 for regulating the toner layer on the developing roller 32 is provided. As shown in FIG. 4 and FIG. 5, the gap maintaining member 38 is mounted to the developing roller 32 at the opposite end portions of the developing roller 32, and the gap maintaining member 38 and the drum 62 are in contact with each other, so that the developing roller 32 is held with a small gap from the drum 62. Also, as shown in FIG. 3, a blowing prevention sheet 33 for preventing toner from leaking from the developing unit 20 is provided at the edge of the bottom member 22 so as to be in contact with the developing roller 32. In addition, in the toner chamber 29 formed by the developing container 23 and the bottom member 22, a feeding member 43 is provided. The feeding member 43 stirs the toner accommodated in the toner chamber 29 and conveys the toner to the toner supply chamber 28.

As shown in FIGS. 4 and 5, the cartridge B is formed by combining the cleaning unit 60 and the developing unit 20.

In the first step to join the developing unit and the cleaning unit with each other, the center of the developing first support boss 26*a* of the developing container 23 with respect to the first hanging hole 71*i* on the driving side of the cleaning frame 71, and the center of the developing second supporting boss 23*b* with respect to the second suspending hole 71*j* on the non-driving side are aligned with each other. More particularly, by moving the developing unit 20 in the direction of the arrow G, the first developing supporting boss 26*a* and the second developing supporting boss 23*b* are fitted in the first hanging hole 71*i* and the second hanging hole 71*j*. By this, the development unit 20 is movably connected to the cleaning unit 60. More specifically, the developing unit 20 is rotatably (rotatably) connected to the cleaning unit 60. After this, the cartridge B is constructed by assembling the drum bearing 73 to the cleaning unit 60.

Also, the first end portion 46 La of the driving side biasing member 46 L is fixed to the surface 23*c* of the developing container 23, and the second end portion 46 Lb abuts against the surface 71*k* which is a part of the cleaning unit.

Also, the first end 46 Ra of the non-driving side biasing member 46 R is fixed to the surface 23*k* of the developing container 23 and the second end 46Rb is in contact with the surface 71*l* which is a part of the cleaning unit.

In this embodiment, the driving side urging member 46L (FIG. 5) and the non-driving side urging member 46R (FIG. 4) comprises compression springs, respectively. The urging force of these springs urges the developing unit 20 against the cleaning unit 60 to urge the developing roller 32 reliably toward the drum 62 by the driving side urging member 46L and the non-driving side urging member 46R. Then, the developing roller 32 is held at a predetermined distance from the drum 62 by the gap maintaining members 38 mounted to opposite end portions of the developing roller 32.

<Cartridge Mounting>

Figure 1:
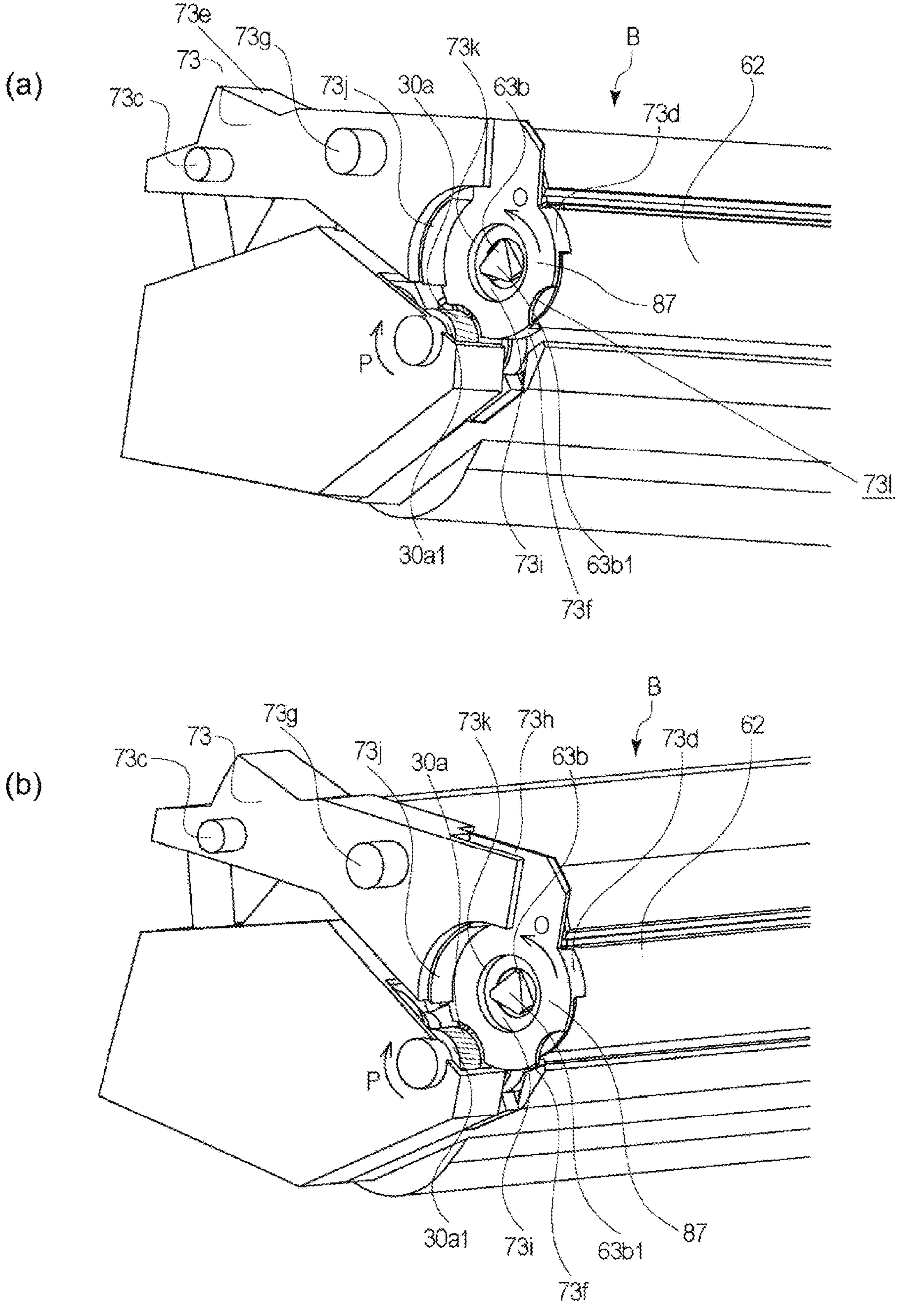
FIG. 1 is an illustration of a drive transmitting portion of a process cartridge according to Embodiment 1.
Figure 6:
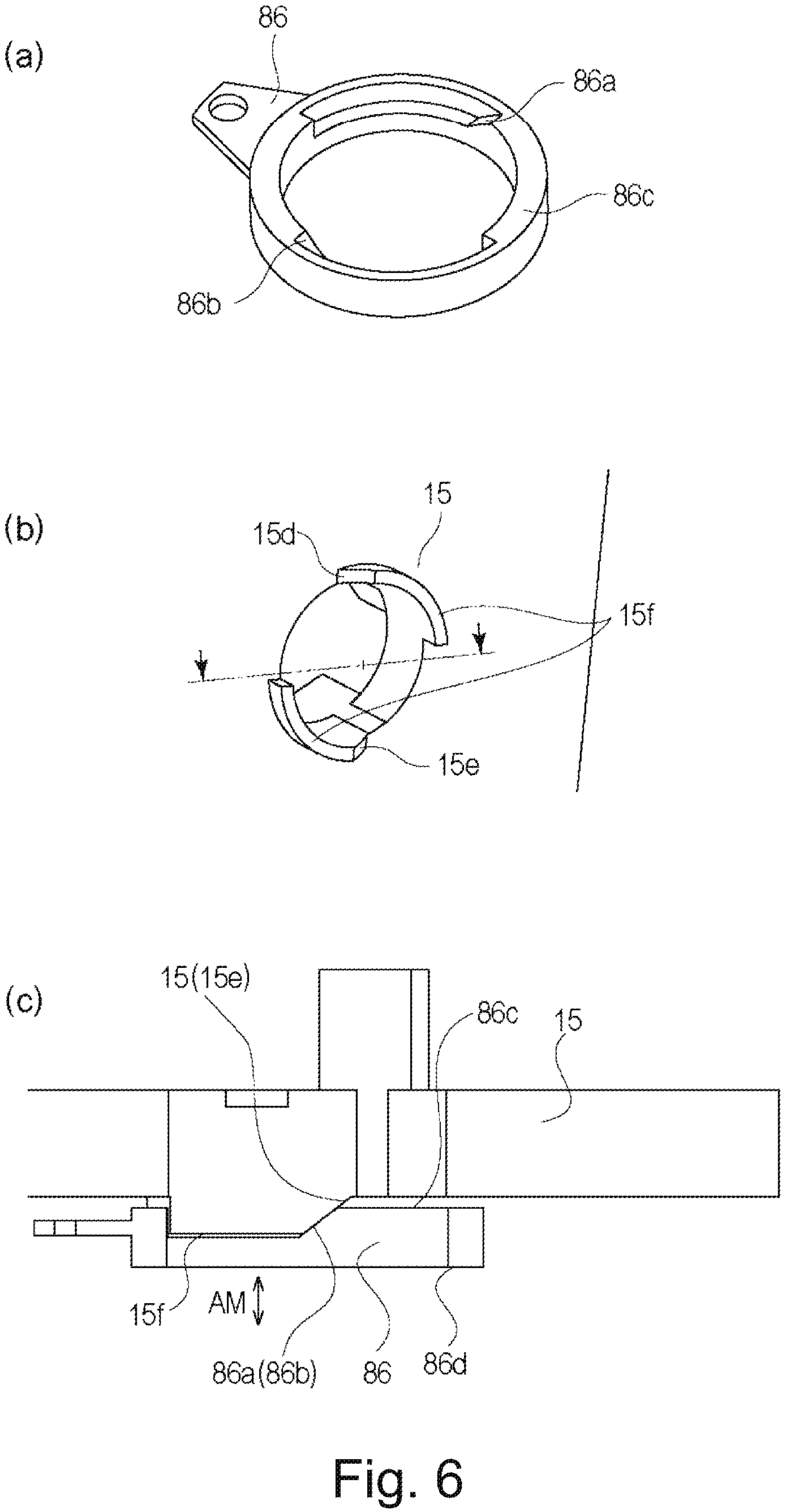
FIG. 6 is an illustration of a link portion of the electrophotographic image forming apparatus according to Embodiment 1.
Figure 7:
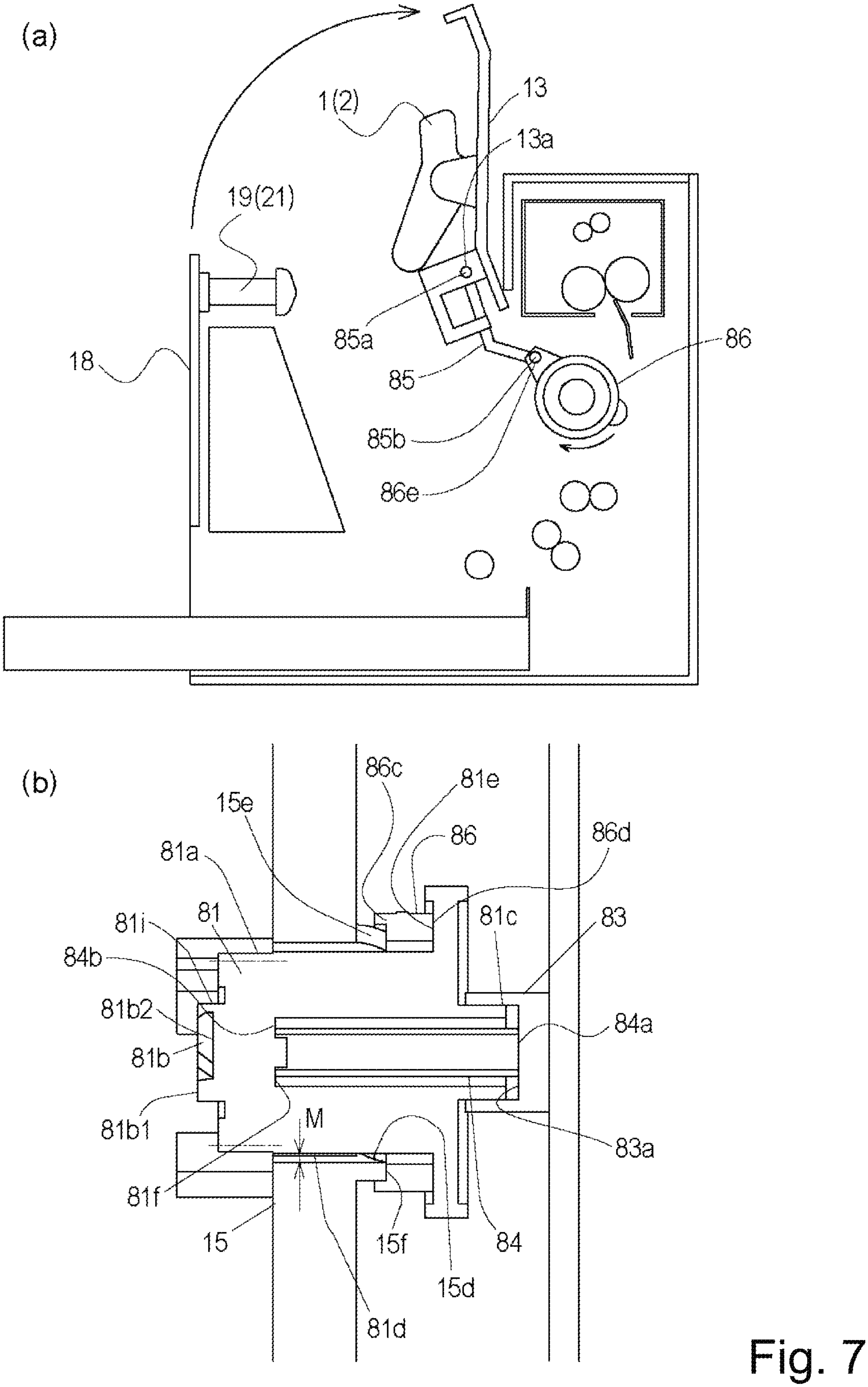
FIG. 7 is an illustration of a link portion of the electrophotographic image forming apparatus according to Embodiment 1.
Figure 8:
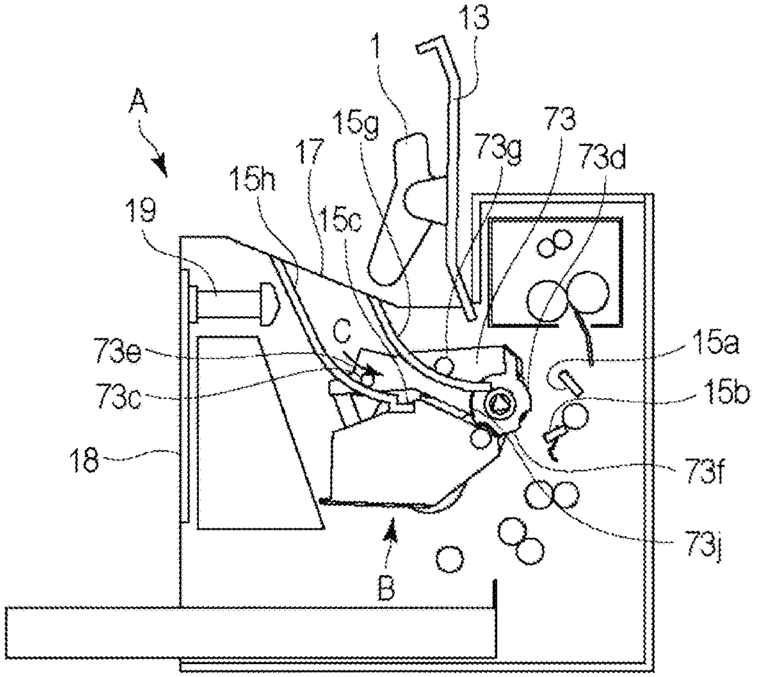
FIG. 8 is a sectional-viewed of a guide portion of the electrophotographic image forming apparatus according to Embodiment 1.
Figure 8:
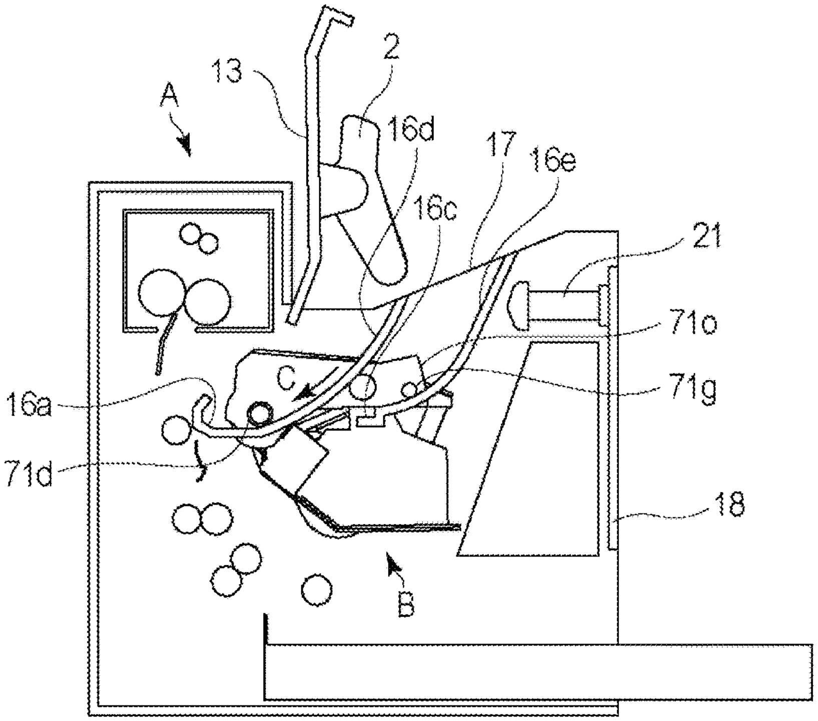
Figure 9:
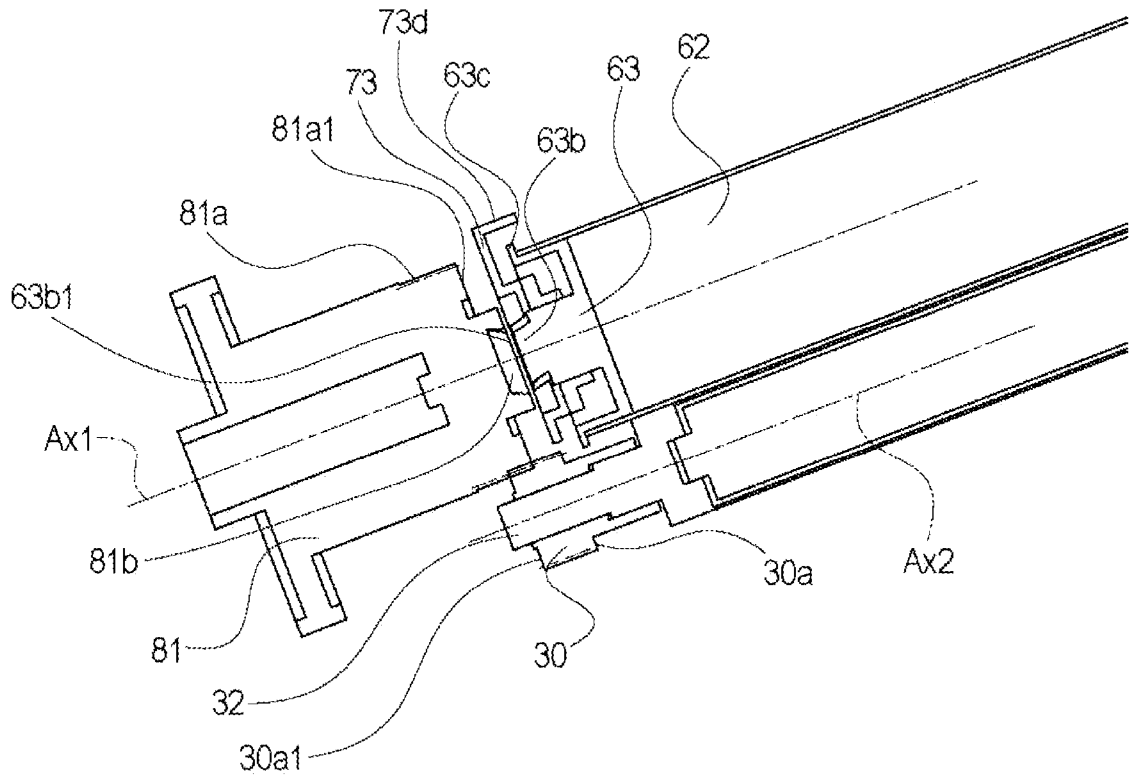
FIG. 9 is an illustration of a drive chain of the electrophotographic image forming apparatus according to Embodiment 1.
Figure 10:
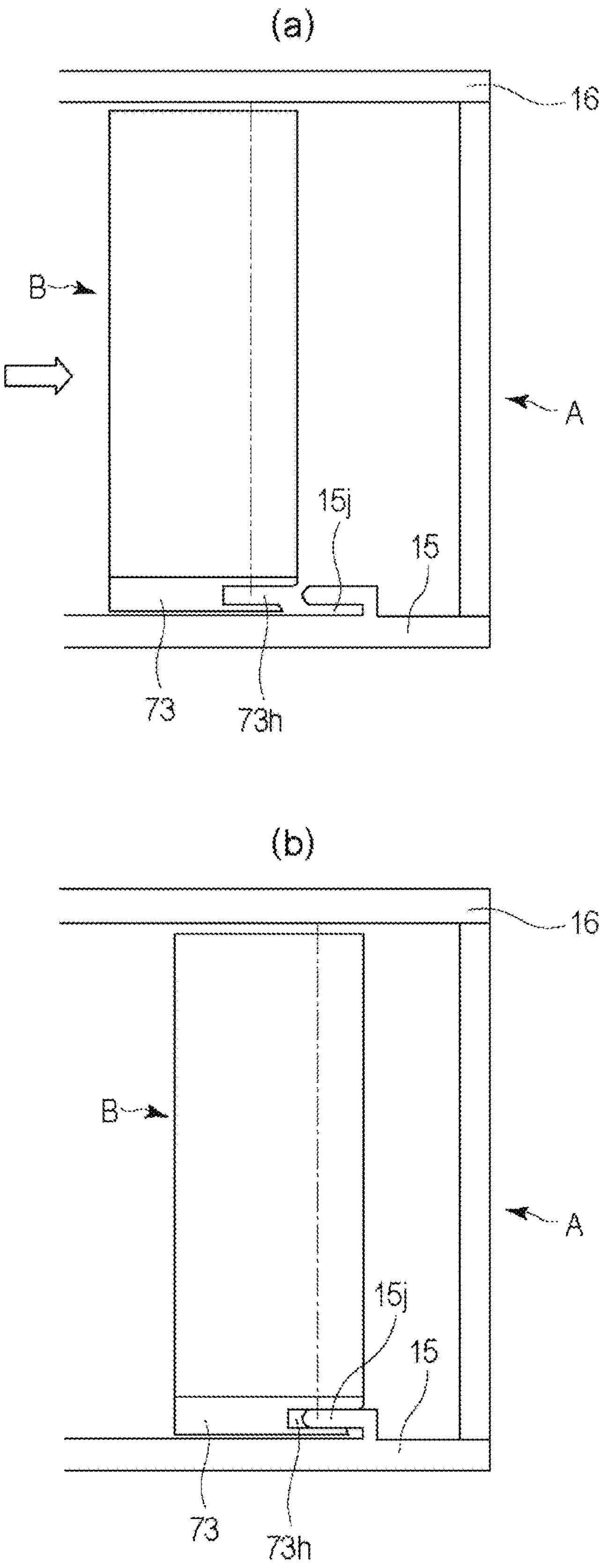
FIG. 10 is an illustration of a positioning portion for positioning in a longitudinal direction in the electrophotographic image forming apparatus according to Embodiment 1.
Figure 11:
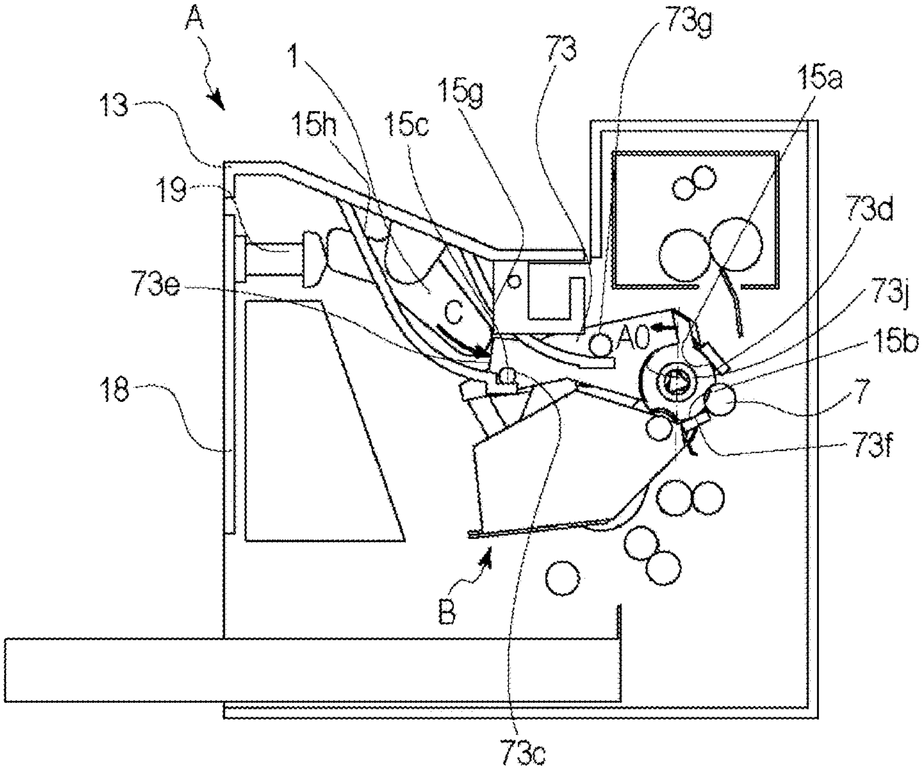
FIG. 11 is a positioning portion of the electrophotographic image forming apparatus according to Embodiment 1.
Figure 11:
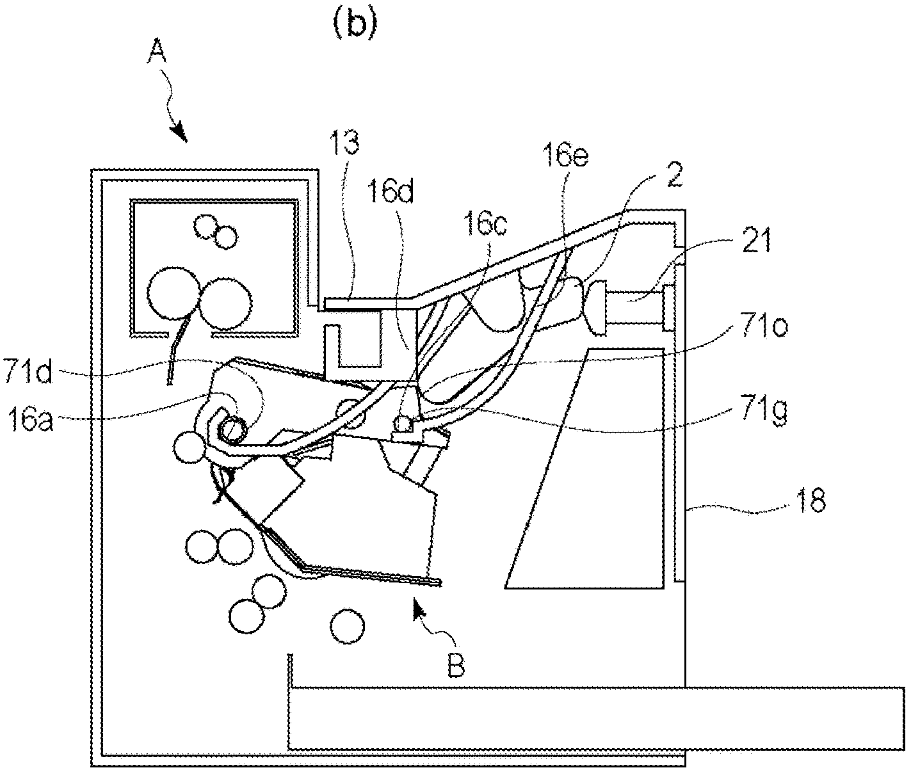
Figure 12:
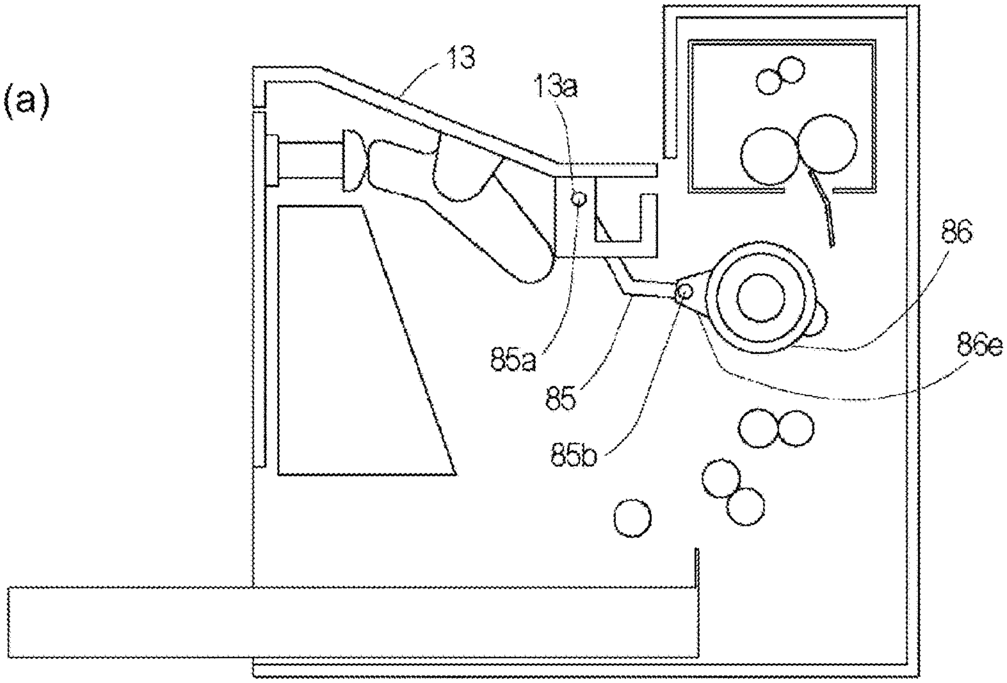
FIG. 12 is a sectional view of a drive transmitting portion of the electrophotographic image forming apparatus according to Embodiment 1.
Figure 12:
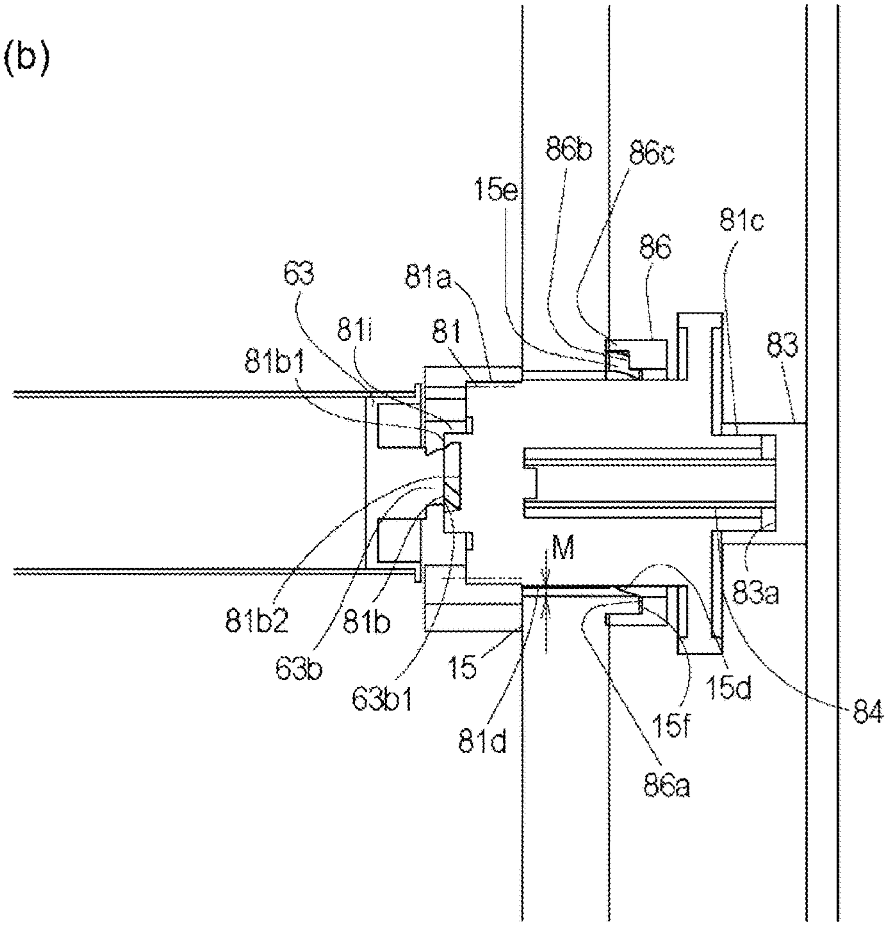
Figure 13:
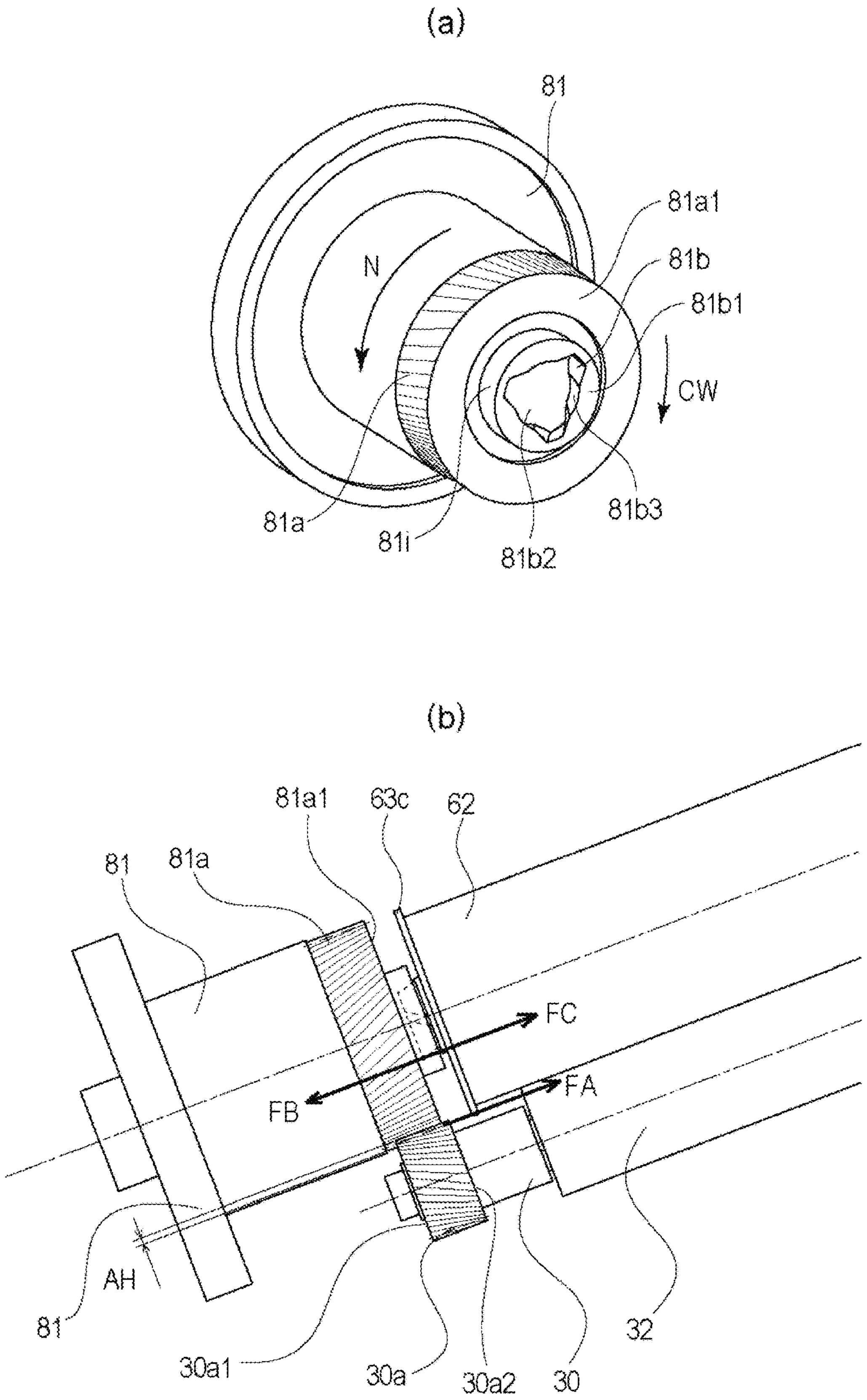
FIG. 13 is a perspective view of a drive transmitting portion on the electrophotographic image forming apparatus according to Embodiment 1.
Figure 15:
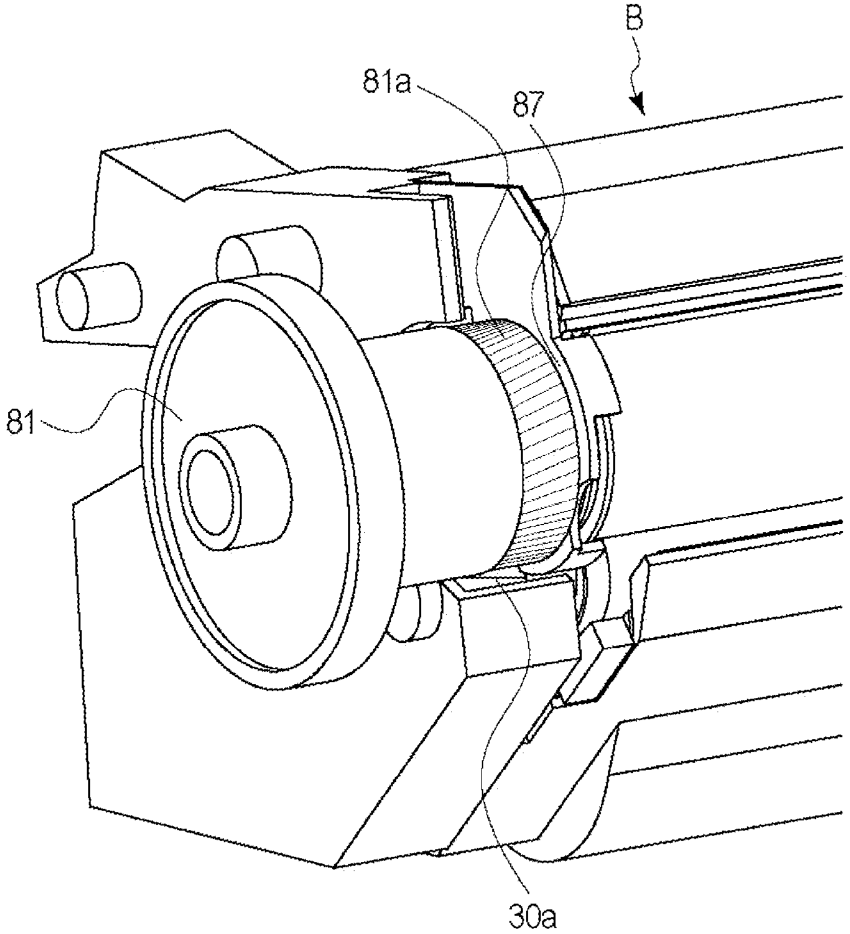
FIG. 15 is a perspective view of a drive transmitting portion of the electrophotographic image forming apparatus according to Embodiment 1.
Figure 16:
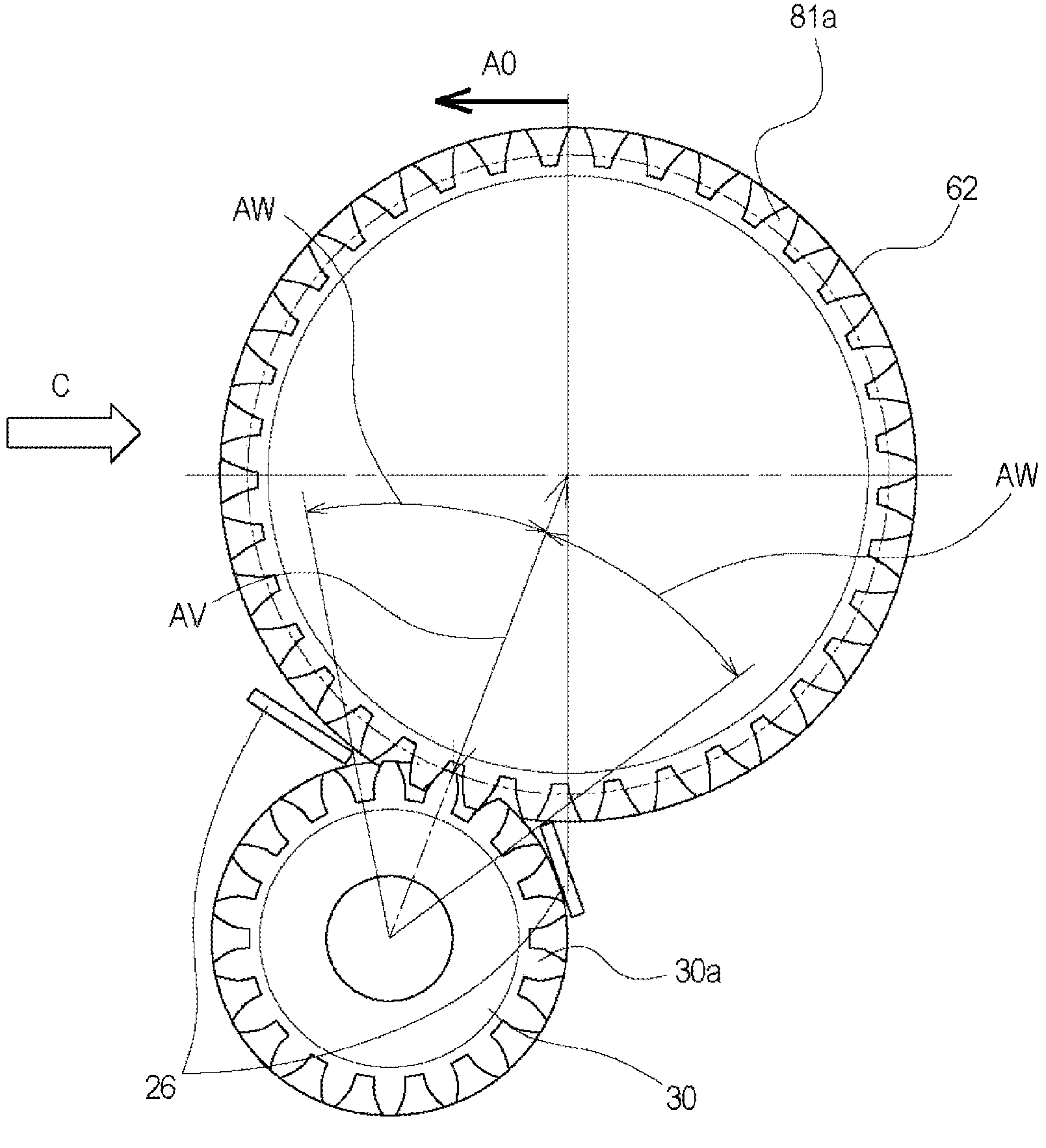
FIG. 16 is a sectional view of a drive transmitting portion of the electrophotographic image forming apparatus according to Embodiment 1.
Figure 17:
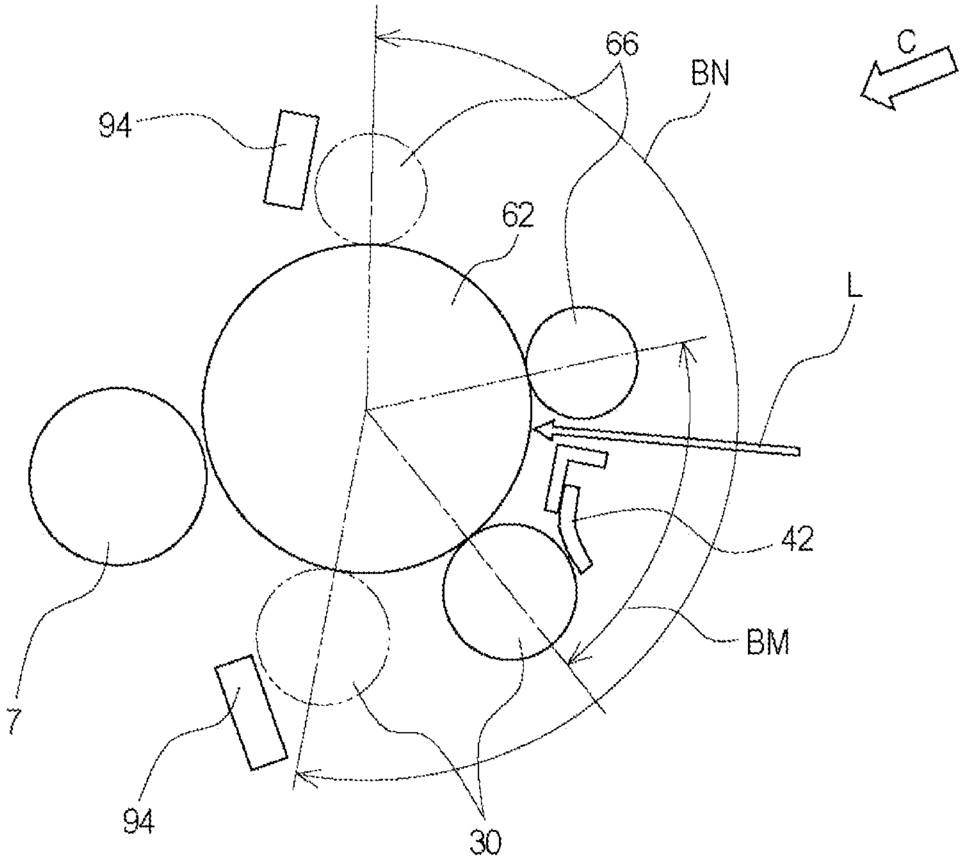
FIG. 17 is a sectional view around a drum of the electrophotographic image forming apparatus according to Embodiment 1.
Figure 18:
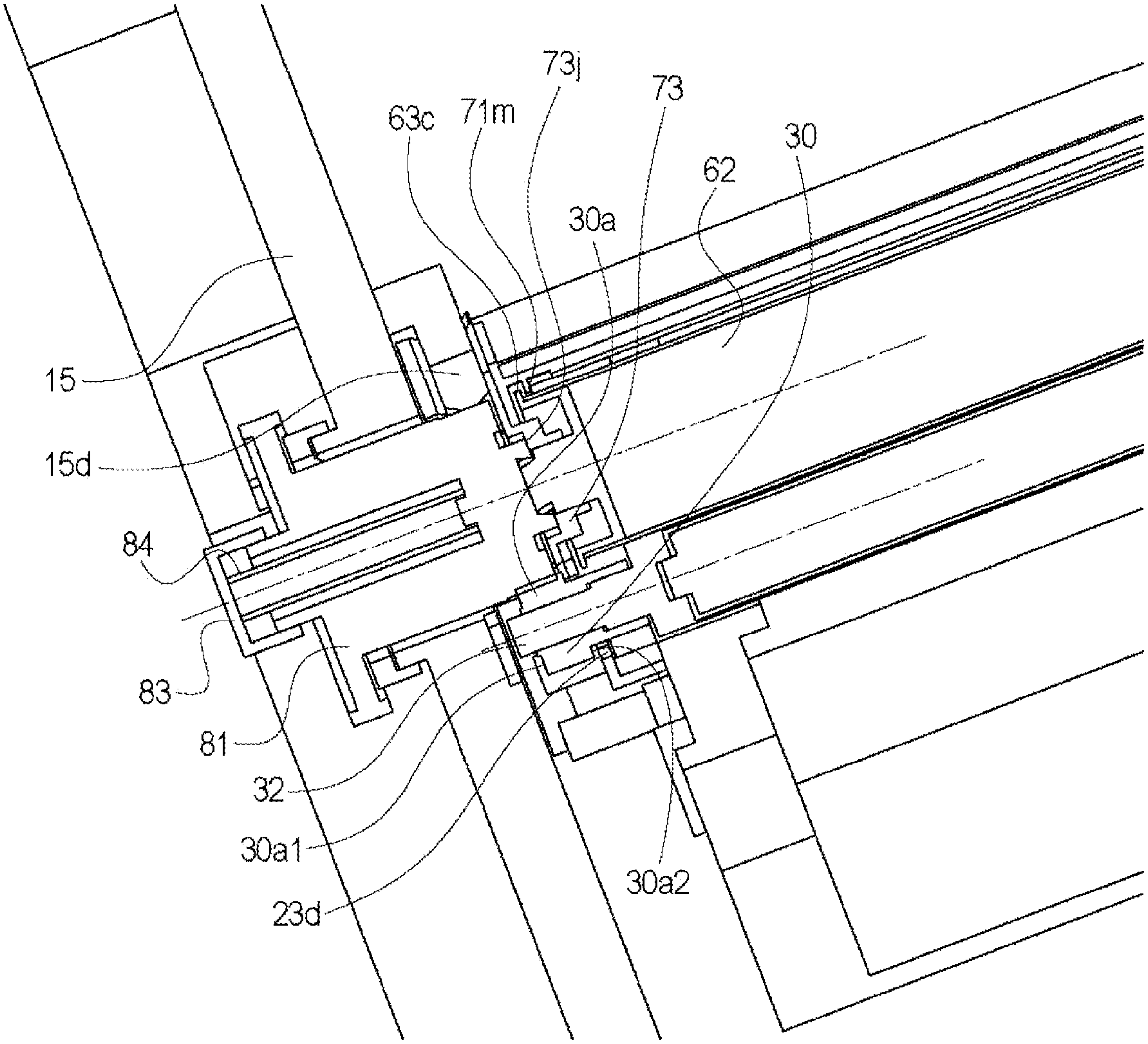
FIG. 18 is a sectional view of a drive transmitting portion of the electrophotographic image forming apparatus according to Embodiment 1.

Next, referring to part (a) and (b) of FIG. 1, part (a) of FIG. 6, part (b) of FIG. 6, part (c) of FIG. 6, part (a) and part (a) of FIG. 8, Part (b) of FIG. 8, Part (a) of FIG. 9, Part (a) of FIG. 10 and part (b) of FIG. 10, Part (a) of FIG. 11, Part (a) and part (b) of FIG. 12, part (a) of FIG. 13, part (b) of FIG. 13, FIG. 14, FIG. 15, FIG. 16, and FIG. 17, the mounting of the cartridge will be described in detail. Parts (a) and part (b) of FIG. 1 are perspective views of cartridges for explaining the shape around the drive transmission part. Part (a) of FIG. 6 is a perspective view of a cylindrical cam, part (b) of FIG. 6 is a perspective view of the driving side plate as viewed from the outside of the apparatus main assembly A, and part (c) of FIG. 6 is a sectional view in which a cylindrical cam is mounted to the driving side plate (The direction indicated by the arrow in part (b) of FIG. 6). Part (a) of FIG. 7 is a cross-sectional view of the image forming apparatus link portion for explaining the link structure, and part (b) of FIG. 7 is a cross-sectional view of the image forming apparatus drive unit for explaining the movement of the drive transmission member. Part (a) of FIG. 8 is a cross-sectional view of the driving side guide portion of the image forming apparatus for explaining the mounting of the cartridge, and Part (b) of FIG. 8 is a cross-sectional view of the non-driving side guide portion of the image forming apparatus for explaining the mounting of the cartridge. FIG. 9 is an illustration of the image forming apparatus driving train portion for explaining the positional relationship of the drive train before closing the opening/closing door. Part (a) of FIG. 10 is an illustration just before engagement of the image forming apparatus positioning portion for explaining the positioning of the process cartridge B in the longitudinal direction. Part (b) of FIG. 10 is an illustration after engagement of the image forming apparatus positioning portion for explaining the positioning of the process cartridge B in the longitudinal direction. Part (a) of FIG. 11 is a drive-side cross-sectional view of the image forming apparatus for explaining the positioning of the cartridge. Part (b) of FIG. 11 is a non-driving side sectional view of the image forming apparatus for explaining the positioning of the cartridge. Part (a) of FIG. 12 is a cross-sectional view of the image forming apparatus link portion for explaining the link structure, and Part (b) of FIG. 12 is a cross-sectional view of the image forming apparatus drive portion for explaining the movement of the drive transmission member. Part (a) of FIG. 13 is a perspective view of the drive transmission member for explaining the shape of the drive transmission member. Part (b) of FIG. 13 is an illustration of the drive transmitting portion of the main assembly A for explaining the drive transmitting portion. FIG. 15 is a perspective view of a drive unit of the image forming apparatus for explaining the engagement space of the drive transmitting portion. FIG. 16 is a cross-sectional view of the drive transmission member for explaining the engagement space of the drive transmission member. FIG. 17 is a sectional view around the drum 62 of the apparatus main assembly A for explaining the arrangement of the developing roller gear. FIG. 18 is a cross-sectional view of the drive transmission member for explaining the engagement of the drive transmission member.

First, a state in which the opening/closing door of the apparatus main assembly A is opened will be described. As shown in part (a) of FIG. 7, in the main assembly An of the apparatus, an opening/closing door 13, a cylindrical cam link 85, a cylindrical cam 86, cartridge pressing members 1, 2, cartridge pressing springs 19, 21 and a front plate 18 are provided. Also, as shown in part (b) of FIG. 7, in the main assembly An of the device, there are provided a drive transmission member bearing 83, a drive transmission member 81, a drive transmission member biasing spring 84, a driving side plate 15, and a non-driving side plate 16 (part (a) of FIG. 10)

The opening/closing door 13 is rotatably mounted on the driving side plate 15 and the non-driving side plate 16. As shown in part (a) of FIG. 6, part (b) of FIG. 6, and part (c) of FIG. 6, the cylindrical cam 86 is rotatable on the drive side plate 15 and movable in the longitudinal direction AM, and it has two inclined surface portions 86*a*, 86*b*, and furthermore, it has one end portion 86*c* continuous with the slope on the non-driving side in the longitudinal direction. The driving side plate 15 has two inclined surface portions 15*d* and 15*e* opposed to the two inclined surface portions 86*a* and 86*b* and an end surface 15*f* opposed to the one end portion 86*c* of the cylindrical cam 86. As shown in part (a) of FIG. 7, the cylindrical cam link 85 is provided with bosses 85*a*, 85*b* at the opposite ends. The bosses 85*a*, 85*b* are rotatably mounted to the mounting hole 13*a* provided in the opening/closing door 13 and the mounting hole 86*e* provided in the cylindrical cam 86, respectively. When the opening and closing door 13 is rotated and opened, the rotating cam link 85 moves in interrelation with the opening/closing door 13. The cylindrical cam 86 is rotated by the movement of the rotating cam link 85, and the inclined surfaces 86*a*, 86*b* first contact the inclined surface portions 15*d*, 15*e* provided on the driving side plate 15. When the cylindrical cam 86 further rotates, the inclined surface portions 86*a*, 86*b* slide along the inclined surface portions 15*d*, 15*e*, whereby the cylindrical cam 86 moves to the driving side in the longitudinal direction. Finally, the cylindrical cam 86 moves until the one end portion 86*c* of the cylindrical cam 86 abuts against the end surface 15*f* of the driving side plate 15.

Here, as shown in part (b) of FIG. 7, the drive transmission member 81 is fitted to the drive transmission member bearing 83 at one end (fixed end 81*c*) on the drive side in the axial direction, and is supported so as to be rotatable and movable in the axial direction. Also, in the drive transmission member 81, the central portion 81*d* in the longitudinal direction has a clearance M relative to the drive side plate 15. Also, the drive transmission member 81 has an abutment surface 81*e*, and the cylindrical cam 86 has the other end portion 86*d* opposite to the abutment surface 81*e*. The drive transmission member spring 84 is a compression spring, wherein one end portion 84*a* is in contact with a spring seat 83*a* provided on the drive transmission member bearing 83, and the other end portion 84*b* is in contact with a spring seat 81*f* provided on the drive transmission member 81. By this, the drive transmission member 81 is urged toward the non-drive side in the axial direction (left side in part (b) of FIG. 7). By this urging, the abutment surface 81*e* of the drive transmission member 81 and the other end portion 86*d* of the cylindrical cam 86 are in contact with each other.

When the cylindrical cam 86 moves in the longitudinal direction toward the driving side (the right side in part (b) of FIG. 7), the drive transmission member 81 is pushed by the cylindrical cam 86 and moves toward the drive side as described above. This causes the drive transmission member 81 to be in the retracted position. In other words, the drive transmission member 81 retracts from the movement path of the cartridge B, thereby securing the space for mounting the cartridge B in the image forming apparatus main assembly A.

Next, the mounting of the cartridge B will be described. As shown in part (a) of FIG. 8 and part (b) of FIG. 8, the driving side plate 15 has an upper guide rail 15 *g* and a guide rail 15*h* as a guide means, and the non-driving side plate 16 has a guide rail 16*d* and a guide rail 16*e*. Also, the drum bearing 73 provided on the driving side of the cartridge B has a guided portion 73 *g* and a rotation stopped portion 73*c*. In the mounting direction of the cartridge B (arrow C), the guided portion 73 *g* and the rotation stopping portion 73*c* are disposed on the upstream side of the axis of the coupling projection 63*b* (see part (a) of FIG. 1, details will be described later) (Arrow AO side in FIG. 16).

The direction in which the cartridge B is mounted is substantially perpendicular to the axis of the drum 62. In the case that upstream or downstream in the mounting direction is referred to, upstream and downstream are defined in the movement direction of the cartridge B just before the mounting to the apparatus main assembly A is completed.

Further, the cleaning frame 71 is provided with positioned portion (a portion to be positioned) 71*d* and a rotation stopped portion 71*g* on the non-driving side in the longitudinal direction. When the cartridge B is mounted through the cartridge inserting port 17 of the apparatus main assembly A, the guided portion 73*g* and the rotated stop portion 73*c* of the driven side of the cartridge B is guided by the guide rail 15*g* and the guide rail 15*h* of the main assembly A. In the non-driving side of the cartridge B, the positioned portion 71*d* and the rotation stopped portion 71*g* are guided by the guide rail 16*d* and the guide rail 16*e* of the apparatus main assembly A. By this, the cartridge B is mounted in the apparatus main assembly A.

Here, a developing roller gear (developing gear) 30 is provided at the end portion of the developing roller 32 (FIG. 9 and part (b) of FIG. 13). That is, the developing roller gear 30 is mounted on the shaft portion (shaft) of the developing roller 32.

The developing roller 32 and the developing roller gear 30 are coaxial with each other and rotate about the axis Ax2 shown in FIG. 9. The developing roller 32 is disposed such that the axis Ax2 thereof is substantially parallel to the axis Ax1 of the drum 62. Therefore, the axial direction of the developing roller 32 (developing roller gear 30) is substantially the same as the axial direction of the drum 62.

The developing roller gear 30 is a drive input gear (a cartridge side gear, a driving input member) to which a driving force is inputted from the outside of the cartridge B (that is, the apparatus main assembly A). The developing roller 32 is rotated by the driving force received by the developing roller gear 30.

As shown in parts (a) and part (b) of FIG. 1, an open space 87 is provided on the side of the driving side of the cartridge B on the drum 62 side of the developing roller gear 30, so that the developing roller gear 30 and the coupling projection 63*b* is exposed to the outside.

The coupling projection 63*b* is formed on the drive side drum flange 63 mounted on the end of the drum (FIG. 9). Coupling projection 63*b* is a coupling portion (drum side coupling portion, cartridge side coupling portion, photosensitive member side coupling portion, input coupling portion, drive input portion) (FIG. 9), To which A driving force is inputted from the outside of the cartridge B (that is, the apparatus main assembly A). The coupling projection 63*b* is disposed coaxially with the drum 62. In other words, the coupling projection 63*b* rotates about the axis Ax1.

The driving side drum flange 63 including the coupling projection 63*b* may be referred to as a coupling member (a drum side coupling member, a cartridge side coupling member, a photosensitive member side coupling member, a drive input coupling member, a input coupling member) is there.

Also, in the longitudinal direction of the cartridge B, the side on which the coupling projection 63*b* is provided is the drive side, and the opposite side corresponds to the non-drive side.

Also, as shown in FIG. 9, the developing roller gear 30 has a gear portion (input gear portion, cartridge side gear portion, developing side gear portion) 30*a* and an end surface 30*al* on the driving side of the gear portion (Parts (a), part (b) thereof, and FIG. 9 in FIG. 1). Teeth (gear teeth) formed on the outer periphery of the gear portion 30*a* are helical teeth inclined with respect to the axis of the developing roller gear 30. In other words, the developing roller gear 30 is a helical tooth gear (part (a) in FIG. 1).

Figure 14:
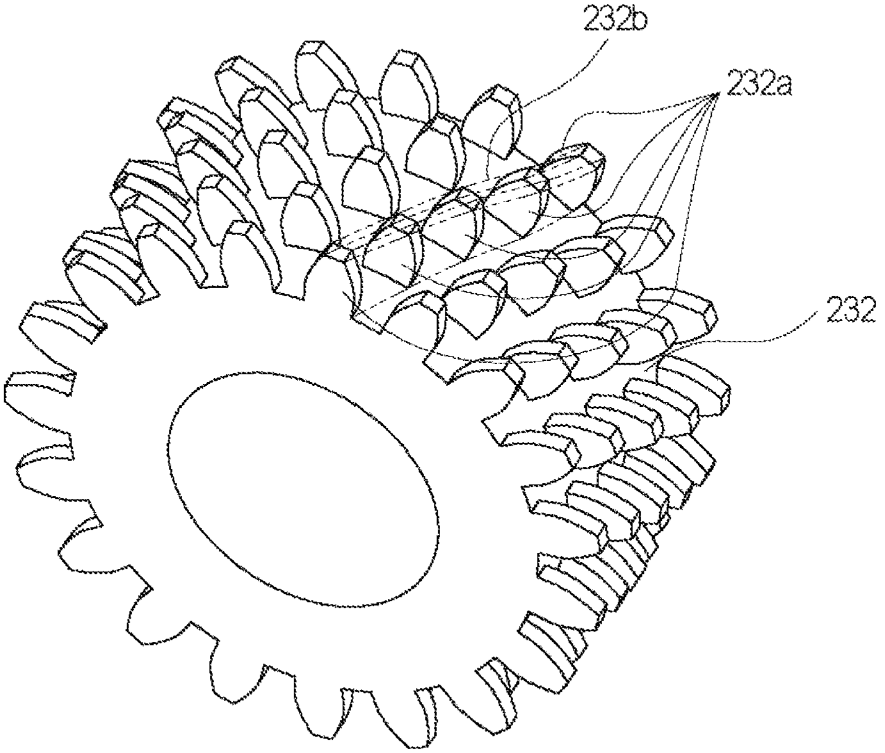
FIG. 14 is a perspective view of a developing roller gear of the electrophotographic image forming apparatus according to Embodiment 1.

Here, helical tooth also includes a shape in which a plurality of projections 232*a* are arranged along a line inclined with respect to the axis of the gear to substantially form the helical tooth portion 232*b* (FIG. 14). In the structure shown in FIG. 14, the gear 232 has a large number of projections 232*b* on its circumferential surface. And the set of five projections 232*b* can be regarded as forming a row inclined with respect to the axis of the gear. Each of the rows of these five projections 232*b* corresponds to the tooth of the aforementioned gear portion 30*a*.

The drive transmission member (drive output member, main assembly side drive member) 81 has a gear portion (main assembly side gear portion, output gear portion) 81*a* for driving the developing roller gear 30. The gear portion 81*a* has an end surface 81*al* at the end on the non-driving side (parts (a), part (b) thereof of FIG. 13).

The teeth (gear teeth) formed on the gear portion 81*a* are also helical teeth inclined with respect to the axis of the drive transmission member 81. In other words, the helical gear portion is also provided on the drive transmission member 81.

Also, the drive transmission member 81 is provided with a coupling recess 81*b*. The coupling recess 81*b* is a coupling portion (main assembly side coupling portion, output coupling portion) provided on the device main assembly side. The coupling recess 81*b* is formed by forming a recess capable of coupling with a coupling projection 63*b* provided on the drum side, in a projection (cylindrical portion) provided at the free end portion of the drive transmission member 81.

The space (space) 87 (FIG. 1) constituted so that the gear portion 30*a* and the coupling projection 63*b* are exposed allows the gear portion 81*a* of the drive transmission member 81 to be placed when the cartridge B is mounted in the apparatus main assembly A. Therefore, the space 87 is larger than the gear portion 81*a* of the drive transmission member 81 (FIG. 15).

More specifically, in the cross section of the cartridge B that passes through the gear portion 30*a* and that is perpendicular to the axis of the drum 62 (the axis of the coupling projection 63*b*), an imaginary circle having the same radius as that of the gear portion 81*a* is drawn about the axis of the drum 62 (the axis of the coupling projection 63*b*). Then, the inside of the imaginary circle is a space where no constituent element of the cartridge B exists. The space defined by this imaginary circle is included in the space 87 mentioned above. That is, the space 87 is larger than the space defined by the imaginary circle.

The following is the explanation of this another way. In the above cross section, an imaginary circle concentric with the drum 62 (coaxially) is drawn with the radius as the distance from the axis of the drum 62 to the tooth tip of the gear portion 30*a* of the developing roller 30. Then, the inside this imaginary circle is a space (space) where no constituent elements of cartridge B exists.

Since the space 87 exists, the drive transmission member 81 does not interfere with the cartridge B when the cartridge B is mounted to the apparatus main assembly A. As shown in FIG. 15, the space 87 permits the mounting of the cartridge B to the apparatus main assembly A by placing the drive transmission member 81 therein.

Also, as sing the cartridge B along the axis line of the drum 62 (the axis of the coupling projection 63*b*), the gear teeth formed in the gear portion 30*a* are disposed in a position close to the peripheral surface of the drum 62.

As shown in FIG. 16, a distance AV (the distance along the direction perpendicular to the axis) from the axis of the drum 62 to the free end portion of the gear tooth of the gear portion 30*a* (tooth tip) is 90% Or more and 110% or less of the radius of the drum 62.

In particular, in this embodiment, the radius of the drum 62 is 12 mm, and the distance from the axis of the drum 62 to the free end portion of the gear tooth of the gear portion 30*a* (tooth tip) is 11.165 mm or more and 12.74 or less. In other words, the distance from the axis of the drum 62 to the free end portion of the gear tooth of the gear portion 30*a* (tooth tip) is within the range of 93% to 107% of the radius of the drum.

Figure 33:
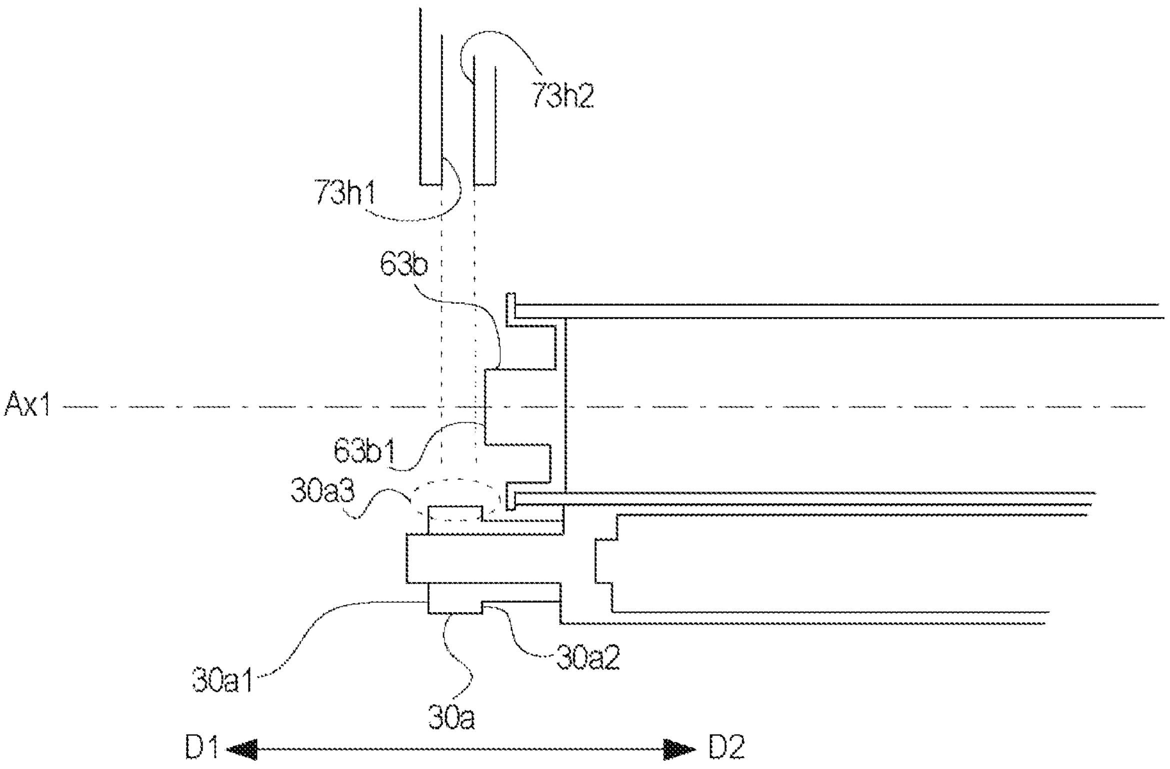
FIG. 33 is an illustration of the process cartridge according to Embodiment 1.

In the longitudinal direction, the end surface 30*al* of the gear portion 30*a* of the developing roller gear 30 is disposed so as to be positioned at the position closer to the driving side (outside of the cartridge B) than the leading end portion 63*b*1 of the coupling projection 63*b* of the driving side drum flange 63 (FIG. 9, FIG. 33).

By this, in the axial direction of the developing roller gear 30, the gear teeth of the gear portion 30*a* have exposed portions exposed from the cartridge B (FIG. 1). Especially in this embodiment, as shown in FIG. 16, the range of 64° or more of the gear portion 30*a* is exposed. In other words, When a line connecting the center of the drum 62 and the center of the developing roller gear 30 is taken as a reference line, as the cartridge B is seen from driving side, both sides of the developing roller gear 30 with respect to this reference line are exposed at least in a range of 32 degrees or more. In FIG. 16, the angle AW indicates the angle from the reference line to the position where the gear portion 30*a* starts to be covered by the driving side developing side member 26 with the center (axis) of the developing roller gear 30 as the origin, and AW≥32° is satisfied.

The total exposure angle of the gear portion 30*a* can be expressed as 2AW, and as described above, the relationship of 2AW≥64° is satisfied. If the gear portion 30*a* of the developing roller gear 30 is exposed from the driving side developing side member 26 so as to satisfy the above relationship, the gear portion 81*a* meshes with the gear portion 30*a* without interfering with the driving side developing side member 26, And therefore drive transmission is possible.

And, at least a part of the exposed portion of this gear portion 30*a* is disposed on more outside (drive side) of the cartridge B than the leading end 63*b*1 of the coupling projection 63*b* and faces the axis of the drum (FIG. 1, FIG. 9, FIG. 33). In FIGS. 9 and 33, the gear teeth disposed on the exposed portion 30*a*3 of the gear portion 30*a* face the rotational axis Ax1 of the drum 62 (rotational axis of the coupling portion 63*b*) Ax1. In FIG. 33, the axis Ax1 of the drum 62 is above the exposed portion 30*a*3 of the gear portion 30*a*.

In FIG. 9, at least a part of the gear portion 30*a* projects toward the driving side beyond the coupling projection 63*b* in the axial direction, so that the gear portion 30*a* overlaps the gear portion 81*a* of the drive transmission member 81 in the axial direction. And, a part of the gear portion 30*a* is exposed so as to face the axis Ax1 of the drum 62, and therefore, the gear portion 30*a* and the gear portion 81*a* of the drive transmission member 81 can come into contact with each other in the course of inserting the cartridge B into the apparatus main assembly A.

FIG. 33 shows a state in which the outer end portion 30*al* of the gear portion 30*a* is disposed on the arrow D1 side of the free end portion 63*b*1 of the coupling projection 63*b*. The arrow D1 extends toward the outside in the axial direction.

Because of the above-described arrangement relationship, the gear portion 30*a* of the developing roller gear 30 and the gear portion 81*a* of the drive transmission member 81 can be brought into meshing engagement with each other in the process of mounting the above-described cartridge B to the apparatus main assembly A.

Furthermore, in the mounting direction C of the cartridge B, the center (axis) of the gear portion 30*a* is disposed on the upstream side (the side of the arrow AO in FIG. 16) of the center (axis) of the drum 62.

The arrangement of the developing roller gear 30 will be described in more detail. As shown in FIG. 17 which is a sectional view as viewed from the non-driving side, the line connecting between the center of the drum 62 and the center of the charging roller 66 is defined as a reference line (starting line) providing the angle reference)(0°. At this time, the center (axis) of the developing roller gear 30 is in the angle range of 64° to 190° from the reference line to the downstream side of the rotational direction of the drum 62 (clockwise direction in FIG. 17).

Strictly speaking, the half line extending from the center of the drum 62 to the center of the charging roller 66 from the center of the drum 62 is taken as the starting line, and the rotational direction of the drum is taken as a positive direction of the angle. Then, the angle on the polar coordinate formed about the center of the developing roller satisfies the following relationship. 64°≤ angle on the polar coordinates having the center of developing roller≤190°.

There is a certain degree of latitude in the arrangement of the charging roller 66 and the arrangement of the developing roller gear 30. The angle when the charging roller 66 and the developing roller gear 30 are closest to each other is indicated by an arrow BM, and as described above, it is 64° in this embodiment. On the other hand, the angle when the two are most remote from each other is indicated by an arrow BN, which is 190° in this embodiment.

Furthermore, as described above, the unit (developing unit 20) provided with the developing roller gear 30 can move relative to the unit (cleaning unit 60) provided with the drum 62 and the coupling projection 63*b*. That is, The developing unit 20 is rotatable relative to the cleaning unit 60 about the development first support boss 26*a* and the second development support boss 23*b* (FIGS. 4, 5) as the rotation center (rotation axis). Therefore, the distance between the centers of the developing roller gear 30 and the drum 62 (the distance between the axes) is variable, and the developing roller gear 30 can move within a certain range relative to the axis of the drum 62 (the axis of the coupling projection 63*b*).

As shown in FIG. 9, when the gear portion 30*a* and the gear portion 81*a* contact each other during the process of inserting the cartridge B, the gear portion 30*a* is pushed by the gear portion 81*a* to be away from the axis of the drum 62 (the axis of the coupling projection 63*b*). This weakens the impact of the contact between the gear portion 30*a* and the gear portion 81*a*.

As shown in part (a) of FIG. 10 and part (b) of FIG. 10, the drum bearing 73 is provided with a portion 73*h* to be engaged (engaged portion) as a part to be positioned (axial aligned portion) in the longitudinal direction (axial direction).

The driving side plate 15 of the apparatus main assembly A has an engaging portion 15*j* which can engaged with the engaged portion 73*h*. The engaged portion 73*h* of the cartridge B is engaged with the engaging portion 15*j* of the apparatus main assembly An in the above-described mounting process, whereby the position, in the longitudinal direction (axial direction), of the cartridge B is determined, (Part (b) of FIG. 10). In addition, in this embodiment, the engaged portion 73*h* is in the form of a slit (groove) (part (b) of FIG. 1). This slit communicates with the space 87. That is, the slit (the fitted portion 73*h*) forms a space opened (open) to the space 87.

Referring to FIG. 33, the position of the engaged portion 73*h* will be described in detail. FIG. 33 is an illustration (schematic diagram) showing the arrangement of the engaged portion 73*h* with respect to the gear portion 30*a* or the coupling projection 63*b*. As shown in FIG. 33, the slit (engaged with portion 73*h*) is a space formed between two portions (the outer portion 73*h*1 and the inner portion 73*h*2 of the engaged portion 73*h*) arranged along the axial direction the. In the axial direction, the inner end portion (the inner portion 73*h*2) of the engaged portion 73*h* is disposed inside (on the arrow D2 side) the outer end portion 30*al* of the gear portion 30*a*. In the axial direction, the outer end portion (outer portion 73*h*1) of the fitted portion 73*h* is disposed on the side (arrow D1 side) outer than the free end portion 63*b* of the coupling projection 63*b*.

Next, the state of closing the door 13 will be described. As shown in part (a) of FIG. 8, part (b) of FIG. 8, part (a) of FIG. 11, part (b) of FIG. 11, the driving side plate 15 has an upper positioning portion 15*a*, A lower positioning portion 15*b*, and a rotation stopper portion 15*c*. As a positioning part, the non-driving side plate 16 has a positioning portion 16*a* and a rotation stopping portion 16*c*. The drum bearing 73 includes an upper portion to be positioned (positioned portion) (a first portion to be positioned (positioned portion), a first projection, a first projecting portion) 73*d*, a lower portion to be positioned (positioned portion) (a second portion to be positioned (positioned portion), a second projection, a second overhanging portion) 73*f*.

Also, the cartridge pressing members 1 and 2 are rotatably mounted to the opposite axial ends of the opening/closing door 13. The cartridge pressing springs 19, 21 are mounted to the opposite ends in the longitudinal direction of the front plate provided in the image forming apparatus A, respectively. The drum bearing 73 is provided with a portion 73*e* to be pressed (pressed portion) as the urging force receiving portion, and the cleaning frame 71 has a portion 710 to be pressed (pressed portion) on the non-driving side (FIG. 3). By closing the door 13, the pressed portions 73*e*, 710 of the cartridge B are pressed by the cartridge pressing members 1, 2 urged by the cartridge pressing springs 19, 21 of the apparatus main assembly A.

By this, on the drive side, the upper positioned member 73*d*, the lower positioned member 73*f*, and the rotation stopping member 73*c* of the cartridge B are contacted to the upper positioning portion 15*a*, the lower positioning portion 15*b*, the rotation stopping portion 15*c*, respectively. By this, cartridge B and drum 62 are positioned relative to each other on the driving side. Also, on the non-driving side, the to-be-positioned portion 71*d* of the cartridge B and the rotation-stopped portion 71 *g* come into contact with the positioning portion 16*a* and the rotation stopper portion 16*c* of the apparatus main assembly A, respectively. By this cartridge B and drum 62 are positioned with each other on the non-driving side.

As shown in parts (a) and part (b) of FIG. 1, the upper positioned member 73*d* and the lower positioned member 73*f* are placed in the neighborhood of the drum. Also, the upper positioned member 73*d* and the lower positioned member 73*f* are aligned along the rotational direction of the drum 62.

Also, in the drum bearing 73, it is necessary to secure a space (arcuate recess) 731 for disposing the transfer roller 7 (FIG. 11) between the upper positioned portion 73*d* and the lower positioned portion 73*f*. Therefore, the upper positioned portion 73*d* and the lower positioned portion 73*f* are arranged apart from each other.

Also, the upper positioned 73*d* and the lower positioned portion 73*f* are projections projecting inward in the axial direction from the drum bearing 73. As described above, it is necessary to secure a space 87 around the coupling projection 63*b*. Therefore, the upper positioning portion 73*d* and the lower positioning portion 73*f* do not project outward in the axial direction, but instead they project inward to secure the space 87.

The upper positioned portion 73*d* and the lower positioned portion 73*f* are projections arranged so as to partially cover the photosensitive drum 62. In other words, the positioned portions 73*d*, 73*f* are overhanging portions that project inward axial direction of the photosensitive drum 62. When the upper positioned portion 73*d* and the photosensitive drum 62 are projected on the axis of the drum 62, at least some of the projected areas of the upper positioned portion 73*d* and the photosensitive drum 62 overlap each other. In this regard, the lower positioned portion 73*f* is the same as the upper positioned portion 73*d*.

Also, the upper positioned portion 73*d* and the lower positioned portion 73*f* are disposed so as to partially cover the driving side drum flange 63 provided at the end of the photosensitive drum 62. When the upper positioned portion 73*d* and the driving side drum flange 63 are projected on the axis of the drum 62, at least parts of the projected areas of the upper positioned 73*d* and the driving side drum flange 63 overlap each other. In this regard, the lower positioned portion 73*f* is the same as the upper positioned portion 73*d*.

The pressed portions 73*e* and 710 are projecting portions of the frame of the cleaning unit arranged on one end side (drive side) and the other end side (non-drive side) of the cartridge B with respect to the longitudinal direction, respectively. Especially the pressed portion 73*e* is provided on the drum bearing 73. The pressed portions 73*e* and 710 project in a direction crossing the axial direction of the drum 62 and separating from the drum 62.

On the other hand, as shown in part (a) of FIG. 12 and part (b) of FIG. 12, the drive side drum flange 63 has a coupling projection 63*b* on the drive side, and the coupling projection 63*b* has a free end portion 63*b*1 at the free end thereof. The drive transmission member 81 has a coupling recess 81*b* and a free end portion 81*b*1 of the coupling recess 81*b* on the non-driving side. By closing the opening/closing door 13, the cylindrical cam 86 is rotated along the inclined surface portions 86*a*, 86*b* along the inclined surface portions 15*d*, 15*e* of the driving side plate 15 by way of the rotating cam link 85 (the side approaching the cartridge B). By this, the drive transmitting member 81 at the retracted position moves to the non-drive side (the side approaching the cartridge B) in the longitudinal direction by the drive transmission member spring 84. Since the gear teeth of the gear portion 81*a* and the gear portion 30*a* are inclined with respect to the moving direction of the drive transmission member 81, the gear teeth of the gear portion 81*a* abuts to the gear teeth of the gear portion 30*a* by the movement of the drive transmission member 81. At this point of time, the movement of the drive transmission member 81 to the non-drive side is stopped.

Even after the drive transmission member 81 stops, the cylindrical cam 86 further moves to the non-drive side, and the drive transmission member 81 and the cylindrical cam 86 are separated.

Next, as shown in part (a) of FIG. 1 and FIG. 13, FIG. 18, the drum bearing 73 has a recess bottom surface 73*i*. The drive transmitting member 81 has a bottom portion 81*b*2 as a positioning on the bottom of the coupling recess 81*b*. The coupling recess 81*b* of the drive transmission member 81 is a hole having a substantially triangular cross section. As viewed from the non-driving side (the cartridge side, the opening side of the recessed portion 81*b*), the coupling recessed portion 81*b* is twisted in the counterclockwise direction N as it goes to the driving side (the back side of the recessed portion 81*b*). The gear portion 81*a* of the drive transmission member 81 is a helical gear including gear teeth twisted in the counterclockwise direction N as approaching to the drive side as viewed from the non-drive side (cartridge side). In other words, the coupling recess portion 81*b* and the gear portion 81*a* are inclined toward the rear end (fixed end 81*c*) of the drive transmission member 81 in a direction opposite to the rotational direction CW of the drive transmission member 81 (twisting).

The gear portion 81*a* and the coupling recess portion 81*b* are arranged on the axis of the drive transmission member 81 such that the axis of the gear portion 81*a* and the axis of the coupling recess portion 81*b* overlap each other. In other words the gear portion 81*a* and the coupling recess portion 81*b* are arranged coaxially (concentrically).

Figure 37:
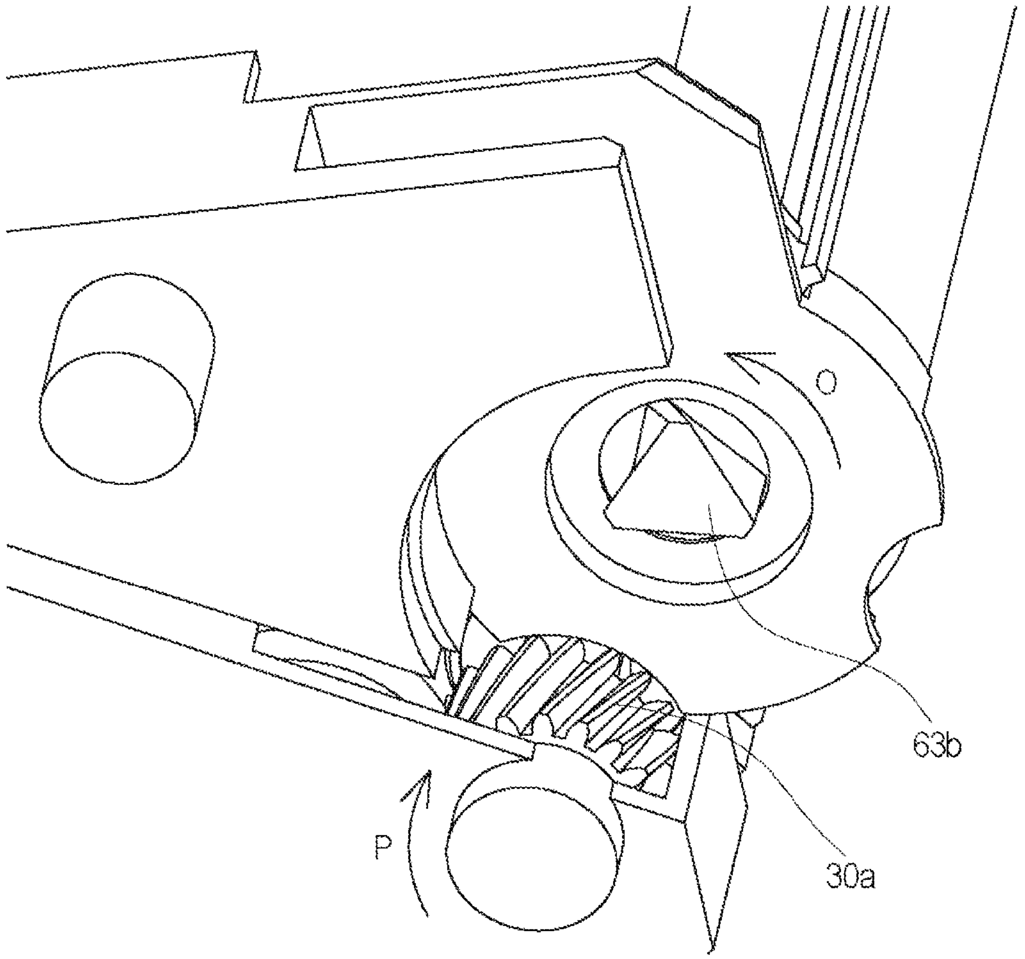
FIG. 37 is a perspective view illustrating a gear portion and a coupling portion in Embodiment 1.

The coupling projection 63*b* of the driving side drum flange 63 has a substantially triangular cross-section and has a projection shape (protrusion, projection). The coupling projection 63*b* is twisted in the counterclockwise direction O from the drive side (the tip side of the coupling projection 63*b*) toward the non-drive side (the bottom side of the coupling projection 63*b*) (FIG. 37). In other words, the coupling projection 63*b* is inclined (twisted) in the counterclockwise direction (the direction of rotation of the drum) as it is distant from the outside toward the inside of the cartridge in the axial direction.

Furthermore, in the coupling projection 63*b*, the portion (ridge line) forming the corner (the apex of the triangle) of the triangular prism is a driving force receiving portion which actually receives the driving force from the coupling recess portion 81*b*. The driving force receiving portion is inclined in the rotational direction of the drum as goes inward from the outside of the cartridge in the axial direction. Also, the inner surface (inner peripheral surface) of the coupling recessed portion 81*b* serves as a driving force applying portion for applying the driving force to the coupling projection 63*b*.

Figure 19:
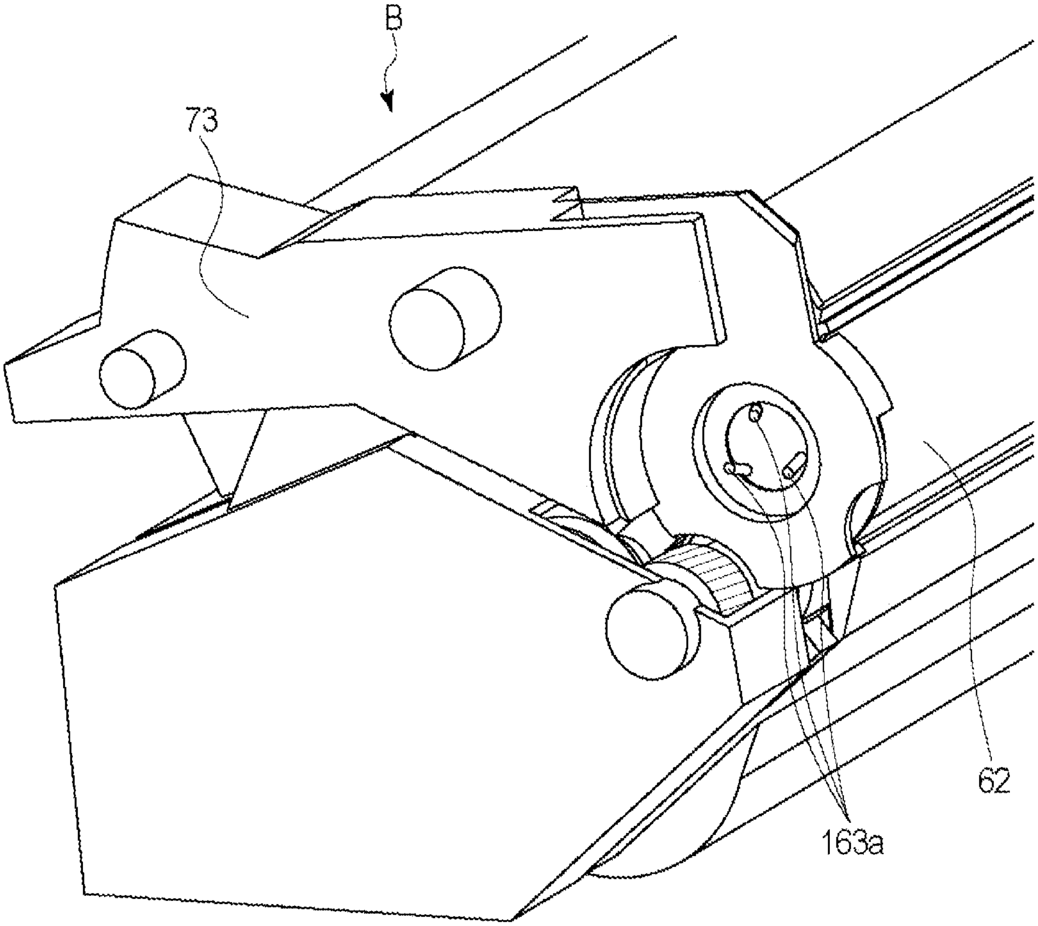
FIG. 19 is a perspective view of a drive transmitting portion of a process cartridge according to Embodiment 1.

Furthermore, the shape of the cross-section of the coupling projection 63*b* and the coupling recess portion 81*b* is not a strict triangle (polygon) because of the corners being beveled or rounded, but it is called a substantial triangle (polygon). In other words, the coupling projection 63*b* has a shape of substantially twisted triangular prism (polygonal prism). However, the shape of the coupling projection 63*b* is not limited to such a shape. The shape of the coupling projection 63*b* may be changed if it can be coupled with the coupling recess 81*b*, that is, if it can be engaged therewith and driven thereby. For example, three bosses 163*a* may be arranged at the apexes of the triangle shape, in which each boss 163*a* is twisted with respect to the axial direction of the drum 62 (FIG. 19).

The gear portion 30*a* of the developing roller gear 30 is a helical gear and has a shape twisted (inclined) in the clockwise direction P from the drive side toward the non-drive side (FIG. 37). In other words, the gear tooth (helical tooth) of the gear portion 30*a* is inclined in the clockwise direction P (the direction of rotation of the developing roller or the developing roller gear) in the axial direction of the gear portion 30*a* from the outside toward the inside of the cartridge (twisted). That is, the gear 30*a* is inclined (twisted) in the direction opposite to the rotational direction of the drum 62 as goes from the outside toward the inside in the axial direction.

As shown in FIG. 13, the drive transmission member 81 is rotated by the motor (not shown) in the clockwise direction CW (reverse direction of arrow N in FIG. 13) as viewed from the non-drive side (cartridge side). Then, thrust force (force generated in the axial direction) is generated by meshing engagement between the helical teeth of the gear portion 81*a* of the drive transmission member 81 and the gear portion 30*a* of the developing roller gear 30. The force FA in the axial direction (longitudinal direction) is applied to the drive transmission member 81, and the drive transmission member 81 tends to move toward the non-drive side (closer to the cartridge) in the longitudinal direction. In other words, the drive transmission member 81 approaches and contacts to the coupling projection 63*b*.

In particular, in this embodiment, the gear portion 81*a* of the drive transmission member 81 has a tooth helicity so as to move by 5 to 8.7 mm per tooth in the axial direction (FIG. 13). This corresponds to the helix angle of the gear portion 81*a* being 15° to 30°. Further, the helix angle of the developing roller gear 30 (the gear portion 30*a*) is also 15° to 30°. In this embodiment, 20° is selected as the helix angle between the gear portion 81*a* and the gear portion 30*a*.

Then, when the phases of the triangular portions of the coupling recess portion 81*b* and the coupling projection 63*b* are matched by rotation of the drive transmission member 81, the coupling projection 63*b* and the coupling recess portion 81*b* are engaged (coupled) with each other.

Then, when the projection 63*b* and the coupling recess portion 81*b* are engaged, an additional thrust force FC is produced because both the coupling recess portion 81*b* and the coupling projection 63*b* are twisted (inclined) with respect to the axis.

That is, a force FC directed toward the non-driving side in the longitudinal direction (the side approaching the cartridge) is applied to the drive transmitting member 81. This force FC and the above-described force FA together make the drive transmission member 81 move further in the longitudinal direction toward the non-drive side (approaching the cartridge). In other words, the coupling projection 63 brings the driving transmission member 81 close to the coupling projection 63*b* of the cartridge B.

The drive transmission member 81 attracted by the coupling projection 63*b* is positioned in the longitudinal direction (axial direction) by the free end portion 81*b*1 of the drive transmission member 81 contacting the recess bottom surface 73*i* of the drum bearing 73.

Also, a reaction force FB of the force FC acts on the drum 62, and due to this reaction force (against force) FB, the drum 62 moves in the longitudinal direction toward the drive side (approaching the drive transmission member 81, the outside of the cartridge B). In other words the drum 62 and the coupling projection 63*b* are attracted toward the side of the drive transmission member 81. By this, the free end portion 63*b*1 of coupling projection 63*b* of the drum 62 abuts against bottom 81*b*2 of coupling recess 81*b*. By this, the drum 62 is also positioned in the axial direction (longitudinal direction).

That is, the coupling projection 63*b* and the coupling recess portion 81*b* are attracted toward each other, whereby the positions of the drum 62 and the drive transmission member 81 in the axial direction are determined.

In this state, the drive transmission member 81 is in the driving position. In other words, the drive transmission member 81 is in a position for transmitting the driving force to the coupling projection 63*b* and the gear portion 30*b*, respectively.

Also, the position of the center at the free end portion of the drive transmission member 81 is determined relative to the drive side drum flange 63 by the triangular alignment action of the coupling recess 81*b*. In other words, the drive transmission member 81 is aligned with the drum flange 63, and the drive transmission member 81 and the photosensitive member are coaxial. By this, the drive is transmitted from the drive transmission member 81 to the developing roller gear 30 and the driving side drum flange 63 with high accuracy. The coupling recessed portion 81*b* and the coupling projection portion 63*b* engaging with the coupling recessed portion 81*b* can also be regarded as an aligning portion. That is, the engagement between the coupling recess 81*b* and the coupling projection 63*b* causes the drive transmission member 81 and the drum to be coaxial with each other. Especially, the coupling recessed portion 81*b* is referred to as the main assembly side aligning portion (the aligning portion on the image forming apparatus side), and the coupling projecting portion 63*b* is referred to as the cartridge side aligning portion.

As explained above, the engagement of the coupling is assisted by the force FA and force FC acting on the drive transmission member 81 toward the non-drive side.

Also, by positioning the drive transmission member 81 by the drum bearing (bearing member) 73 provided in the cartridge B, it possible to improve the positional accuracy of the drive transmission member 81 relative to the cartridge B.

The positional accuracy in the longitudinal direction between the gear portion 30*a* of the developing roller gear 30 and the gear portion 81*a* of the drive transmission member 81 is improved, and therefore, the width of the gear portion 30*a* of the developing roller gear 30 can be reduced. It is possible to downsize the cartridge B and the apparatus main assembly A for mounting the cartridge B.

In summary of this embodiment, the gear portion 81*a* of the drive transmission member 81 and the gear portion 30*a* of the developing roller gear 30 have helical teeth. The helix teeth provide higher contact ratios of the gears than the spur teeth. By this, the rotation accuracy of the developing roller 30 is improved and the developing roller 30 rotates smoothly.

Also, the direction in which the helical teeth of the gear portion 30*a* and the gear portion 81*a* are inclined is selected so that the force (force FA and force FB) that the gear portion 30*a* and the gear portion 81*a* attract to each other is produced. In other words, by rotating in a state in which the gear portion 30*a* and the gear portion 81*a* mesh with each other, the coupling recess portion 81*b* provided in the drive transmission member 81 and the coupling provided in the end portion of the photosensitive drum 62A force that brings the projection portion 63*b* closer to each other is generated. By this, the drive transmitting member 81 moves toward the cartridge B side, and the coupling recessed portion 81*b* approaches the coupling projecting portion 63*b*. This will assist coupling (coupling) between the coupling recess 81*b* and the coupling projection 63*b*. In other words, by the rotation in a state in which the gear portion 30*a* and the gear portion 81*a* are in meshing engagement with each other, a force is produced such that the coupling recess portion 81*b* provided in the drive transmission member 81 and the projection portion 63*b* provided in the end portion of the photosensitive drum 62 come closer to each other is produced. By this, the drive transmitting member 81 moves toward the cartridge B side, and the coupling recessed portion 81*b* approaches to the coupling projecting portion 63*b*. This assists coupling between the coupling recess 81*b* and the coupling projection 63*b*.

Figure 38:
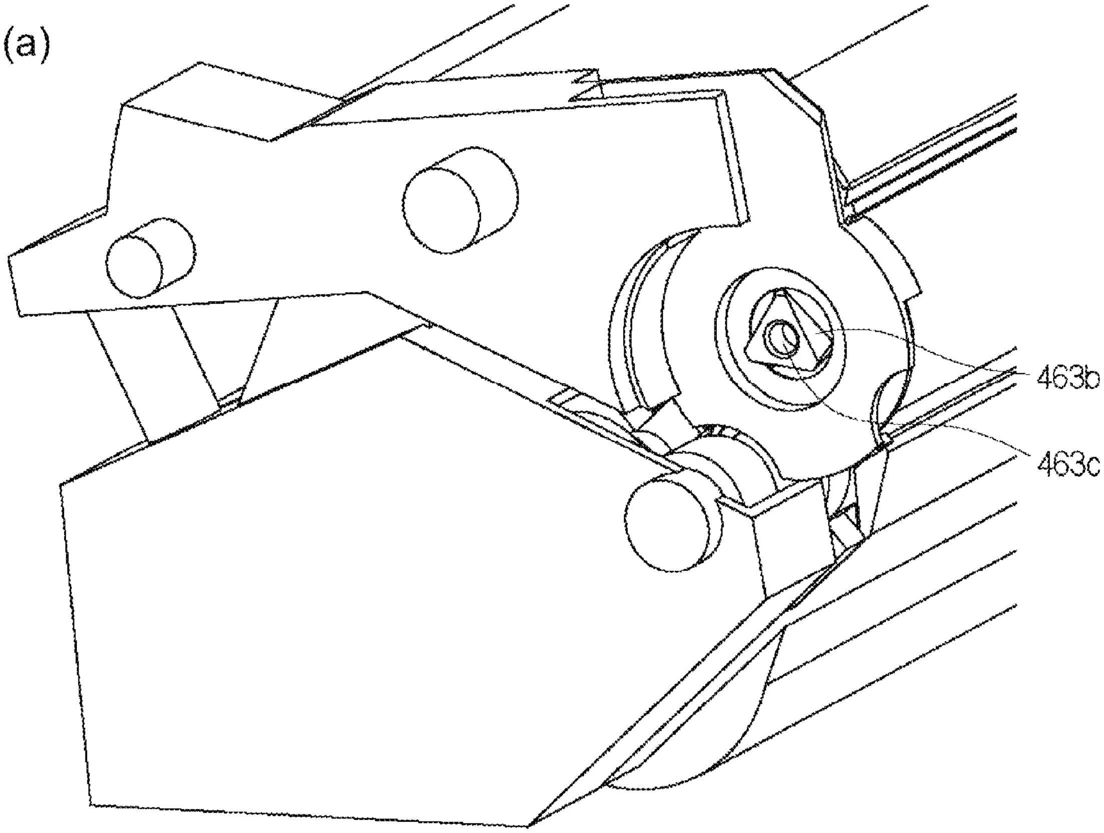
FIG. 38 is a perspective view illustrating a modification of Embodiment 1.
Figure 38:
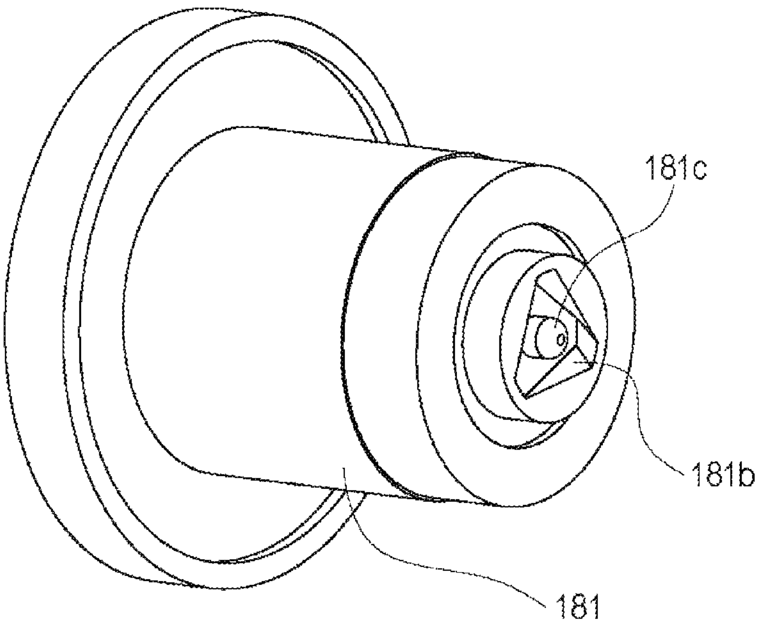

Also, the direction in which the coupling projection 63*b* (driving force receiving portion) is inclined with respect to the axis of the drum and the direction in which the helical teeth of the gear portion 30*a* of the developing roller gear 30 is inclined with respect to the axis of the gear portion 30*a* are opposite to each other (FIG. 38). By this, not only by the force generated by the engagement (meshing engagement) of the gear portion 30*a* and the gear portion 81*a* but also by the force (coupling force) generated by engagement (coupling engagement) of the coupling projection 63*b* and the coupling recess portion 81*b*), The movement of the drive transmission member 81 is assisted. In other words, by the rotation of the coupling projection 63*b* and coupling recess 81*b* in the coupled state with each other, the coupling projection 63*b* and coupling recess 81*b* are attracted to each other. As a result, the coupling projection 63*b* and the coupling recess 81*b* stably engage (couple) with each other.

The drive transmission member 81 is urged toward the coupling projection 63*b* by the elastic member (drive transmission member spring 84) (part (a) of FIG. 7). According to this embodiment, the force of the drive transmission member spring 84 can be reduced, correspondingly to the force FA and the force FC (part (b) of FIG. 13). Then, the frictional force between the drive transmission member spring 84 and the drive transmission member 81, which is produced when the drive transmission member 81 rotates, is also reduced, and therefore, the torque required to rotate the drive transmission member 81 is reduced. Additionally, the load applied to the motor for rotating the drive transmission member 81 can also be reduced. Also, sliding noise produced between the drive transmission member 81 and the drive transmission member spring 84 can also be reduced.

Furthermore, in this embodiment, the drive transmission member 81 is biased by the elastic member (spring 84), but the elastic member is not necessarily required. In other words, if the gear portion 81*a* and the gear portion 30*a* at least partly overlap in the axial direction, and the gear portion 81*a* and the gear portion 30*a* mesh with each other when the cartridges are mounted on the device main assembly, the elastic member can be eliminated. In other words in this case, when the gear portion 81*a* rotates, the force of attracting the coupling projection portion 63*b* and the coupling recess portion 81*b* to each other is produced by the engagement between the gear portion 81*a* and the gear portion 30*a*. That is, even if there is no elastic member (spring 84), the drive transmission member 81 approaches to the cartridge B due to the force generated by the meshing engagement between the gears. This established engagement of the coupling recess 81*b* with the coupling projection 63*b*.

In the absence of such an elastic member, the frictional force between the elastic member and the drive transmission member 81 is not produced, and therefore, the rotational torque of the drive transmission member 81 further decreases. Also, it is possible to eliminate the sound generated by sliding motion between the drive transmission member 81 and the elastic member. Also, it is possible to reduce the number of parts of the image forming apparatus, and therefore, it is possible to simplify the structure of the image forming apparatus and to reduce the cost.

Also, the coupling projection 63*b* of the drive side drum flange 63 couples with the recess 81*b* of the drive transmission member 81 in the state that the drive transmission member 81 is rotating. Here, the coupling projection 63*b* is inclined (twisted) in the rotational direction of the photosensitive drum toward the inside from the outside of the cartridge with respect to the axial direction of the drum 62. In other words the coupling projection 63*b* is inclined (twisted) along the rotational direction of the drive transmission member 81, and therefore, the coupling projection 63*b* is easy to be coupled with the rotating recess portion 81*b*.

Figure 21:
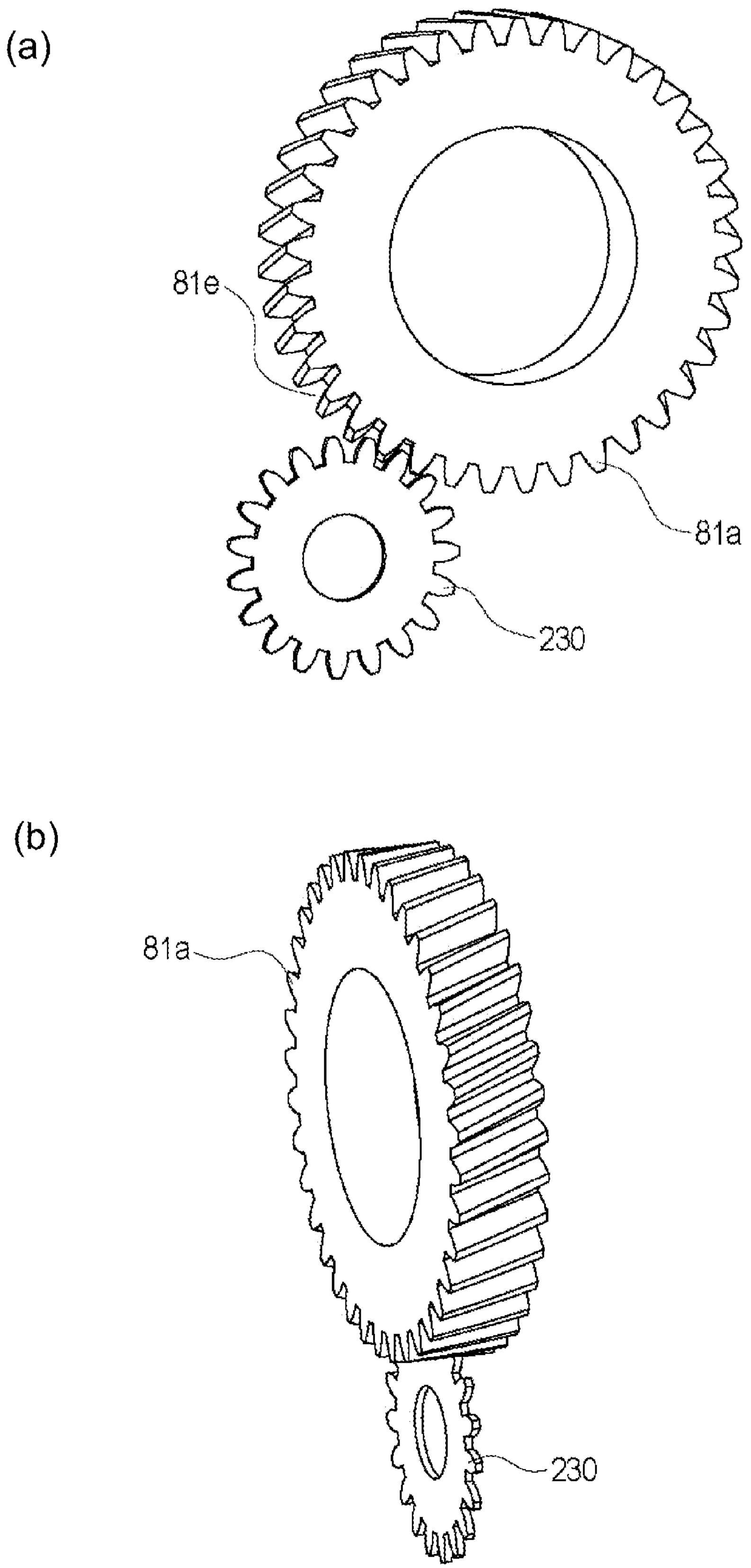
FIG. 21 is a perspective view of a developing roller gear of the process cartridge according to Embodiment 1.

Furthermore, in this embodiment, the helical gear is used as the developing roller gear 30 that engages with the drive transmission member 81. However, another gear may be used as long as drive transmission is possible. For example, a thin spur tooth gear 230 that can enter the tooth gap 81*e* of the drive transmission member 81 is usable. The thickness of the flat teeth is set to 1 mm or less. Also in this case, the gear portion 81*a* of the drive transmission member 81 has helical teeth, and therefore, the force for directing the drive transmission member 81 toward the non-driving side is produced by the meshing engagement between the gear portion 81*a* and the spur gear 230 (FIG. 21).

Furthermore, in this embodiment, as shown in parts (a) and part (b) of FIG. 1, as the cartridge B is viewed from the driving side, the coupling projection 63*b* (drum 62) rotates in the counterclockwise direction O, so that the developing roller gear 30 (the developing roller 32) rotates in the clockwise direction P.

However, it is also possible to employ a structure in which as viewing the cartridge B from the non-driving side, the coupling projection 63*b* (drum 62) rotates in the counterclockwise direction and the developing roller gear 30 (the developing roller 32) rotates in the clockwise direction. In other words, the layout of the main assembly A and cartridge B may be modified to make the directions of rotation of the coupling projection 63*b* (drum 62) and the developing roller gear 30 opposite to those in this embodiment. In any case, as viewing the coupling projection 63*b* and the developing roller gear 30 in the same direction, the coupling projection 63*b* and the developing roller gear 30 rotate in opposite directions. One of them rotates clockwise and the other rotates counterclockwise.

In other words, as the cartridge B is viewed in such a direction that the direction of rotation of the coupling projection 63*b* becomes counterclockwise (in this embodiment, the cartridge B is viewed from the driving side), the direction of the rotation of the developing roller gear 30 is clockwise.

Furthermore, in this embodiment, the developing roller gear 30 is used as the driving input gear engaging with the driving transmission member 81, but another gear may be used as the driving input gear.

Figure 22:
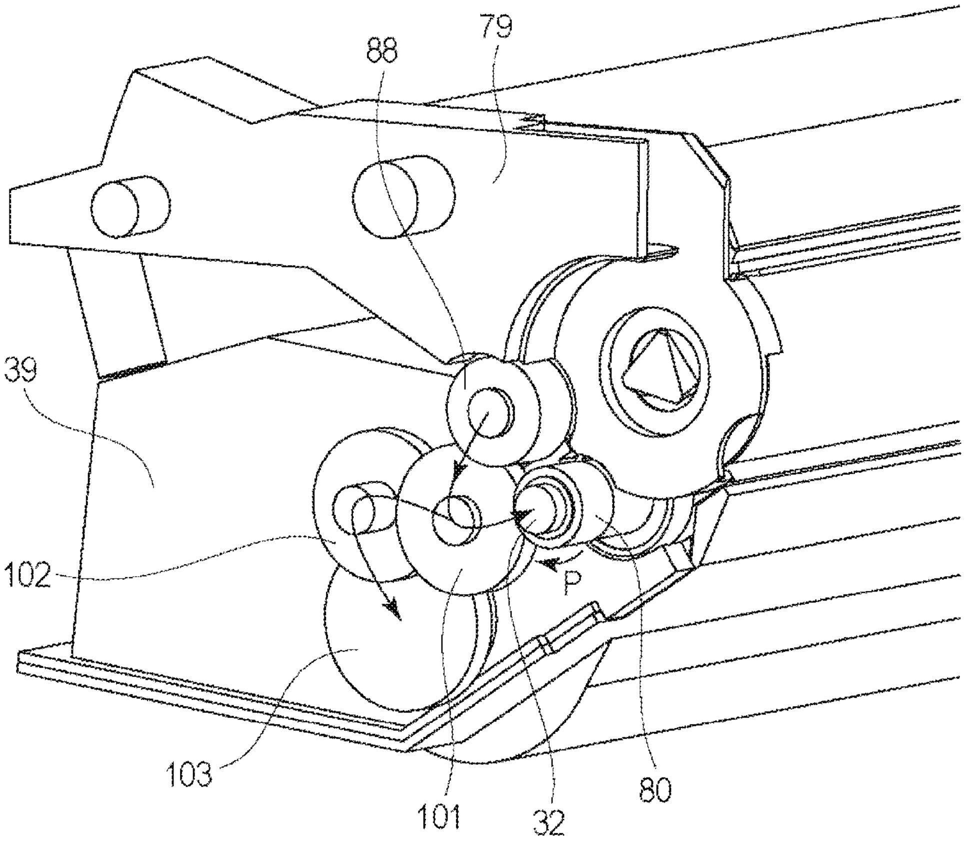
FIG. 22 is an illustration of a drive train of a process cartridge according to Embodiment 1.

FIG. 22 shows the drive input gear 88 that meshes with the drive transmission member 81, the developing roller gear 80 provided on the developing roller, the idler gears 101 and 102, and the feeding gear (stirring gear, developer feeding gear) 103.

In FIG. 22, the driving force is transmitted from the driving input gear 88 to the developing roller gear 80 by way of one idler gear 101. The idler gear 101 and the developing roller gear 80 are a drive transmission mechanism (a cartridge side drive transmission mechanism, a development side drive transmission mechanism) for transmitting a driving force from the drive input gear 88 to the developing roller 32.

On the other hand, the idler gear 102 is a gear for transmitting the driving force from the drive input gear 88 to the stirring gear 103. The feeding gear 103 is mounted to the feeding member 43 (FIG. 3), and the feeding member 43 is rotated by the driving force received by the feeding gear 103.

Furthermore, it is also possible to use a plurality of gears for transmitting the driving force between the driving input gear 88 and the developing roller gear 80. At this time, in order to set the rotational direction of the developing roller 32 in the direction of the arrow P (FIG. 1), it is preferable to make the number of idler gears transmitting the driving force between the driving input gear 88 and the developing roller gear 80 odd. In FIG. 22, to simplify the structure of the gear train, one structure of the idler gear is shown.

Furthermore, in other words regarding the number of gears, in order to provided the rotational direction of the developing roller 32 in the direction of the arrow P (FIG. 1) and to transmit the driving to the developing roller 32, the cartridge B is provided with an odd number of gears. In the structure shown in FIG. 22, the number of gears for transmitting the drive to the developing roller 32 is three, that is, the developing roller gear 80, the idler gear 101, and the driving input gear 88. On the other hand, in the structure shown in FIG. 1, the number of gears for transmitting the drive to the developing roller 32 is one, that is, only the developing roller gears 32.

In other words, it will suffice if the cartridge B is provided with a drive transmission mechanism (a cartridge side drive transmission mechanism, a development side drive transmission mechanism) for rotating the developing roller 32 in the same rotational direction as the drive input gear 88.

That is, as viewing the cartridge B in such a direction that the rotational direction of the driving input gear 88 becomes clockwise, the rotational direction of the developing roller 32 also rotates clockwise. In the structure shown in FIG. 22, the rotational directions of the drive input gear 88 and the developing roller 32 are clockwise when the cartridge B is viewed from the driving side.

Furthermore, in the case of the structure shown in FIG. 1 or the structure shown in FIG. 22, the drive input gear (30, 88) is driven from the drive transmission member 81 independently from the coupling projection 63*b* "I" receive power. In other words, the cartridge B has two input portions (drive input portions) for receiving driving force from the outside of cartridge B (that is, apparatus main assembly A), one for the cleaning unit, and one for the developing unit.

In the structure in which the photosensitive drum (cleaning unit) and the developing roller (developing unit) independently receive drive force from the drive transmission member 81, there is an advantage that the stability of rotation of the photosensitive drum is enhanced. This is because there is no need to transmit the driving force (rotational force) between the photosensitive drum and another member (developing roller, for example), and therefore, when rotation unevenness occurs this different member (developing roller, for example), its rotation unevenness is less likely to affect the rotation of the photosensitive drum.

Also, in the structure of FIG. 22, the force in the direction of the arrow FA (part (b) in FIG. 13) is applied to the drive transmission member 81 to assist the coupling of the coupling recess portion 81*b* and the coupling projection 63*b*. For this, a load (torque) needs to be generated when the drive input gear 88 rotates. To say conversely, as long as a load is generated to rotate the drive input gear 88, the drive input gear 88 may not be constituted so as to receive the driving force for rotating the developing roller 32.

For example, the driving force received by the driving input gear 88 may be transmitted only to the feeding member 43 (FIG. 3) without being transmitted to the developing roller 32. However, in the case of such a structure with a cartridge including the developing roller 32, it is necessary to separately transmit the driving force to the developing roller 32. For example, a gear or the like for transmitting the driving force from the drum 62 to the developing roller 32 is required for the cartridge B.

<Coupling Engagement Condition>

Figure 24:
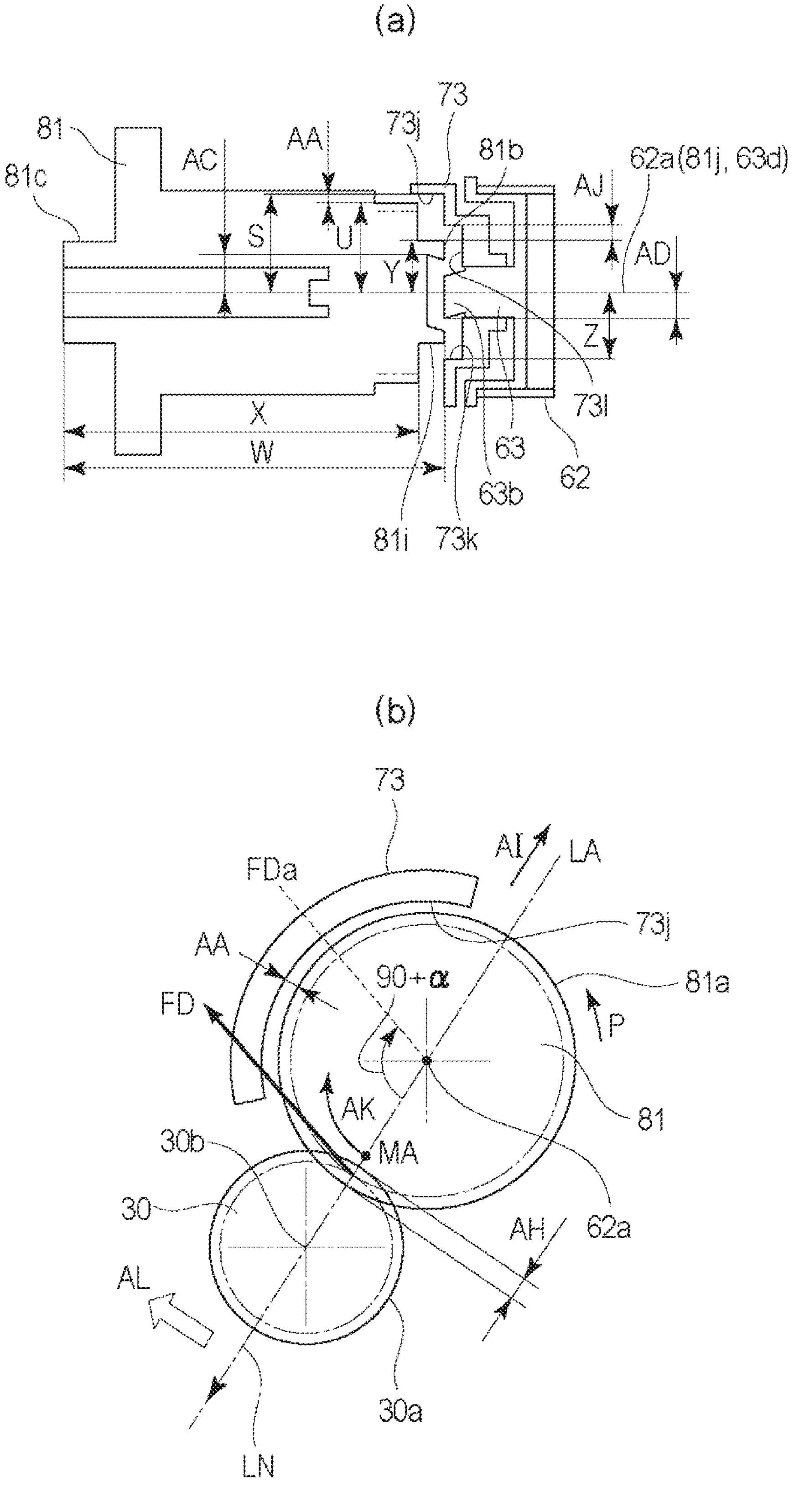
FIG. 24 is an illustration of the regulating portion of the electrophotographic image forming apparatus according to Embodiment 1.
Figure 25:
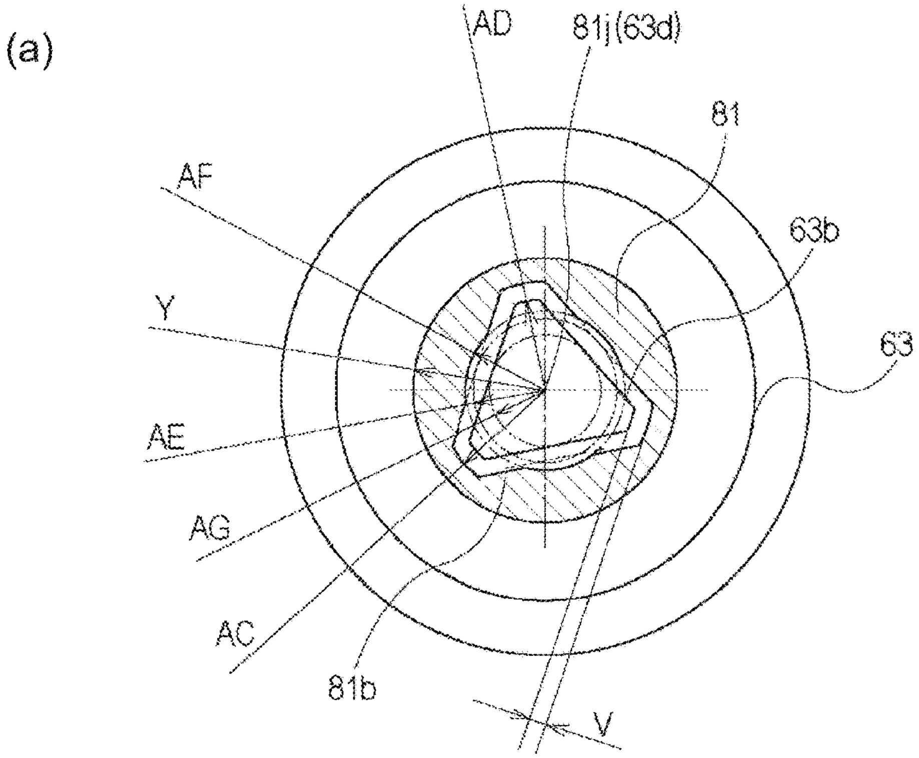
FIG. 25 is a cross-sectional view of the drive transmitting portion of the process cartridge according to Embodiment 1.
Figure 25:
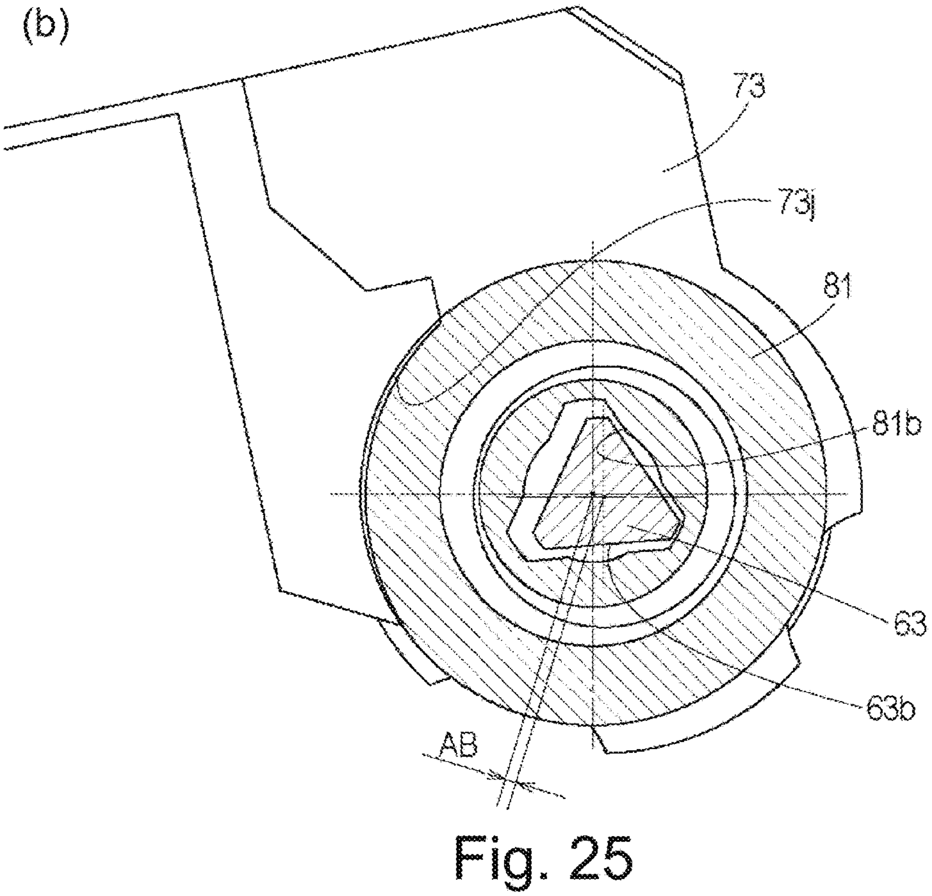
Figure 27:
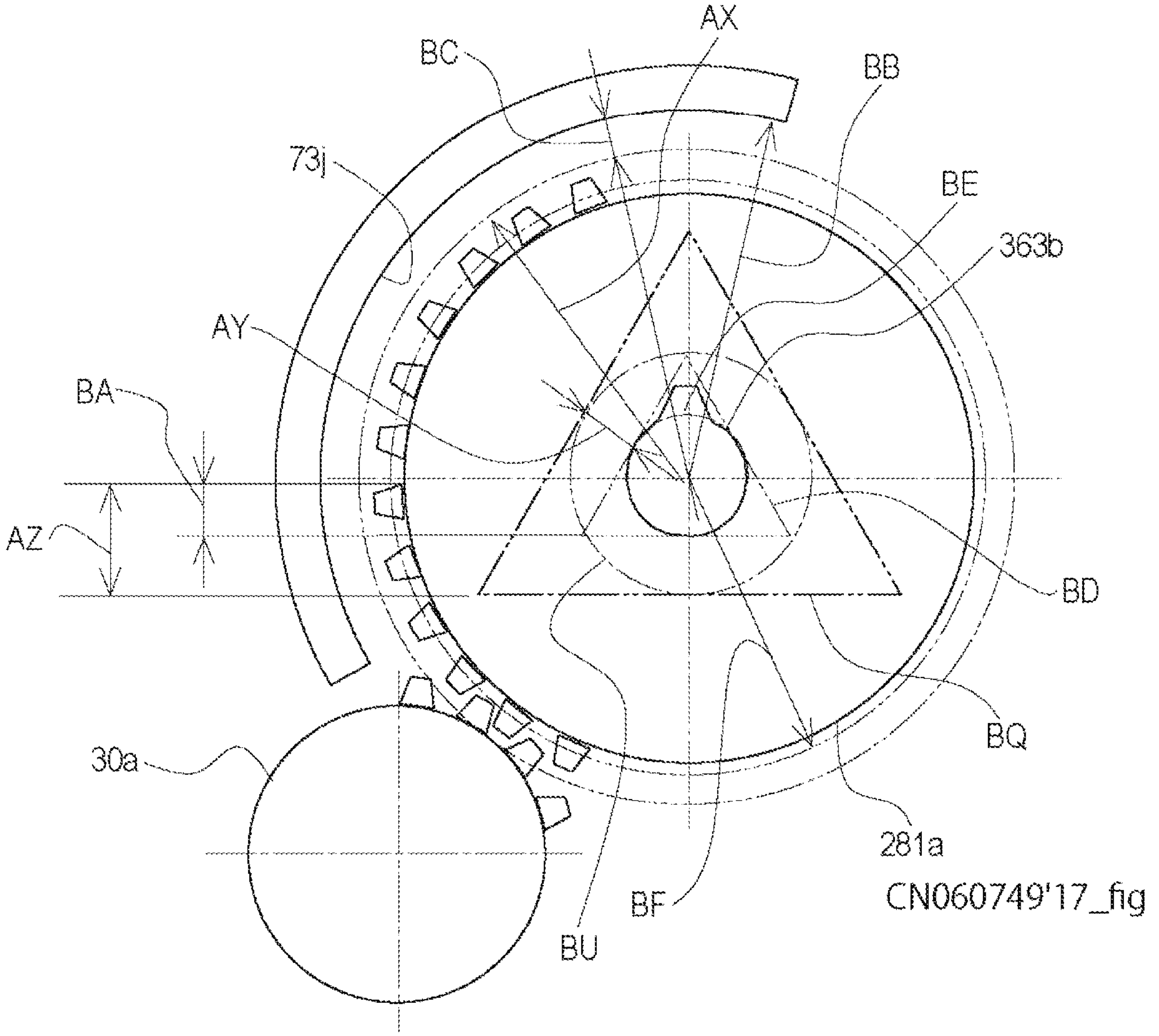
FIG. 27 is an illustration of the regulating portion of the electrophotographic image forming apparatus according to Embodiment 1.

Next, referring to FIG. 1, part (a) of FIG. 18, part (b) of FIG. 24, part (a) of FIG. 25, and part (b) of 25 and FIG. 27, the conditions under which the coupling engages will be described. The part (a) of FIG. 24 is a cross-sectional view of the image forming apparatus drive portion as viewed from the direction opposite to the mounting direction of the cartridge B in order to explain the distance of the drive transmitting portion. Part (b) of FIG. 24 is a cross-sectional view of the image forming apparatus drive portion as viewed from the drive side for explaining a distance of the drive transmitting portion. Part (a) of FIG. 25 is a cross-sectional view of the image forming apparatus drive portion as viewed from the drive side for explaining a gap of the coupling portion. Part (b) of FIG. 25 is a cross-sectional view of the image forming apparatus drive portion as viewed from the drive side for explaining the gap of the coupling portion. FIG. 27 is a sectional view of the image forming apparatus for explaining the range of a regulating portion (stopper) as viewed from the drive side.

As shown in parts (a) of FIG. 1 and FIG. 24 and part (b) of FIG. 24, the drum bearing 73 is provided with an inclination regulating portion (movement regulating portion, position regulating portion, stopper) 73*j* for regulating the movement of the drive transmission member 81 to restrict (suppress) the inclination of the drive transmission member 81

The drive transmission member 81 has a cylindrical portion 81*i* (part (a) of FIG. 24) on the non-driving side (the side close to the cartridge B). The cylindrical portion 81*i* is a cylindrical portion (projection) in which the coupling recess 81*b* is formed.

As described above, at the stage when the drive transmission member 81 starts to rotate, the gear portion 81*a* of the drive transmission member 81 and the gear portion 30*a* of the developing roller gear 30 mesh with each other, as shown in FIG. 9. On the other hand, the coupling recess 81*b* and the coupling projection 63*b* are not coupled, or the coupling therebetween is insufficient. Therefore, when the gear portion 81*a* transmits the driving force to the gear portion 30*a*, the meshing force FD (part (b) of FIG. 24) is generated in the gear portion 81*a* by the engagement between the gears.

By the meshing force FD applied to the drive transmission member 81, the drive transmission member 81 is inclined. That is, as described above, only the fixed end 81*c* (see the part (a) of FIG. 24: the end far from the cartridge B) of the drive transmission member 81 which is the end portion on the drive side is supported, and therefore, the drive transmission member 81 is inclined with the drive side end portion 81*c* (fixed end) as a fulcrum. Then, the end (free end, tip) of the drive transmission member 81 on the side where the coupling recess 81*b* is provided moves.

If the drive transmission member 81 is significantly inclined, the coupling recess 81*b* cannot be coupled with the coupling projection 63*b*. In order to avoid this, the restricting portion 73*j* is provided in the cartridge B, so that the inclination of the drive transmitting member 81 is restricted (regulated) within a certain range. That is, when the drive transmission member 81 is inclined, the restriction portion 73*j* supports the drive transmission member 81, thereby suppressing the inclination thereof from increasing.

The regulating portion 73*j* of the drum bearing 73 has an arcuate curved surface portion provided so as to face the axis of the drum 62 (the axis of the coupling projection 63*b*). The restricting portion 73*j* can also be regarded as a projecting portion projecting so as to cover the drum axis. The structure is such that between the regulating portion 73*i* and the drum axis, there is provided a space in which the constituent elements of the process cartridge B are not disposed, and the drive transmission member 81 is disposed in this space. The regulating portion 73*i* faces the space 87 shown in FIG. 1, and the regulating portion 73*i* forms an edge (outer edge) of the space 87.

The restricting portion 73*j* is disposed at a position where to suppress the movement (inclination) of the drive transmission member 81 by the meshing force FD can be suppressed.

The direction in which the meshing force FD is produced is determined by a transverse pressure angle α of the gear portion 81*a* (that is, the transverse pressure angle α of the developing roller gear 30). The direction in which the meshing force FD is generated is inclined relative to the direction (half line) LN extending from the center 62*a* of the photosensitive drum (that is, the center of the drive transmission member 81) toward the center 30*b* of the developing roller gear 30 by (90+α) degrees toward the upstream AK in the rotational direction of the photosensitive drum 62.

In the twist angle helical gear with a helix angle of 20°, the standard angle α is 21.2°. The transverse pressure angles α of the gear portion 81*a* and the gear portion 30*a* of this embodiment are also 21.2°. In this case, the inclination of the meshing force FD relative to the arrow LN is 111.2°. However, another value can be used as the transverse pressure angles of the gear portion 81*a* and the gear portion 30*a* can be employed, and the direction of the meshing force FD is also different in that case. The transverse pressure angle α also varies depending on the twist angle of the helical gear, and the transverse pressure angle α is preferably 20.6 degrees or more and 22.8 degrees or less.

In part (b) of FIG. 24, when the half straight line FDa extending in the same direction as the direction of the meshing force FD is extended with the center 62*a* of the photosensitive drum as the start point, the restricting portion 73*j* is disposed so as to cross the half line FDa. Here, the half line FDa is a line provided by inclining (rotating) the half line LN by 90+α degree toward the upstream side with respect to the rotational direction of the drum 62 with the center of the drum 62 as the origin (axis, fulcrum). In this embodiment, the half line FDa is inclined by 111.2 degrees relative to the half straight line LN.

It is not always necessary that the regulating portion 73*j* is disposed on this line FDa, and the regulating portion 73*j* is preferably disposed adjacent to the half line FDa. More specifically, it is desirable that at least a part of the regulating portion 73*j* is disposed somewhere in the range of plus or minus 15° with respect to the half line FDa. The half line FDa is a line obtained by rotating the half straight line LN toward the upstream side in the rotational direction of the drum 62 by (90+α) degrees. Therefore, the regulating portion 73*j* is preferably in the range of (75+α) degrees to (105+α) degrees on the upstream side in the drum rotational direction with respect to the half straight line LN with the center of the drum 62 as the origin. Considering that the preferable value of the transverse pressure angle α is 20.6 degrees or more and 22.8 degrees or less, the preferable range in which the restricting portion 73*j* is disposed is 95.6 degrees or more and 127.8 degrees or less with respect to the half line LN. In this embodiment, the transverse pressure angle α is 21.2 degrees, and therefore, the preferable range of the regulating portion 73*j* is 96.2 degrees or more and 126.2 degrees or less.

Figure 26:
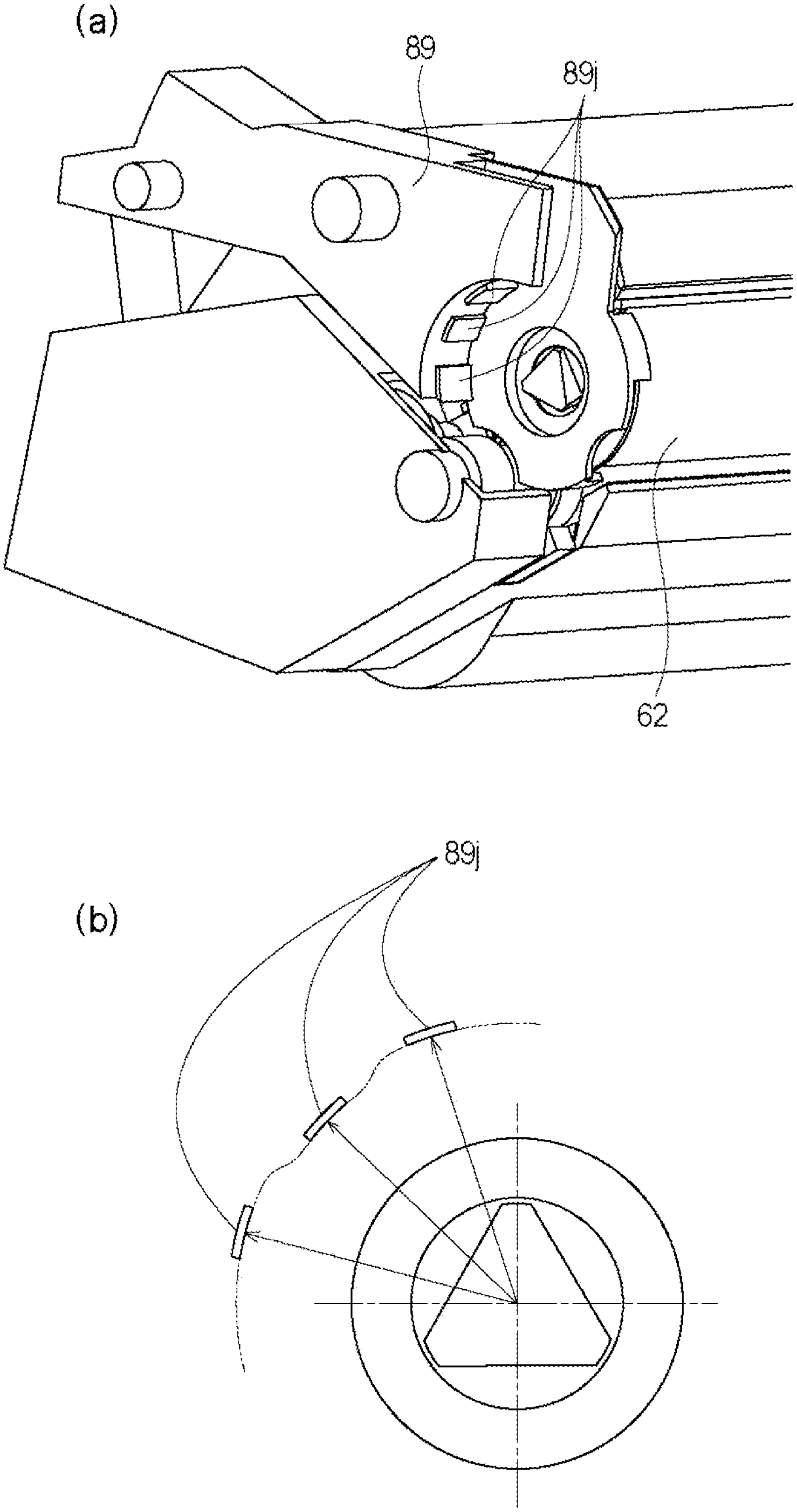
FIG. 26 is a perspective view of the regulating portion of the process cartridge according to Embodiment 1.

As another example of the preferable arrangement of the regulating portion 73*j*, a plurality of regulating portions 73*j* may be provided so that they are disposed separately on respective sides of the half line FDa with half line FDa interposed therebetween (FIG. 26). In this case, too, the restricting portion 73*j* can be regarded as being disposed across the line FDa.

Further, it is preferable that the regulating portion 73*j* is disposed on the upstream side AO (FIG. 16) of the center (axis) of the coupling projection 63*b* in the cartridge mounting direction C (part (a) of FIG. 11). This is to prevent the restriction portion 73*j* from hindering the mounting of the cartridge B.

A range (region) in which the regulating portion 73*j* is disposed in the drum bearing 73 can also be described as follows.

In a plane perpendicular to the axis of the drum 62 (part (b) of FIG. 24), a straight line LA passing through the center 62*a* of the drum 62 and the center 30*b* of the developing roller gear 30 is drawn. At this time, the restricting portion 73*j* is arranged on the side where the charging roller is disposed with respect to the straight line LA (that is, the side indicated by the arrow AL).

Alternatively, the restricting portion 73*j* is disposed in a region AL opposite to the side where the drum 62 is exposed (the side where the drum 62 faces the transfer roller 7) with respect to the line LA passing through the drum center 62*a* and the gear center 30*b*. Here, prior to mounting the cartridge B in the apparatus main assembly A, a cover or a shutter for covering the drum 62 may be provided in the cartridge B, and the drum 62 may not be exposed. In such a case, however, the side where the drum 62 is exposed means the side where the drum 62 is exposed when the cover, the shutter, and so on are removed.

Further, in the plane perpendicular to the axis of the photosensitive drum 62, the range (region AL) in which the regulating portion 73*j* is arranged can also be described as follows, using the circumferential direction (rotational direction) of the photosensitive drum 62.

A half line (original line) LN extending from the center 62*a* of the drum 62 toward the center 30*b* of the gear portion 30*a* of the developing roller gear 30 is drawn. The region AL is a range (region) that is larger than 0° and does not exceed 180° toward the upstream side (arrow AK side) in the drum rotation direction with respect to the half line LN.

Further in other words, the range AL is in the upstream side (arrow AK side), with respect to the drum rotation direction O, of the center point MA between the drum center 62*a* and the developing roller gear center 3 *b* and is does not exceed a straight line (extension line) LA passing through the center 6 *a* of the drum 62 and the center 30*b* of the gear portion 30*a* of the developing roller gear 30

Figure 34:
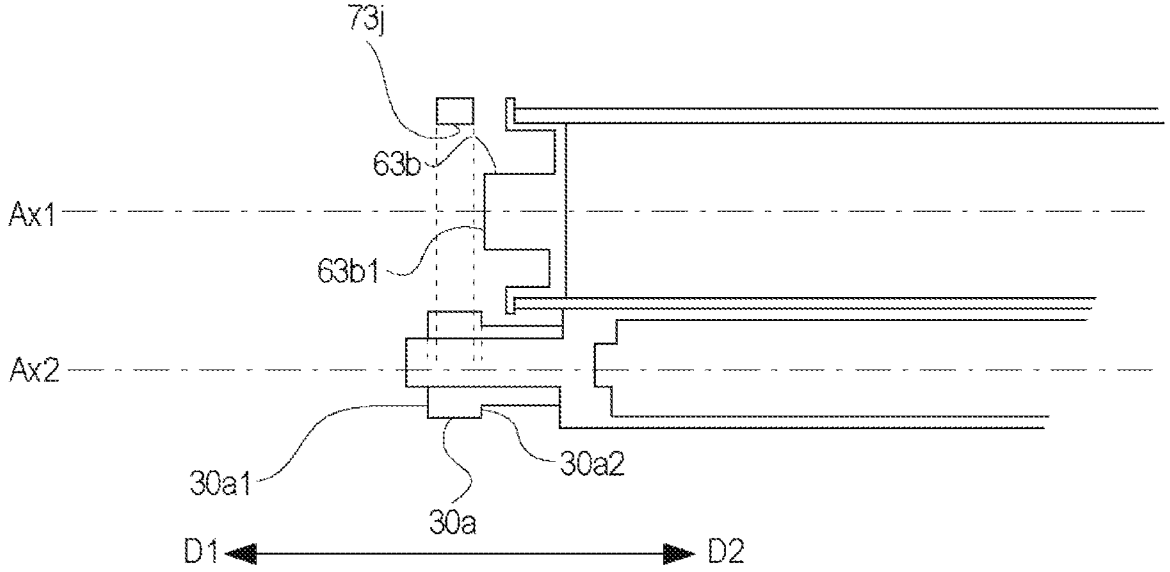
FIG. 34 is an illustration of the process cartridge according to Embodiment 1.

Further, in a state in which the opening/closing door 13 is opened and the drive transmitting member 81 is moved to the driving side, the regulating portion 73*j* is in a position overlapping the gear portion 81*a* of the drive transmission member 81 in the longitudinal direction. That is, the regulating portion 73*j* also overlaps the developing roller gear 30 in the longitudinal direction. As shown in FIG. 34, when the developing roller gear 30 and the regulating portion 73*j* are projected on the axis line Ax2 of the developing roller gear 30, at least parts of their projected regions overlap each other. That is, the regulating portion 73*j* is close to the gear portion 81*a* (the gear portion 30*a*) where the meshing force is produced. Therefore, when the meshing force received by the drive transmission member 81 is supported by the restricting portion 73*j*, bending of the drive transmission member 81 is suppressed.

Also, in the axial direction, at least a part of the restricting portion 73*j* is on the outer side (arrow D1 side in FIG. 34) of the coupling projection 63*b*.

Next, the radial position of the regulating portion 73*j* with reference to the drum 62 will be described (part (a) of FIG. 24).

The distances shown below are those (distances in the radial direction of the drum 62) measured along a direction perpendicular to the axial direction of the drum 62. Let S be the distance from the axis (center 62*a*) of the drum 62 to the regulating portion 73*j*. Let U be the radius of the tooth tip of the gear portion 81*a* of the drive transmission member 81. Let AC be the distance from the center 81*j* of the drive transmission member 81 to the radially outermost portion of the coupling recess. Let AD be the distance from the center 63*d* of the driving side drum flange 63 to the radially outermost portion of the coupling projection 63*b*. Let AA be the distance between the regulating portion 73*j* and the tooth tip of the gear portion 81*a* of the drive transmission member 81. And, let AB be an amount of deviation between the center of the coupling projection 63*b* and the center of the coupling recess 81*b* when the drive transmission member 81 is inclined by the amount of the gap relative to the regulating portion 73*j* (when the drive transmission member 81 is inclined and the gear portion 81*a* is in contact with the regulating portion 73*j*) (part (b) of FIG. 25).

Then, a gap AA between the gear portion 81*a* of the drive transmission member 81 and the regulating portion 73*j* of the drum bearing 73 is as follows.

$$AA=S-U$$

In the following description, the distance is measured along the axial direction of the drive transmission member 81 from the fixed end 81*c* which is the fulcrum of the inclination of the drive transmission member 81. Let X be the distance in the axial direction from one end portion 81*c* of the drive transmission member 81 to the gear portion 81*a*. In addition, let W be the distance in the axial direction from one end portion 81*c* of the drive transmission member 81 to the coupling recessed portion 81*b*.

The distance X and the distance W satisfy W>X.

Therefore, the misalignment amount AB between the regulating portion 73*j* and the gear portion 81*a* at the time when the drive transmission member 81 is inclined by the clearance AA is longer than the gap AA and is as follows.

$$AB = AAX(W/X)$$

Also, let V be the gap between the coupling projection 63*b* of the drive side drum flange 63 and the coupling recess 81*a* of the drive transmission member 81 in a state that there is no misalignment. Here, the gap V is the smallest value among the inter-surface distances of the two coupling portions (the distance measured along the direction perpendicular to the axis of the drum 62 and the radial distance).

In the state that the phases between the triangular shapes of the couplings are aligned, the shortest gap V is as follows.

$$V = AC - AD$$

In order for the coupling to engage even if the drive transmission member 81 is inclined by the clearance AA and the misalignment of the misalignment amount AB occurs between the couplings, the clearance V between the couplings may satisfy the following.

$$V = AC - AD > AB$$

That is, if the misalignment amount AB is smaller than the shortest gap V between the coupling projection 63*b* and the coupling recess portion 81*b*, the coupling projection 63*b* and the coupling recess portion 81*b* can tolerate the misalignment amount AB and are engaged.

If the phase of the coupling recess 81*b* with respect to the coupling projection 63*b* is different, the shortest gap V between the coupling portions also is different. That is, if the phases of the coupling portions are not aligned, the shortest clearance V between the coupling projection 63*b* and the coupling recess portion 81*b* is smaller than (AC-AD). The gap V may be smaller than the misalignment amount AB, depending on the cases.

However, if there is at least one phase relationship satisfying "V>AB" between the two coupling portions, the coupling projection 63*b* and the coupling recess portion 81*b* are engaged. This is because the coupling recess 81*b* contacts the coupling projection 63*b* while rotating. It can be engaged (coupled) with the coupling projection 63*b* at the timing when the coupling recess 81*b* is rotated to such an angle as to satisfy "V>AB".

Further, as measuring the distance S from the center 62*a* of the drum 62 to the regulating portion 73*i* along the radial direction of the drum 62, $$S = AA + U$$

Substituting "AB=AA×(W/X)" and "AA=S−U" for "V>AB"

$$V > (S - U) \times (W/X)$$

It will suffice if there is at least one phase relationship between the coupling projection 63*b* and the coupling recess 81*b* that satisfies this formula.

Further, the above equation is further modified and the condition of the distance S is as follows.

$$S < U + V \times (X/W)$$

In addition, it is preferable that when the drive transmission member 81 rotates, the restriction portion 73*j* does not contact the gear portion 81*a*, and therefore, it is preferable that the regulating portion 73*j* is separated from the tooth tip of the gear portion 81*a*. This is expressed as follows:

$$S > U$$

Together with the above relational expression, $$U < S < U + V \times (X/W)$$

If the cross sectional shape of the coupling projection 63*b* and the cross sectional shape of the coupling recess 81*b* are substantially equilateral triangles as in this embodiment, the clearance V is maximized when the phases of the coupling portions are aligned. By substituting the value of V at this time into the above expression, the necessary S range is obtained.

The operation when the coupling engages will be described. Before the coupling recess 81*b* of the drive transmission member 81 and the coupling projection 63*b* of the drive side drum flange 63 are engaged with each other, the meshing force FD is applied to the drive transmission member 81. The meshing force FD is the force produced by the engagement between the gear portion 81*a* of the drive transmission member 81 and the gear portion 30*a* of the developing roller gear 30 as described above.

By the meshing force FD, the drive transmission member 81 is inclined with the drive transmission member bearing 83 as a fulcrum, in the direction FD in which the meshing force is applied, by the amount of the gap AA between the regulating portion 73*j* of the drum bearing 73 and the gear portion 81*a*. The misalignment AB of the coupling recess 81*b* and the coupling projection 63*b* provided by this inclination is smaller than the gap V between the coupling recess 81*b* and the coupling projection 63*b* in a predetermined phase. By this, when the drive transmission member 81 rotates, and the triangle phases of the coupling recess portion 81*b* and the coupling projection 63*b* become aligned with each other, the end surfaces of the couplings do not interfere with each other, so that the coupling recess portion 81*b* fits around the coupling projection 63*b*, and they are engaged with each other.

Here, an example of dimensions in which the above conditional expression is satisfied when the radius of the drum 62 is 12 mm will be described below.

In this embodiment, the dimensions of each part of the drive transmission member 81 applicable to the drum 62 having a radius of 12 mm are as follows. The distance AC from the center of the coupling recess 81*b* to the apex of the substantially equilateral triangular shape of the coupling recess 81*b* is 6.5 mm and the radius AE of the inscribed circle of substantially equilateral triangle shape of the coupling recess 81*b* is 4.65 mm. The substantially equilateral triangle shape of the coupling recess 81*b* is not a strictly equilateral triangle but its apex (corner) is beveled into an arc shape. The radius AF of the lightening portion 81*b*3 of the coupling recess portion is 4.8 mm, the radius U of the tip circle of the gear portion 81*a* of the coupling recess portion is 12.715 mm, the distance X from the one end portion 81*c* to the non-driving side end surface 81*al* is 30.25 mm, and the distance W from the one end portion 81*c* to the free end portion 81*b*1 of the coupling recess is 33.25 mm.

The shortest distance V between the coupling recess 81*b* and the coupling projection 63*b* satisfies the following relationship.

$$0 < V < 1.7$$

The lower limit of V occurs when the size of the triangular shape of the coupling recessed portion 81*b* is equal to the size of the triangular shape of the coupling projection 63*b*, and the lower limit value of V is "0". On the other hand, the upper limit of V occurs when the distance AC from the center of the coupling projection 63*b* to the apex is 4.8 mm which is the radius AF of the lightening portion of the coupling recess 81*b*. At this time, the clearance V (mm) between the coupling projection 63*b* and the coupling recess 81*b* is obtained as "1.7=6.5-4.8".

Substituting each value and V=1.7 into the formula "U<S<U+V×(X/W)" previously given, $$\text{“}12.715 < S < 14.262\text{” (unit is mm).}$$

It will be confirmed that the above is satisfied, using two examples, in the following.

First, in the first example, the dimensions are shown when the coupling projection 63*b* is made as large as possible within a range capable of engaging with the coupling recess 81*b*. At this time, the clearance V between the coupling projection 63*b* and the coupling recess 81*b* is minimum, and therefore, the allowable inclination of the drive transmission member 81 is small. Therefore, in order to reduce the inclination of the drive transmission member 81, it is necessary to make the regulating portion 73*j* closer to the regular position of the gear portion 81*a*.

On the other hand, in the second example, the dimensions are shown when the coupling projection 63*b* is made as small as possible within the range capable of engaging with the coupling recess 81*b*. At this time, the gap V between the coupling projection 63*b* and the coupling recess portion 81*b* is maximized, and therefore, even if the drive transmission member 81 is relatively greatly inclined, the coupling projection 63*b* and the coupling recess 81*b* can engage with each other. That is, the regulating portion 73*j* can relatively tolerate the inclination of the drive transmission member 81, and therefore, the regulating portion 73*j* can be relatively greatly spaced apart from the regular position of the gear portion 81*a*.

In the first example, the size of the coupling projection 63*b* is closest to the maximum and the radial direction amount of engagement between the coupling projection 63*b* and the coupling recess 81*b* (the region where both are engaged) is maximized. At this time, V (gap between couplings) approaches to the lower limit (minimum), and therefore, S (the distance from the center of the drum 62 to the regulating portion 73*j*) needs to approach to the lower limit (12.715 mm).

The distance AD from the center of the coupling projection 63*b* of the driving side drum flange 63 to the apex thereof is 6.498 mm. As described above, when the coupling projection 63*b* has a dimension slightly smaller than the distance 6.5 mm from the center of the coupling recess 81*b* to the apex of the triangle, the amount of radial direction amount of engagement between the coupling portions is substantially maximum. The radius AG of the inscribed circle inscribed in a triangle constituting the coupling projection 63*b* of the driving side drum flange 63 is 4.648 mm. Here, the substantially triangular shape possessed by the coupling projection 63*b* is not a strictly equilateral triangle but an apex (corner) is beveled into an arc shape.

At this time, the distance S from the center 62*a* of the drum 62 to the regulating portion 73*j* of the drum bearing is 12.716 mm which is slightly larger than the radius U of the addendum circle of the gear portion 81*a*.

By this, the clearance AA between the regulating portion 73*j* of the drum bearing and the gear portion 81*a* of the drive transmission member is 0.001 mm (=12.716−12.715). Here, the misalignment amount AB between the coupling portions when the drive transmission member 81 is inclined by the gap AA relatively to the regulating portion 73*j* is amplified by the difference between the positions of the regulating portion 73*j* and the coupling portion in the longitudinal direction. The misalignment amount AB is 0.0011 mm (=0.001×33.25/30.25). In addition, the shortest gap V between the coupling projection 63*b* and the coupling recess 81*b* when the phases of the coupling portions are aligned is 0.002 mm ("6.5−6.498" or "4.65−4.648", whichever is smaller). Therefore, even if the drive transmission member 81 is inclined due to the meshing force, the gap V between the couplings is larger than the misalignment AB between the coupling portions, so that the engagement is possible.

As can be understood from the above description, the radial distance from the center of the drum 62 to the outermost portion of the coupling portion is preferably larger than 4.8 mm, and the radial distance from the center of the drum 62 to the regulating portion 73*j* is preferably larger than 12.715 mm.

In the second example, as described above, the size of the coupling projection 63*b* is made as small as possible and the radial amount of engagement between the coupling projection 61*b* and the coupling recess 81*b* (the region where both are engaged) is made as small as possible. At this time, V (gap between couplings) approaches the maximum (upper limit) and S (distance from the center of the drum 62 to the regulating portion 73*j*) can be close to the upper limit.

The distance AD between the center of the coupling projection 63*b* of the drive side drum flange 63 and the apex is 4.801 mm. This is a value slightly larger than the radius of 4.8 mm of the lightening 81*b*3 of the coupling recess 81*b* and is a diameter at which the amount of radial direction engagement between the couplings is almost minimum. If the distance AD of the coupling projection 63*b* is shorter than the radius of the lightening portion 81*b*3, the tip of the projection 63*b* does not engage with the coupling recess 81*b* with the result that the drive transmission is disabled.

At this time, the radius AG of the triangle inscribed circle of the coupling projection 63*b* is 2.951 mm.

The distance S between the center 62*a* of the drum 62 and the regulating portion 73*j* of the drum bearing is 14.259 mm.

As a result, the gap AA between the regulating portion 73*j* of the drum bearing 73 and the gear portion 81*a* of the drive transmission member 81 is 1.544 mm (=14.259−12.715). Here, the misalignment amount AB between the coupling portions when the drive transmission member 81 is inclined by the amount of the gap AA relative to the regulating portion 73*j* is amplified due to the positional difference in the longitudinal direction between the regulating portion 73*j* and the coupling portion, and it is 1.697 mm (=1.544×33.25/30 0.25). In addition, the gap V between the coupling projection 63*b* and the coupling recess 81*b* when the phases of the coupling portions is in alignment with each other is 1.699 mm ("6.5−4.801" or "4.65−2.951, whichever is the smaller).

Therefore, even if the drive transmission member 81 is inclined by the engagement force FD, the gap V between the couplings is larger than the misalignment AB between the coupling portions, so that the coupling projection 63*b* and the coupling recess 81*b* can be engaged.

As will be understood from the second example, it is preferable that the radial distance from the center of the drum 62 to the outermost portion of the coupling projection 63*b* is larger than 4.8 mm, and the radial distance from the center of the drum 62 to the restricting portion 73*j* is smaller than 14.262 mm.

In summary of the first and second examples, in this embodiment, the radial distance S from the center 62*a* of the drum 62 to the regulating portion 73*j* of the drum bearing is preferably larger than 12.715 mm and smaller than 14.262 mm.

Next, the case where the coupling projection 363*b* having a more general shape is used without limiting the shape of the coupling projection to a substantially regular triangle is taken as an example, and a preferable arrangement regarding the restricting portion 73*j* will be described as general. Here, the shape of the coupling recess is assumed to be a virtually strict equilateral triangle for the sake of convenience of explanation.

Figure 28:
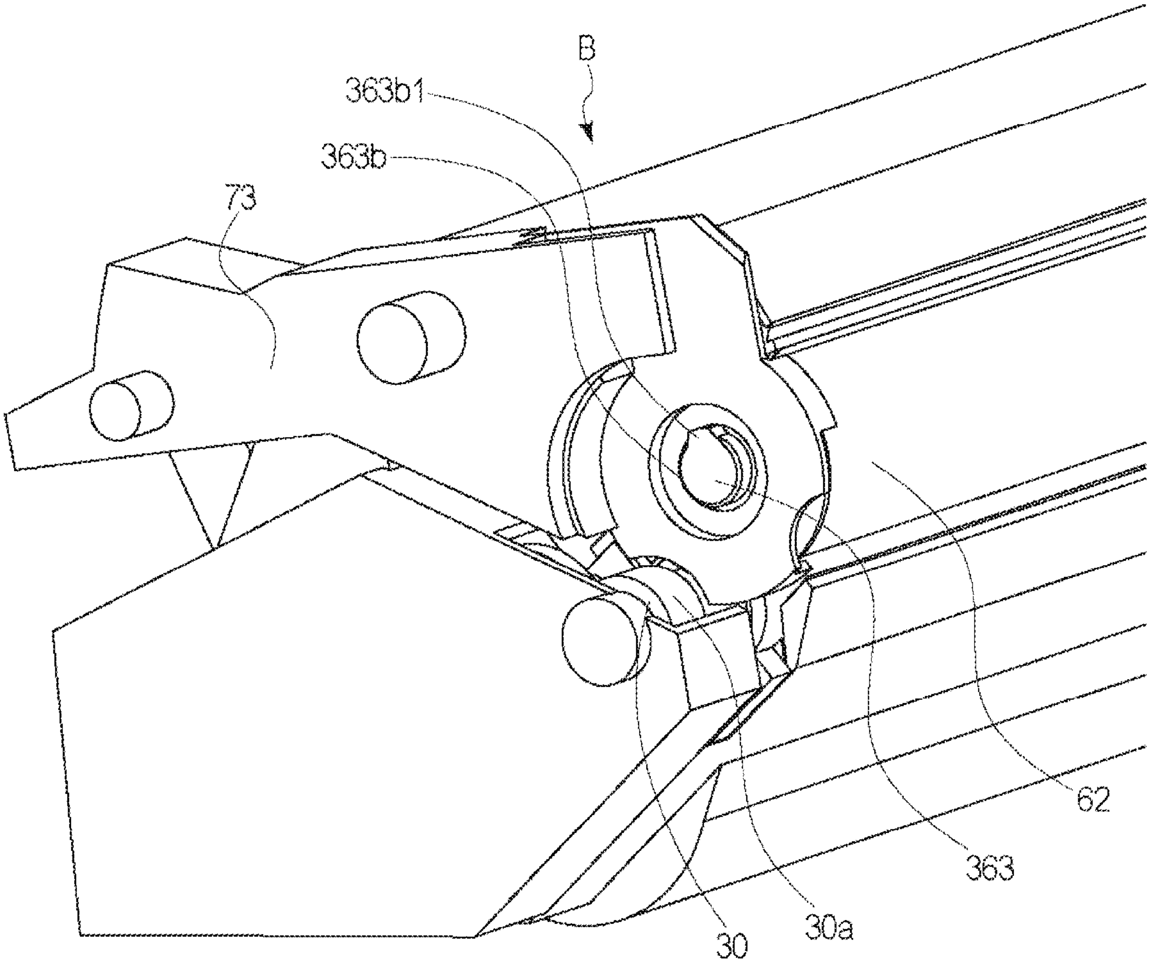
FIG. 28 is an illustration of the drive transmitting portion of the electrophotographic image forming apparatus according to Embodiment 1.

First, an example of a coupling projection including a general shape is shown in parts (a) and part (b) of FIG. 28. The coupling projection 363*b* shown in parts (a) and part (b) of FIG. 28 has a substantially cylindrical shape and further has a projection 363*b*1 provided on the outer periphery of the column. The coupling projection 363*b* receives the driving force by the projection 363*b*1.

Referring to FIG. 27, the case where the regulating portion is located most remote from the center of the drum will be described.

First, the minimum equilateral triangle BD circumscribing the coupling projection 363*b* is considered, and this regular triangle BD as a virtual coupling projection. Here, the center of gravity of the equilateral triangle BD is made to coincide with the center of the coupling projection 363*b* (the center of the drum 62), and the size of the equilateral triangle BD is minimized. After that, the arrangement of the restricting portion 73*j* corresponding to this virtual coupling projection (equilateral triangle DB) will be considered.

A circle inscribed in the imaginary coupling projection (regular triangle BD) is a circle BE, and the radius thereof is BA.

When the coupling recess has an equilateral triangular shape, the coupling recess needs to be larger than the equilateral triangle BD in order for the coupling recess to engage the imaginary coupling projection (equilateral triangle BD). That is, the size of the equilateral triangle BD can also be deemed as being the lower limit of the size that the coupling recess can have.

Next, the maximum shape that the coupling recess can have will be considered. First, the circle BU circumscribing the imaginary coupling projection (equilateral triangle BD) is considered, and the radius thereof is AZ. And, an equilateral triangle BQ having this circle BU as the inscribed circle is drawn. When the coupling recess has the shape of an equilateral triangle, the equilateral triangle BQ is the maximum (upper limit) of the equilateral triangle shape that can be selected as the coupling recess. If the coupling recess becomes larger than the equilateral triangle BQ, the coupling recess cannot contact with the imaginary coupling projection BD, and therefore, the drive transmission is impossible. This equilateral triangle BQ is taken as the maximum coupling recess.

Let AY be the shortest distance between the equilateral triangles when these two equilateral triangles BD and BQ are in the same phase. Distance AY corresponds to the difference between the radius (AZ) of the inscribed circle BU inscribed in the equilateral triangle BQ and the radius (BA) of the inscribed circle BE inscribed in the equilateral triangle BD.

That is, $$AY = AZ - BA$$

When the coupling recess is an equilateral triangle, the distance between the imaginary coupling projection and the coupling recess is the above-mentioned distance AY as the upper limit. If the misalignment distance of the coupling recess with respect to the virtual coupling projection is smaller than AY, the coupling recess can be engaged with the imaginary coupling projection.

The misalignment distance between the couplings is equal to or larger than the gap BC between the tooth tip of the gear portion 81*a* of the drive transmission member and the regulating portion 73*j*. Therefore, in order for the coupling recess to engage with the imaginary coupling projection BD, the gap BC between the gear portion 81*a* of the drive transmission member and the restricting portion 73*j* needs to be at least smaller than the distance AY. This is shown in the formula, $$BC < AY$$

The gap BC is the difference between the distance BB from the drum center to the regulating portion 73*j* and the radius of the addendum circle of the gear portion 81*a*. As for the radius of the addendum circle of the gear portion 81*a*, the tooth tip of the gear portion 81*a* of the drive transmission member can extend to the tooth bottom of the gear portion 30*a* of the developing roller gear 30. That is, the tooth tip of the gear portion 81*a* can be extended to such an extent that it does not reach the tooth bottom. If the shortest distance from the drum center to the bottom of the developing roller gear 30*a* is AX, the upper limit of the radius of the addendum circle 81*a* of the gear portion 81*a* is also AX.

Therefore, the gap BC between the tooth tip of the gear portion 81*a* and the regulating portion 73*j* is always larger than "BB-AX", that is, $$BC > BB - AX$$

The distance BB from the center of the drum to the restricting portion 73*j* using the relational expression of "BC>BB−AX" and the aforementioned "BC<AY" satisfies the following conditions:

$$BB - AX < AY$$

$$BB < AY + AX$$

Here, $$AY = AZ - BA = BA(1/\sin 30^\circ - 1) = BA$$

Therefore, $$BB < BA + AX$$

As a condition necessary for the coupling to engage when the drive transmission member 81 is inclined by the meshing force between the gears, "BB<BA+AX" can be obtained with respect to the distance BB from the drum center of the regulating portion 73*j*.

Next, the case where the regulating portion is positioned closest to the center of the drum will be described. In order for the gear portion 81*a* of the drive transmission member 81 to mesh with the gear portion 30*a*, the radius of the addendum circle of the gear portion 81*a* is required to be larger than the distance BF (the distance measured in the direction perpendicular to the axis of the drum) from the center of the drum 62 to the tooth tip of the gear portion 30*a* of the developing roller. In addition, it is necessary that the regulating portion 73*j* and the tooth tips of the drive transmission member 81*a* do not contact with each other during image formation. That is the distance BB (the distance measured in the direction perpendicular to the axis of the drum) from the center of the drum 62 to the regulating portion 73*j* is required to be larger than the distance BF (the distance measured in a direction perpendicular to the axis of the second axis) from the center of the drum 62 to the tooth tip of the gear portion 30*a* of the developing roller. It is necessary to satisfy the following from the above two conditions.

$$BB > BF$$

Summarized together with "BB<BA+AX" described above, it is preferable that the regulating portion 73*j* is disposed in a range that satisfies the following relation with respect to the center of the drum (the axis of the drum, the axis of the input coupling).

$$BF < BB < AX + BA$$

The definition of each value is summarized as follows.

BB: the distance measured from the center of the photosensitive member (the axis of the photosensitive member, the axis of the coupling projection) to the regulating portion 73*j* measured along the direction perpendicular to the axis of the photosensitive member:

BA: the radius of the inscribed circle inscribed in the equilateral triangle at the time when drawing the minimum equilateral triangle circumscribing the coupling projection while aligning the center of gravity of the equilateral triangle with the axial line of the drum (axial line of the coupling projection):

AX: the distance from the center of the photosensitive member (the axis of rotation of the coupling projection) to the bottom of the developing roller gear (bottom of the input gear) measured along the direction perpendicular to the axis of the photosensitive member; and BF: the minimum distance measured from the rotation center (axis) of the photosensitive member to the tooth tip of the input gear portion (gear portion 30*a*) measured along the direction perpendicular to the axis of the photosensitive member.

In this embodiment, the regulating portion 73*j* is formed by a continuous surface. More specifically, the regulating portion 73*j* is a curved surface (circular arc surface) which is opened toward the axis line of the drum 62 and is curved in an arc shape. In other words, it is a bay shape (bay portion) opened toward the axis of the drum 62.

However, as shown in the perspective view of the cartridge in FIG. 26, the regulating portion 89*j* may be formed by a plurality of portions (plural surfaces 89*j*) intermittent in the rotational direction of the drum 62. In this case, too, by connecting a plurality of intermittent portions, the regulating portion can be regarded as forming a bay shape (bay portion) which opens to the axis of the drum 62.

That is, there are differences in whether the regulating portion is one continuous portion or a plurality of intermittent portions, but, the restricting portion shown in FIG. 1 and the restricting portion shown in FIG. 26 are both deemed as having an arc shape (a bay shape, a curved surface portion, a curved portion) that opens to the axis of the drum 62.

In addition, in this embodiment, as a means for aligning the center of the drive transmission member 81 with the center of the drum 62, the triangle-shaped alignment action of the coupling projection 63*b* and the coupling recess portion 81*b* is utilized. That is, the coupling projection 63*b* and the coupling recess 81*b* are in contact at three points, so that the axis of the coupling projection 63*b* and the axis of the coupling recess 81*b* are aligned with each other. By making the drive transmission member 81 and the photosensitive drum coaxial, the accuracy of the center-to-center distance (distance between the axes) between the gear portion 81*a* and the gear portion 30*a* can be easily maintained, and the drive is stably transmitted to the developing roller gear 30.

However, one of the drive transmission member 81 and the drive side drum flange 63 may be provided with a cylindrical boss (projection), and the other may be provided with a hole to be fitted with the boss. Even with such a structure, the axis of the drive transmission member 81 and the axis of the drum 62 can be overlapped. FIG. 38 shows such a modified example. The drive transmission member 181 shown in FIG. 38 has a projection (boss) 181*c* at the center of the coupling recess 181*b*. The projection 181*c* is provided so as to overlap with the axis of the drive transmission member 181 and is a projection projecting along its axis. On the other hand, the coupling projection shown in FIG. 38 has a recess (recess) for engaging with the projection 181*c* at the center thereof. The recess is provided so as to overlap with the rotation axis of the drum 62 and is a recess recessed along this axis. By making the drive transmission member 81 and the photosensitive drum coaxial, the accuracy of the center-to-center distance (distance between the axes) between the gear portion 81*a* and the gear portion 30*a* can be easily maintained, and the drive is stably transmitted to the developing roller gear 30.

Next, the arrangement of the coupling projections 63*b* in the longitudinal direction (axial direction of the drum) will be described. As shown in FIG. 18, the driving side drum flange 63 has a flange portion 63*c*. The cleaning frame 71 is provided with a drum regulating rib 71*m* (a drum regulating portion, a drum longitudinal position regulating portion, a drum axial direction position regulating portion).

The drum regulating rib 71*m* is provided on the non-driving side of the flange portion 63*c* of the driving side drum flange 63 with respect to the longitudinal direction, and faces the flange portion 63*c* with a gap therebetween.

When the drum 62 moves to the non-driving side by the amount beyond this gap, the flange 63*c* and the drum regulating rib 71*m* come into contact with each other, and the movement of the drum 62 is restricted. That is, the drum 62 does not move in the longitudinal direction (axial direction) beyond a predetermined range. By this, the positional accuracy in the longitudinal direction of the coupling projection 63*b* of the drive side drum flange 63 before the coupling projection 63*b* of the driving side drum flange 63 is engaged with the coupling recess 81*b* is improved. Therefore, even if the amount of movement of the drive transmission member 81 in the longitudinal direction is reduced, the coupling projection 63*b* and the coupling recess 81*b* can be engaged with each other. By decreasing the amount of movement of the drive transmission member 81 in the longitudinal direction, the apparatus main assembly A can be downsized.

Next, the arrangement of the gear portion 30*a* of the developing roller gear 30 in the longitudinal direction (axial direction of the drum) will be described. As shown in FIG. 18, the developing roller gear 30 has an end surface 30*a*2 on the non-driving side of the gear portion 30*a*. The developing container 23 is provided with a developing roller gear restricting rib 23*d* (a gear regulating portion, a gear longitudinal position regulating portion, a gear axial line position regulating portion).

The developing roller gear restricting rib 23*d* is disposed on the non-driving side in the axial direction with respect to the non-driving side end surface 30*a*2 of the gear portion 30*a*, and faces the non-driving side end surface 30*a*2 *a* gap therebetween.

By this, the developing roller gear restricting rib 23*d* disposed on the driving side of the cartridge B restricts the developing roller gear 30 from moving toward the non-driving side in the longitudinal direction. By this, the positional accuracy in the axial direction of the gear portion 30*a* of the developing roller gear 30 before the gear portion 30*a* of the developing roller gear 30 meshes with the gear portion 81*a* of the drive transmission member 81 is improved. Therefore, the gear width of the gear portion 30*a* of the developing roller gear 30 can be reduced. By this, the cartridge B and the apparatus main assembly An in which the cartridge B is mounted can be downsized.

<Cartridge Dismounting>

Referring to FIGS. 7, 24, and 25, removal of the cartridge B from the apparatus main assembly A will be described.

As shown in FIG. 7, when the opening and closing door 13 is rotated and opened, the cylindrical cam 86 moves while rotating along the inclined surface portions 86*a* and 86*b* by way of the rotating cam link 85, until the end surface portion 86*c* of the cylindrical cam 86 and the end surface portion 15*f* of the drive side plate 15 abut against the drive side in the axial direction. And, as the cylindrical cam 86 moves, the drive transmission member 81 can move to the drive side in the axial direction (the side away from the cartridge B).

Here, as shown in parts (a) and part (b) of FIG. 24 and part (a) of FIG. 25, the radial teeth of the gear portion 81*a* of the drive transmission member 81 and the gear portion 30*a* of the developing roller gear 30 Apply the amount to be applied to the amount AH.

In order to break the engagement between the gear portion 81*a* and the gear portion 30*a*, the gear portion 81*a* must move in a direction away from the gear portion 30*a* by the amount equal to or more than the engagement amount AH between the gear portions. Therefore, the regulating portion 73*j* of the drum bearing 73 is provided so as not to hinder the movement of the drive transmission member 81 when the gear portion 81*a* separates from the gear portion 30*a*. The direction in which the gear portion 81*a* of the drive transmission member 81 moves away from the gear portion 30*a* of the developing roller gear 30 is indicated by the arrow AI along the direction in which the line connecting the center 81*j* of the drive transmission member 81 and the center 30*b* of the developing roller gear 30 extends. It is preferable that the restricting portion 73*j* is not provided in the arrow AI direction. That is, it is preferable that the regulating portion 73*j* is not disposed so as to crosses the straight line LA, and the drive transmission member 81 does not contact the restricting portion 73*j* when the gear portion 81*a* disengages from the gear portion 30*a*.

It is preferable that when the gear portion 81*a* disengages from the gear portion 30*a*, the drive transmission member 81 does not contact the recess peripheral surface 73*k* of the drum bearing 73. In this state that the door 13 is open (parts (a) and part (b) of FIG. 7), the drive transmission member 81 is retracted to such a position that it does not contact the recess circumferential surface 73*k* of the drum bearing 73.

That is, as shown in part (a) of FIG. 24, the drive transmission member 81 is in the position retracted to such an extent that the coupling with the coupling projection 63*b* is broken. Therefore, in the longitudinal direction of the drive transmission member 81, the free end of the drive transmission member 81 is at substantially the same position as the free end of the recessed circumferential surface 73*k* or on the left side of the free end of the recessed circumferential surface 73*k*.

In this state, even if the drive transmission member 81 is inclined in an attempt to break the meshing engagement between the gear portion 81*a* and the gear portion 30*a*, the drive transmission member 81 and the recess peripheral surface 73*k* do not contact with each other.

It is also conceivable that the amount of movement of the drive transmission member 81 when retracting is short and the free end of the drive transmission member 81 at the retracted position is provided on the right side of the free end of the recessed circumferential surface 73*k*. In such a case, the contact between the drive transmission member 81 and the recess circumferential surface 73*k* can be avoided if the following conditions are satisfied.

Let Z be the distance in the radial direction from the center 62*a* of the drum 62 to the recess peripheral surface 73*k* of the drum bearing 73. Let Y be the radial distance from the center 81*j* of the drive transmission member 81 to the outer peripheral surface of the cylindrical portion 81*i* of the drive transmission member 81. Let AJ be the radial distance at the gap between the recess peripheral surface 73*k* and the cylindrical portion 81*i*.

At this time, the gap AJ satisfies the following.

$$AJ = Z - Y$$

$$AJ > AH$$

That is, a recess portion is provided around the drum 62. And, the drive transmission member 81 can move within the range in which the inner peripheral surface (recess peripheral surface 73*k*) of the recess portion does not contact the gear portion 81*a*.

The radial position of the recess peripheral surface 73*k* of the drum bearing 73 may be such that the distance Z from the center 62*a* of the drum 62 is satisfies the following:

$$Z > AH + Y$$

With the above structure, when the cartridge B is taken out from the main assembly An of the apparatus, the drive transmission member 81 can incline in the away direction AD by an amount beyond the engagement amount AH between the gear portion 81*a* of the drive transmission member 81 and the gear portion 30*a* of the developing roller gear 30. And, disengagement between the gear portion 81*a* of the drive transmission member 81 and the gear portion 30*a* of the developing roller gear 30 is effected, so that the cartridge B can be taken out smoothly from the main assembly An of the apparatus.

As described above, the drive transmission member 81 moves toward the coupling portion on the cartridge side due to the thrust force caused by the engagement of the helical gears with each other.

Further, the drive transmission member 81 is moved (inclined) by the force produced by the meshing of the gears, but the movement amount (amount of inclination) is regulated by the restricting portion provided on the cartridge side. By this, the engagement (coupling) between the drive transmission member 81 and the coupling portion on the cartridge side is secured to assure reliable drive transmission.

Further, since the drive transmission member 81 is provided with a gap that allows the drive transmission member 81 to move in the radial direction beyond the engagement height of the gear, the disengagement between the gears when removing the cartridge B from the main assembly of the apparatus is smoothly carried out. That is, the cartridge can be easily taken out.

Figure 20:
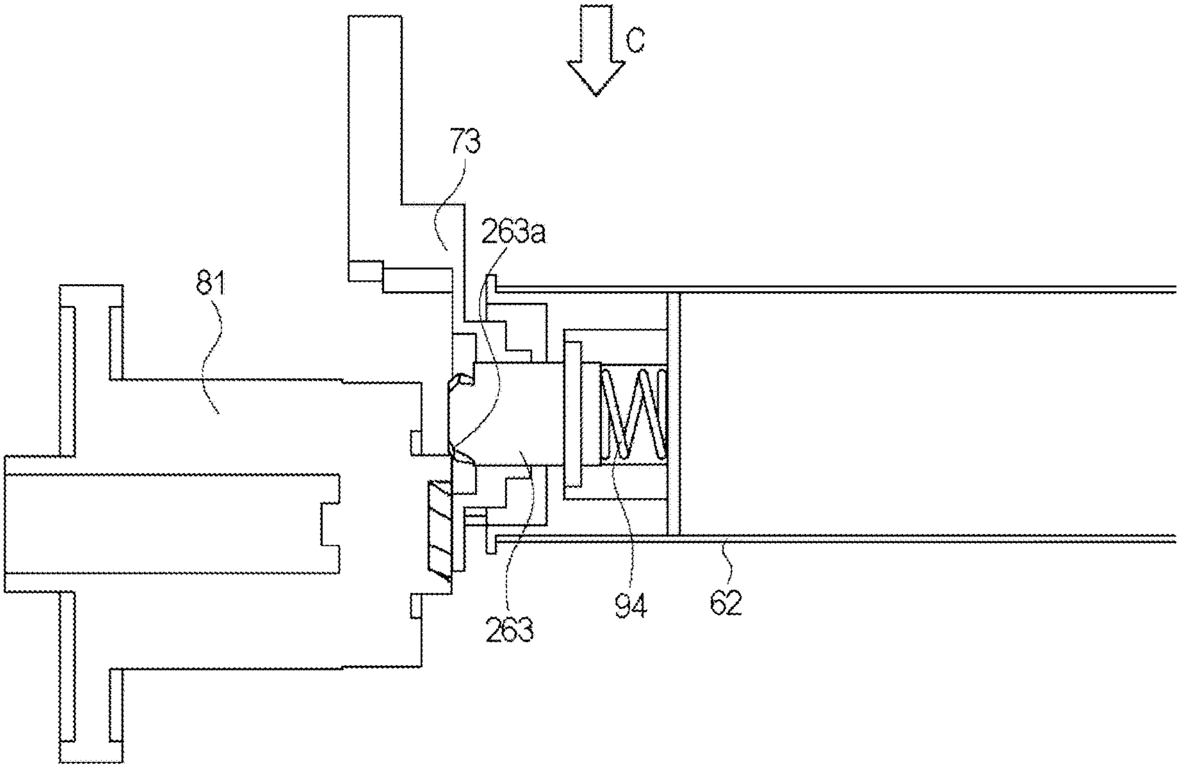
FIG. 20 is a sectional view of the drive transmitting portion of the electrophotographic image forming apparatus according to Embodiment 1.

Further, in this embodiment, the coupling projection 63*b* is fixed to the drum 62, but a movable coupling projection may be provided. For example, the coupling 263*b* shown in FIG. 20 is movable in the axial direction with respect to the drum 62, and is urged by a spring 94 toward the driving side in a state that it receives no external force. When mounting the cartridge B in the main assembly A, the end 263*a* of the coupling 263*b* comes into contact with the drive transmission member 81. The coupling projection 263*b* can retract to the non-drive side (the side away from the drive transmission member 81) while contracting the spring 94 by the force received from the drive transmission member 81. With such a structure, it is not absolutely necessary to retract the drive transmission member 81 to the extent that it does not contact the coupling projection 263*b*. That is, the amount of withdrawal of the drive transmission member 81 interrelated with the opening of the opening/closing door 13 (FIG. 2) can be reduced by an amount by which the coupling projection 263*b* can retract. That is, you can downsize the main assembly A.

The end portion 263*a* of the coupling projection 263*b* is an inclined portion (inclined surface, chamfered surface). With such a structure, when the end portion 263*a* contacts to the drive transmission member 81 at the time of mounting and dismounting the cartridge, the end portion 263*a* is tends to receive a force in the direction of retracting the coupling projection portion 263*b*. However, the present invention is not limited to such a structure. For example, the contact portion on the drive transmission member 81 side contacting the coupling projection 263*b* may be an inclined portion.

Figure 23:
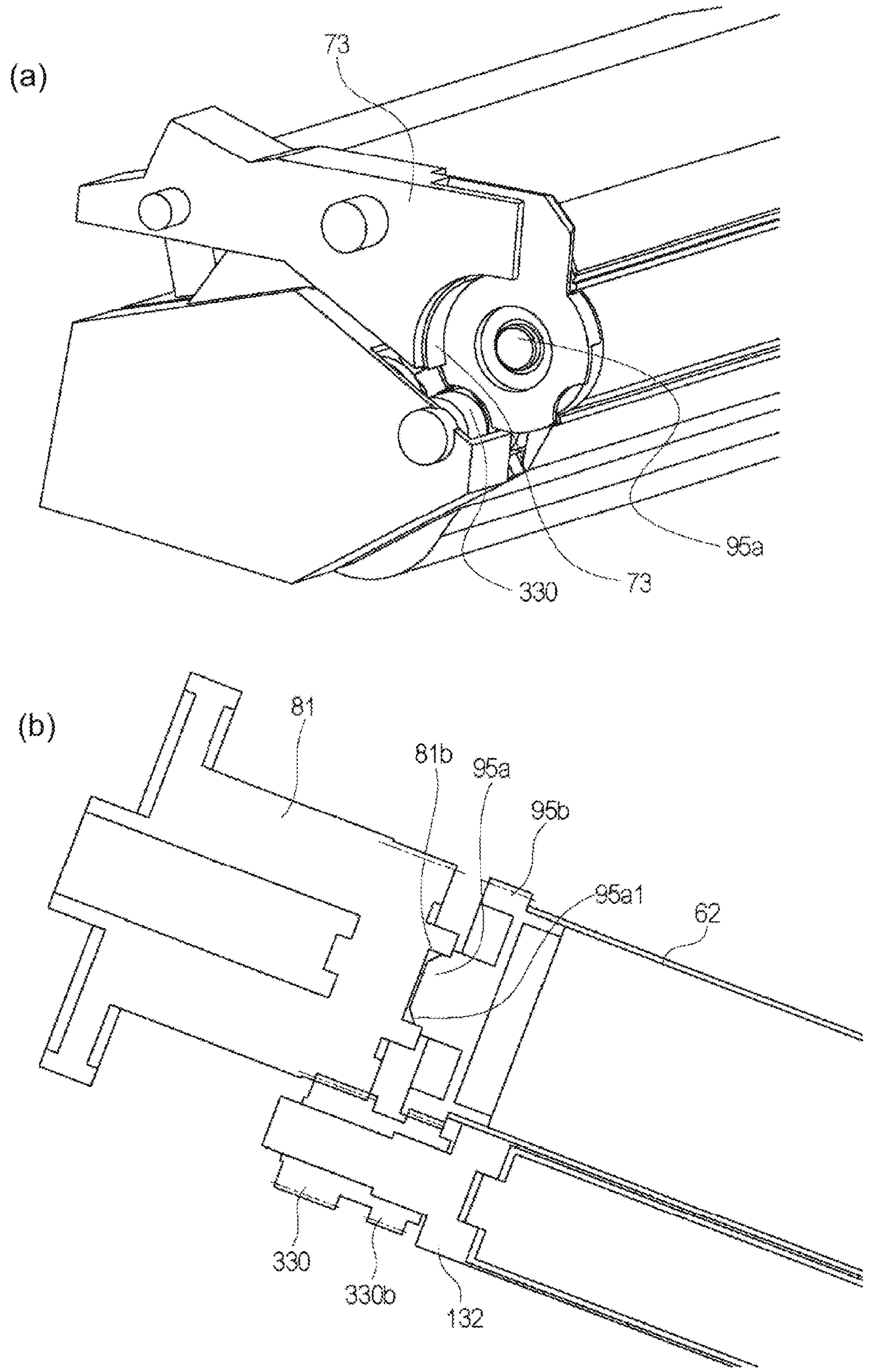
FIG. 23 is an illustration of the drive transmitting portion of the electrophotographic image forming apparatus according to Embodiment 1.

Another modification is shown in FIG. 23. In this embodiment, the drum 62 is driven by the engagement between the drive transmission member 81 and the coupling projection 63*b*. However, as shown in FIG. 23, the driving of the drum 62 may be performed by the gears 330*b*, 95*b*.

In the structure shown in FIG. 23, the developing roller gear 330 includes not only a gear portion (input gear portion) 330*a* for receiving drive from the gear portion 81*a* of the drive transmission member 81 but also a gear portion (output gear portion) 330*b* for outputting a driving force toward the drum 62. In addition, the drum flange 95 fixed to the end portion of the drum 62 has a gear portion 95*b* (input gear portion) for receiving the driving force from the gear portion 330*b* instead of including the coupling projection. Further, the drum flange 95 has a cylindrical portion 95*a*.

In this case, the cylindrical portion 95*a* provided at the end portion of the drum 62 functions as a positioning portion for positioning the drive transmission member 81 by engaging with the coupling recess portion 81*b* provided at the tip of the drive transmission member 81.

Both the recessed portion 81*b* and the cylindrical portion 95*a* act as an aligning portion for aligning the axes of the drive transmission member recess 81 and the drum 62 with each other. When the coupling recess 81*b* and the cylindrical portion 95*a* are engaged with each other, the axes of the drum 62 and the drive transmission member 81 are substantially overlapped, and the both are coaxially arranged. Here, the coupling recessed portion 81*b* may be referred to as a main assembly side aligning portion (aligning recessed portion), and the cylindrical portion 95*a* may be referred to as a cartridge side aligning portion (aligning projection).

Strictly speaking, the outer peripheral surface of the cylindrical portion 95*a* corresponds to the aligning portion on the cartridge side.

In addition, the lightening portion 81*b*3 of the coupling projection 81*b* corresponds to the main assembly side alignment portion. The circular lightening portion 81*b*3 engages with the outer peripheral surface of the cylindrical portion 95*a*, thereby aligning the drum 62 and the drive transmission member 81 with each other.

In the cartridge shown in FIG. 23, due to the engagement between the gear portion 30*a* of the gear 30 and the gear portion 81*a* of the drive transmission member 81, a force attracting the coupling recess portion 81*b* and the cylindrical portion 95*a* toward each other is produced, by the same action as in the above-described embodiment. By the drive transmission between the gear portion 30*a* and the gear portion 81*a*, the coupling recess portion 81*b* and the cylindrical portion 95*a* are engaged with each other. Here, an inclined portion (tapered, chamfered) 95*al* (part (b) of FIG. 23) is provided on the edge of the tip of the cylindrical portion 95*a* so that the coupling recessed portion 81*b* and the cylindrical portion 95*a* are easily engaged with each other. That is, the diameter of the cylindrical portion 95*a* decreases toward the tip thereof.

As described above, when the coupling projection 63*b* is provided at the end portion of the drum 62, the coupling recess portion 81*b* functions as a output coupling for transmitting the driving force to the coupling projection 63*b*. In addition, in the case where the coupling projection 63*b* is substantially triangular, by the coupling recess 81*b* being coupled to the coupling projection 63*b*, the drive transmission member 81 is centered. Therefore, the coupling recess 81*b* functions also as a centering (aligning) portion.

On the other hand, in the case where the cylindrical portion 95*a* is provided at the end portion of the drum 62 as in the structure shown in part (a) of FIG. 23, the coupling recessed portion 81*b* does not serve as a coupling portion (output coupling), but serves only as a centering recess (main assembly side alignment portion).

That is, the coupling recess portion 81*b* serves as both the output coupling and the main assembly aligning portion (the aligning recess portion), and the function of the coupling recess portion 81*b* provided by the structure of the drum 62 is both or either one of the function of the coupling recess portion and the centering portion.

Figure 35:
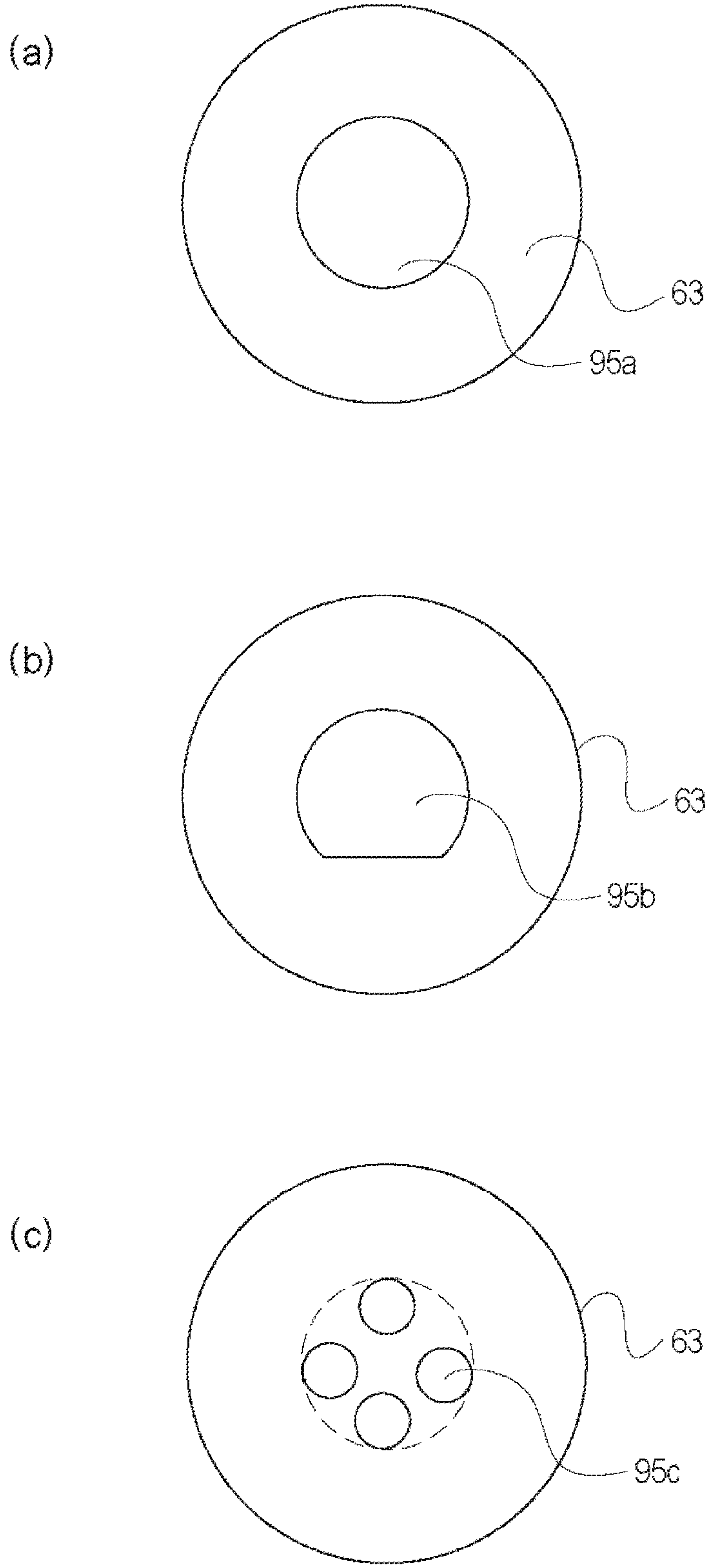
FIG. 35 is an illustration of a modified example of Embodiment 1.

In addition, although the outer periphery of the aligning portion on the cartridge side shown in FIG. 23 is the cylindrical portion 95*a* forming a complete circle, the present invention is not limited to such a structure. FIG. 35 shows an example of the shape of the aligning portion as a schematic view.

Part (a) of FIG. 35 shows a state in which the cylindrical portion 95*a* shown in FIG. 23 is provided on the drum flange 63. On the contrary, in part (b) of FIG. 35, the shape of the aligning portion 95*b* constitutes only a part of a circle. If the circular arc portion of the aligning portion 95*b* is sufficiently larger than the circular arc shape of the lightening portion 81*b*3, the aligning portion 95*b* has a centering action.

The distance (radius) from the center of the drum to the outermost portions of the aligning portions 95*a*, 95*b* corresponds to the radius of the lightening portion 81*b*3. The radius of the lightening portion 81*b*3 is 4.8 mm, and therefore, the distance (radius) from the center of the drum to the outermost portions of the aligning portions 95*a*, 95*b*, 95*c* is 4.8 mm or less, and the closer to 4.8 mm, the better the alignment effect is.

In this embodiment, the coupling recessed portion 81*b* which is the main assembly side aligning portion has a substantial triangular shape in order to transmit the drive when engaged with the coupling projection portion 63*b*, and an arcuate lightening portion 81*b*3 is provided on a part of a side of a triangular shape. However, when it is not necessary for the main assembly side alignment unit to transmit the drive to the drum 62, the main assembly side alignment portion can take another shape. For example, the main assembly side aligning portion may be a substantially circular recess portion. In the case of such a main assembly side alignment section, the alignment portion 95*c* as shown in part (c) of FIG. 35 can be used as the alignment portion on the cartridge side. The centering portion shown in part (c) of FIG. 35 has a structure in which a plurality of projections 95*c* are arranged in a circular shape. That is, the circumscribed circle (circle shown by a dotted line) of the projection 95*c* is a circle coaxial with the drum. In addition, this circumscribed circle has a size corresponding to the recess portion of the main assembly side aligning portion. That is, the radius of the circumcircle is not more than 4.8 mm.

Any of the structures shown in part (a), part (b), and part (c) of FIG. 35 can be regarded as an aligning portion that is substantially coaxial with the drum. That is, each of the aligning portions 95*a*, 95*b*, 95*c* is disposed so as to be centered on the axis line of the drum.

Strictly speaking, the outer peripheral surfaces of the aligning portions 95*a*, 95*b*, 95*c*, that is, the portions facing the opposite side of the drum axis line (in other words, the portions facing the outside in the radial direction of the drum) functions as alignment portions. The outer circumferential surface functioning as the aligning portion is extended so as to surround the axis of the drum.

Each of the aligning portions 95*a*, 95*b*, 95*c* is exposed toward the outside of the cartridge in the axial direction.

In addition, it is preferable that the structure of the cartridge as shown in FIG. 23 also has the regulating portion 73*j* as described above. In addition, the positional relationship (dimensional relationship) between the developing roller gear 30 and the regulating portion 73*j* relative to the aligning portion may be considered similarly to the relationship (dimensional relationship) between the developing roller gear 30 and the regulating portion 73*j* relative to the cartridge projection 63*b*.

For the reason as described above, for example, for the lower limit of the distance BB from the center of the drum to the center of the regulating portion 73*j*, the following relationship holds.

$$BF<BB$$

BB: the distance measured from the center of the photosensitive member (the axis of the photosensitive member, the axis of the coupling projection) to the regulating portion 73*j* along the direction perpendicular to the axis of the photosensitive member.

BF: the minimum distance measured from the rotation center (axis) of the photosensitive member to the tooth tip of the input gear portion (gear portion 30*a*) along the direction perpendicular to the axis of the photosensitive member.

The upper limit of distance BB will be considered. It is preferable that the misalignment amount generated between the coupling recessed portion 81*b* and the aligning portion 95*a* when the movement transmitting member 81 is inclined until the gear portion 81*a* comes into contact with the restricting portion 73*j* satisfies the following relationship. That is, it is preferable that an inclined portion 95*al* (part (a) of FIG. 23) is provided at the tip of the aligning portion 95*a*, but as the width of the inclined portion 95*a* is measured along the radial direction of the drum, the width of the inclined portion 95*a* is larger than the misalignment amount. If this relationship is satisfied, even if misalignment occurs, the inclined portion 95*al* of the aligning portion 95*a* comes into contact with the edge of the coupling recessed portion 81*b* to assist the engagement between the coupling recessed portion 81*b* and the aligning portion 95*a*.

The difference between the distance BB and the radius U of the tip circle of the gear portion 81*a* is “BB−U”, and the misalignment amount becomes larger than “BB−U”.

Therefore, at least the width BX of the inclined portion 95*a* needs to be larger than “BB−U”. In addition, the radius U of the addendum circle of the gear portion 81*a* is shorter than the distance AX from the center of the drum to the root of the developing roller gear. Therefore, the width BX of the inclined portion 95*a* is larger than “BB-AX”.

$$BX>BB-AX$$

This is modified as follows:

$$BB<BX+AX$$

BB: the distance measured from the center of the photosensitive member (the axis of the photosensitive member, the axis of the coupling projection) to the regulating portion 73*j* along the direction perpendicular to the axis of the photosensitive member.

BX: the width of the inclined portion 95*a* measured along the radial direction of the photosensitive member.

AX: the distance measured from the axis of the photosensitive member to the root of the developing roller gear along the direction perpendicular to the axis of the photosensitive member.

In summary, “BF<BB<BX+AX” holds true.

Figure 36:
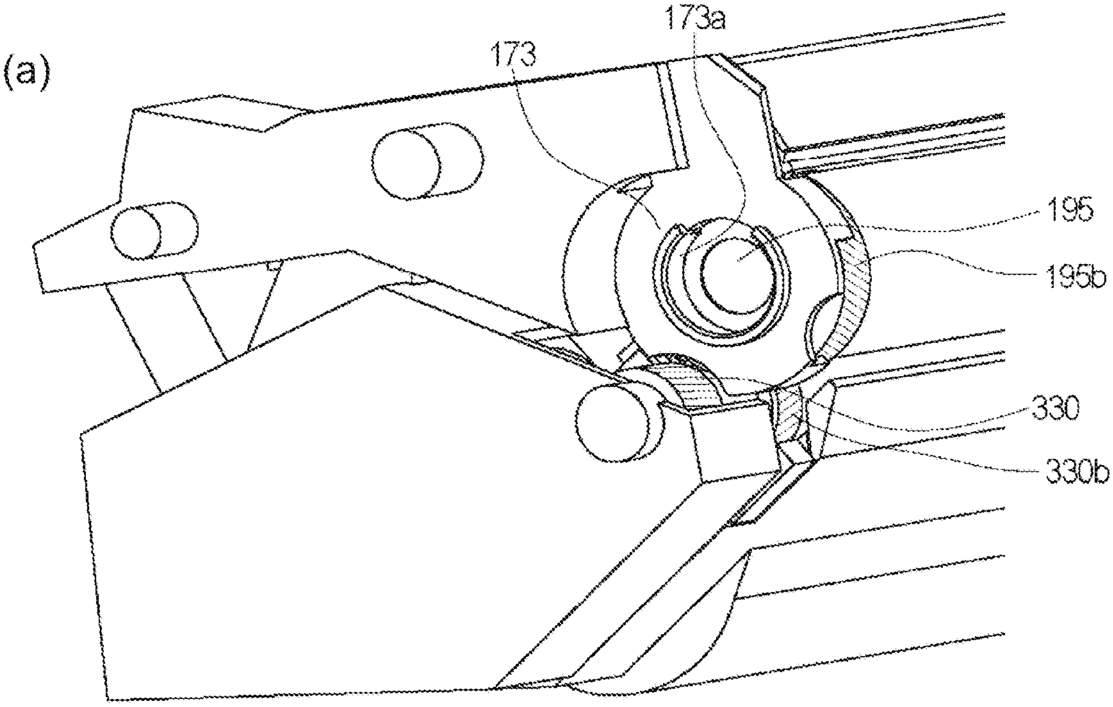
FIG. 36 is an illustration of a modified example of Embodiment 1.
Figure 36:
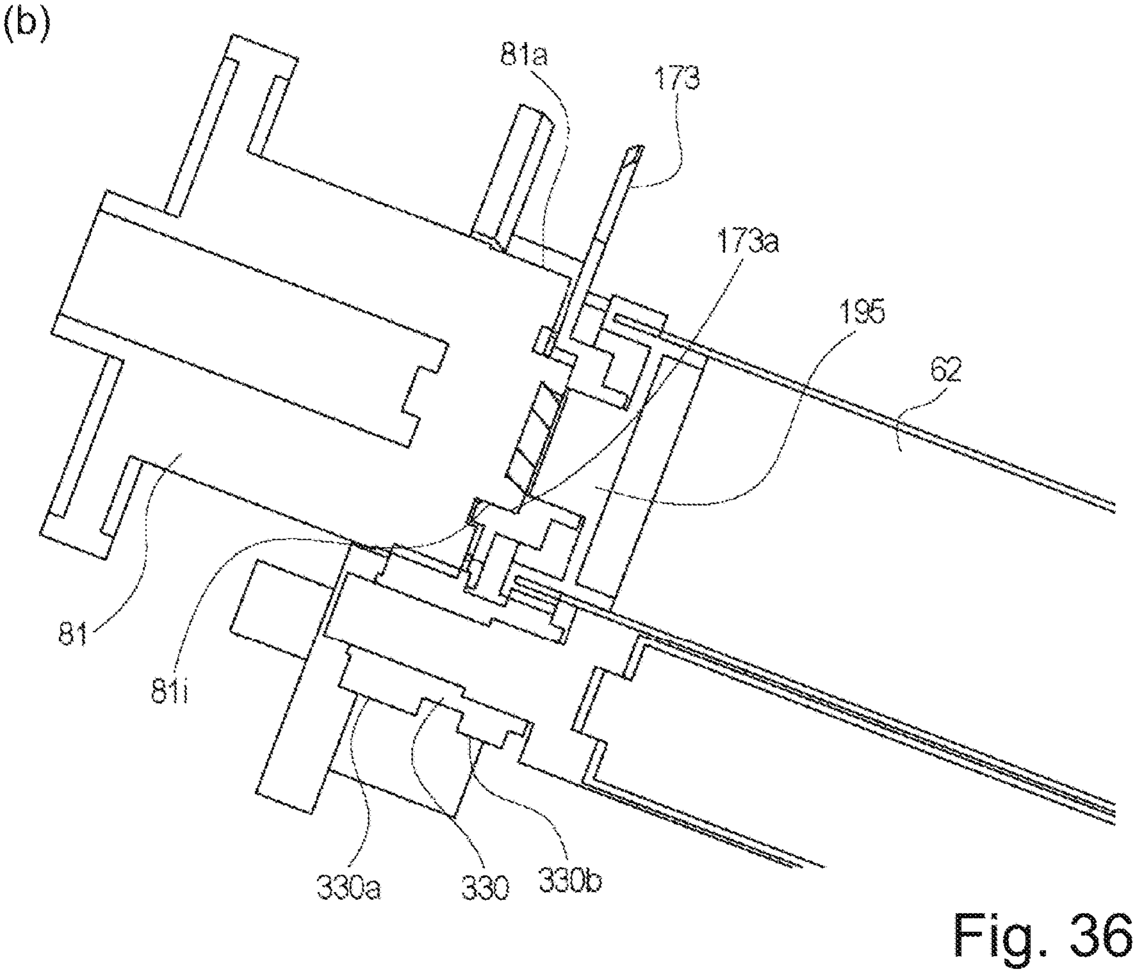

In the structure shown in FIG. 23, the cylindrical portion 95*a* is provided on the drum 62. Alternatively, the alignment portion such as the cylindrical portion 95*a* may be provided on the frame of the cleaning unit 60 (that is, the drum bearing 73). That is, it is also conceivable that the drum bearing 73 covers the end portion of the drum 62, and the drum bearing 73 is provided with the aligning portion. In addition, it is also possible to use a structure of engaging with the cylindrical portion 81*i* (part (a) of FIG. 13) of the drive transmission member 81 rather than the recess portion 81*b* of the drive transmission member 81, as the aligning portion on the cartridge side. In the modification shown in FIG. 36, a circular arc projection 173*a* for contacting the periphery of the cylindrical portion 81*i* is provided on the drum bearing 173. Part (a) of FIG. 36 is a perspective view of the cartridge, and part (b) of FIG. 36 is a sectional view illustrating a state in which the aligning portions of the cartridge and the main assembly driving member are engaged with each other. In this modified example, the projection 173*a* is engaged with the cylindrical portion 81*i* to provide an aligning portion for aligning the drive transmission member 81. More particularly, the inner circumferential surface of the projection 173*a* facing the axis side of the drum (in other words facing the radially inner side of the drum) is the aligning portion.

This aligning portion is provided in the drum bearing 173, not in the drum flange 195. Therefore, the drum flange 195 has a gear portion 195*a* for receiving the driving force from the developing roller gear, but does not have the aligning portion.

The center of the aligning portion is disposed so as to overlap the axis line of the drum. That is, the projection 173*a* is disposed so as to be substantially coaxial with the drum. In other words, the inner circumferential surface of the projection 173*a* facing the axis line side of the drum is disposed so as to surround the axis of the drum. A taper (inclined portion) is provided on the edge of the tip of the projection 173*a*, so that the cylindrical portion 81*i* can be easily introduced into the internal space of the projection 173*a* when the tip of the projection 173*a* hits the cylindrical portion 81*i*.

The distance (radius) from the axis of the drum to the aligning portion (projection 173*a*) corresponds to the radius of the cylindrical portion 81*i*. If the radius of the cylindrical portion 81*i* is 7.05 mm, the radius of the projection 173*a* is preferably 7.05 mm or more.

The projection 173*a* also functions as a restricting portion (stopper) for suppressing inclination and movement of the drive transmission member 81 by contacting the cylindrical portion 81*i*. That is, the projection 173*a* can also serve as the restricting portion 73*j* (FIG. 24). The structure in which the regulating portion is constituted to contact the cylindrical portion 81*i* will be described later in Embodiment 2. Here, an inclined portion (taper, chamfer) is provided at the tip of the projection 173*a*, and when the drive transmission member 81 is inclined, the tip of the cylindrical portion 81*i* comes into contact with the inclined portion, so that the engagement between the cylindrical portion 81*i* and the projection

173*a* is assisted. That is, the inner circumferential surface of the projection 173*a* has a diameter increasing toward the tip of the projection 173*a*.

The functions, materials, shapes and relative arrangements, and so on of the constituent parts described in connection with this embodiment and each modification described above are not intended to limit the scope of the present invention only to theme unless otherwise specified.

Embodiment 2

Figure 29:
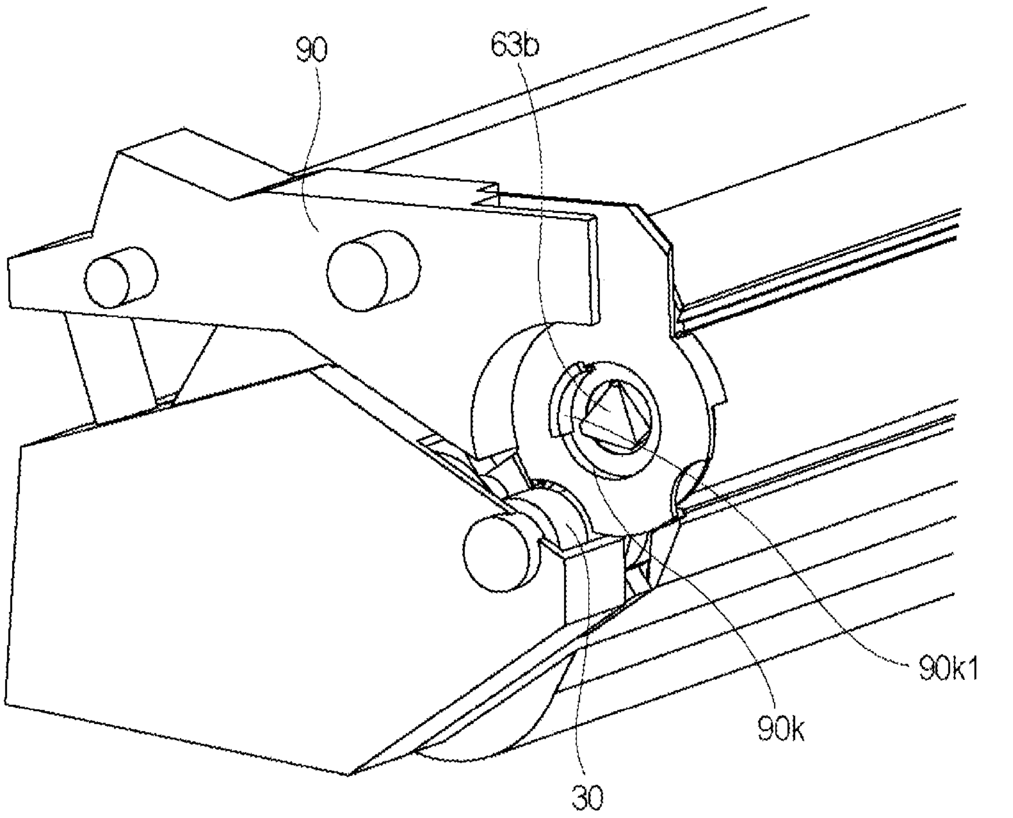
FIG. 29 is a perspective view of the regulating portion of the electrophotographic image forming apparatus according to Embodiment 2.
Figure 30:
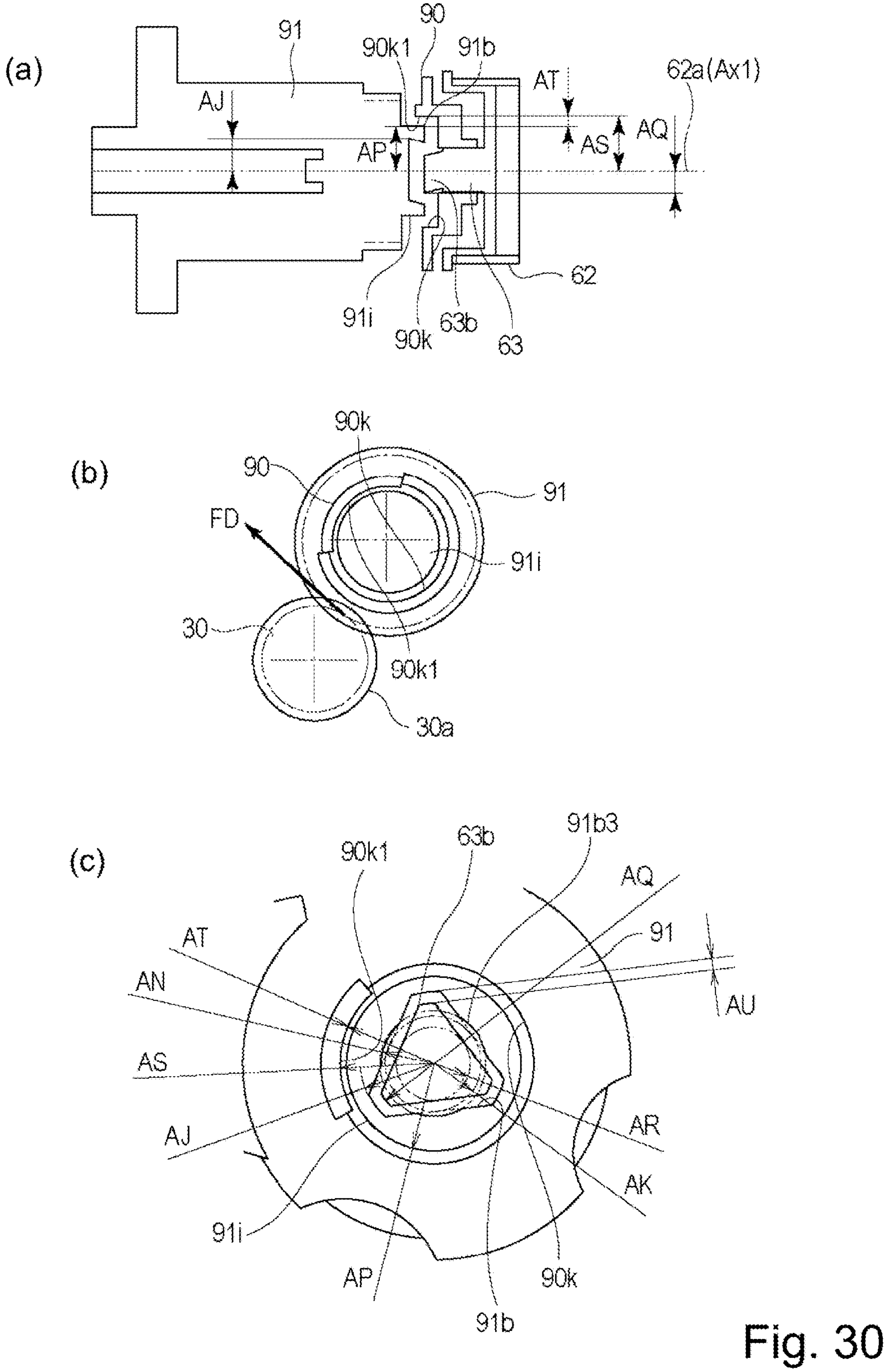
FIG. 30 is an illustration of the regulating portion of the electrophotographic image forming apparatus according to Embodiment 2.
Figure 31:
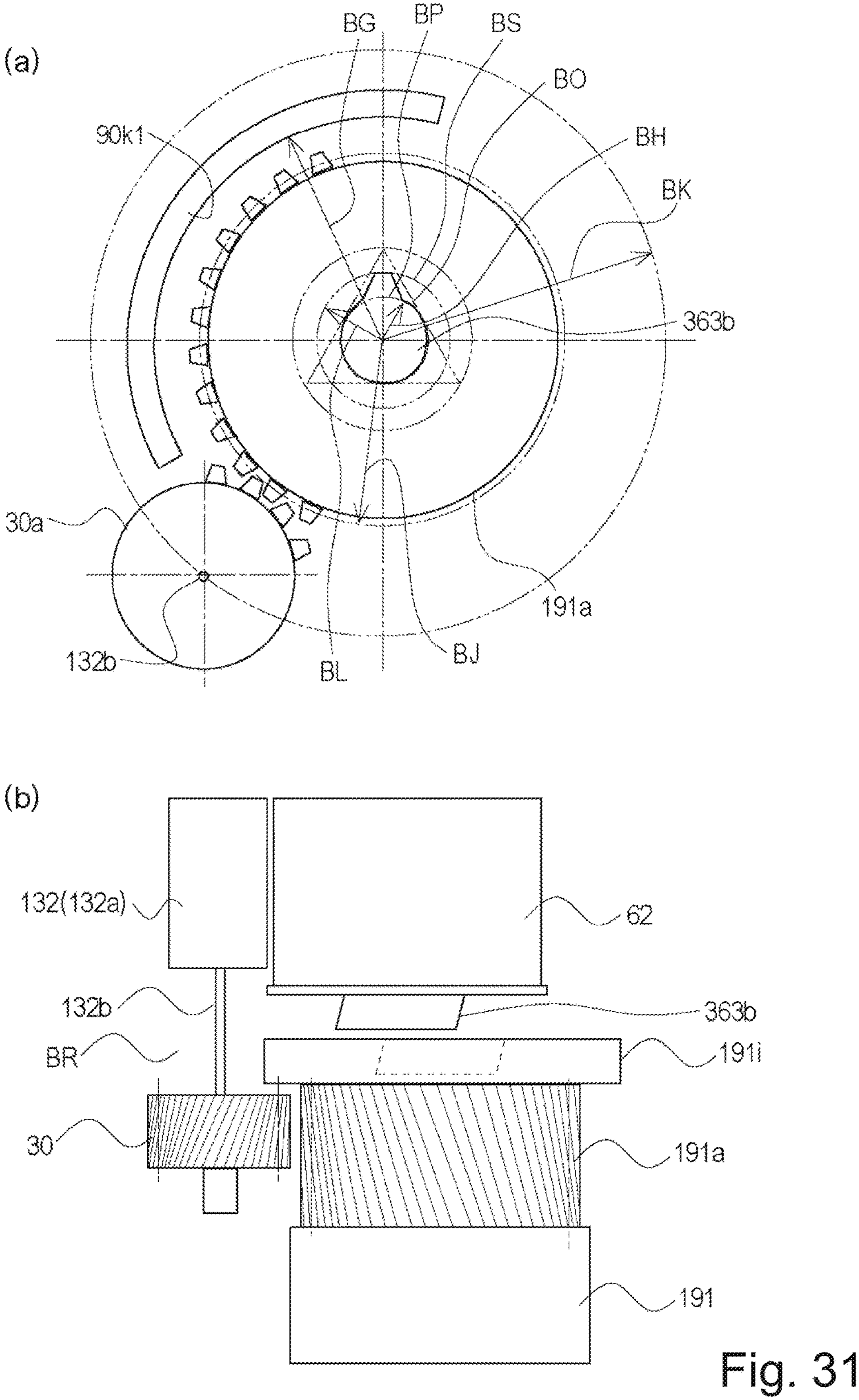
FIG. 31 is an illustration of the regulating portion of the electrophotographic image forming apparatus according to Embodiment 2.

Next, referring to FIG. 29, part (a) of FIG. 30, part (b) of FIG. 30, part (c) of FIG. 30, part (a) of FIG. 31 and part (b) of FIG. 31, an embodiment of Embodiment 2 of the present invention will be described. FIG. 29 is a perspective view of a cartridge for explaining the regulating portion of the drive transmission member. Part (a) of FIG. 30 is a cross-sectional view of the driving portion of the image forming apparatus as viewed from the opposite direction of the cartridge mounting direction to explain the regulation of the drive transmitting portion. Part (b) of FIG. 30 is a cross-sectional view of the drive portion of the image forming apparatus as viewed from the drive side to explain the regulation of the drive transmitting portion. Part (c) of FIG. 30 is a cross-sectional view of the driving portion of the image forming apparatus as viewed from the drive side for explaining the regulation of the drive transmitting portion. Part (a) of FIG. 31 is a cross-sectional view of the driving portion of the image forming apparatus as viewed from the drive side to explain the regulation of the drive transmitting portion. Part (b) of FIG. 31 is a cross-sectional view of the driving portion of the image forming apparatus as viewed from the upstream side of the process cartridge mounting direction to explain the drive transmitting portion.

In this embodiment, parts different from the above-described embodiment will be described in detail. In particular, materials, shapes and the like are the same as in the above-mentioned embodiment unless otherwise stated. For such parts, the same numbers will be assigned and detailed description thereof will be omitted.

As shown in parts (a) of FIGS. 29 and 30, part (b) of FIG. 30, and part (c) of FIG. 30, the drum bearing 90 is provided with a recess portion around the projection portion of the coupling portion. And, a restricting portion 90*k*1 for restricting the movement of the drive transmission member 91 is provided as a small diameter portion (a portion where the inner diameter of the recess portion is made smaller than the other portions) within the recess peripheral surface 90*k* (the inner peripheral surface of the recess portion). The regulating portion 90*k*1 is an arcuate curved surface portion facing the axial line side of the drum.

The regulating portion 90*k*1 is a regulating portion (stopper) for suppressing the movement and inclination of the drive transmission member 91, and is a portion corresponding to the regulating portion 73*j* (FIG. 1, FIG. 24, and so on) in Embodiment 1. In the following, the regulating portion 90*k*1 in this embodiment, particularly the portions different from the restricting portion 73*j* in Embodiment 1 will be described in detail.

The portion which regulates the inclination of the drive transmission member 91 by the restricting portion 90*k*1 is a cylindrical portion (cylindrical portion) 91*i* provided at a free end portion of the non-drive side in the axial direction of the drive transmission member 91. The cylindrical portion 91*i* corresponds to a cylindrical projection in which a coupling recess is formed.

In the state that the opening and closing door 13 opens and the drive transmission member 91 moves in the driving side (direction away from the cartridge side), the regulating portion 90*k*1 overlaps the cylindrical portion 91*i* of the drive transmission member 91 in the axial direction.

Figure 39:
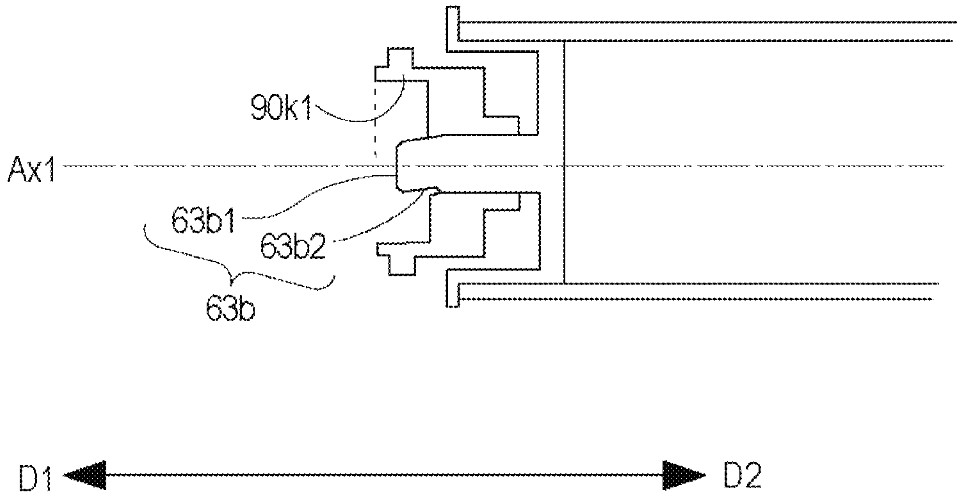
FIG. 39 is an illustration of the device according to Embodiment 2.

As shown in FIG. 39, in this embodiment, at least a part of the regulating portion 90*k*1 in the axial direction is located outside (on the arrow D1 side) the outer circumferential surface 63*b*2 of the input coupling portion (the coupling projection 63*b*). Here, the outer circumferential surface 63*b*2 is a portion (driving receiving portion) which receives the driving force from the coupling recess. In particular, at least a part of the restricting portion 90*k*1 is disposed outside of the leading end 63*b*1 of the coupling projection 63*b*.

Further, at least a part of the regulating portion 90*k*1 is disposed so as to overlap with the input coupling portion (the coupling projection 63*b*) in the axial direction. That is, when the coupling projection 63*b* and the regulating portion 90*k*1 are projected on the axis Ax1 of the drum, at least a part of the projected regions thereof mutually overlap each other. In other words, at least a part of the regulating portion 90*k*1 is disposed so as to face the input coupling portion (the coupling projection 63*b*) provided at the end portion of the drum.

The regulating portion 90*k*1 can also be regarded as a projecting portion that projects so as to cover the axis of the drum.

Here, it has been explained that in Embodiment 1 (parts (a), part (b) thereof of FIG. 24, part (a) of FIG. 25) the following holds.

$$AB = AAX(W/X)$$

$$S = AA + U$$

$$V > AB$$

$$V > (S - U)\times(W/X)$$

$$U < S < U + V\times(X/W)$$

In this embodiment, among the dimensions shown in parts (a) of FIG. 30, part (b) thereof and part (c) thereof, AU corresponds to V and AS corresponds to S.

In addition, AT corresponds to AA, and AP corresponds to U.

In addition, $$W=X, \text{ and } (W/X)=1.$$

Then, in this embodiment, when the drive transmission member 91 is inclined until it comes into contact with the regulating portion 90*k*1, the conditions under which the coupling projection 63*b* and the coupling recess portion can be coupled with each other are as follows, on the same analysis as in Embodiment 1.

$$AB = AT$$

$$AS = AT + AP$$

$$AU > AT$$

$$AU > (AS - AP)$$

$$AP < AS < AP + AU$$

In other words, if there is at least one phase relationship satisfying "AU>AT=AS−AP" between the coupling projection and the coupling recess, the coupling portions are engaged (coupled) with each other.

Here,

AB: the amount of misalignment between couplings as measured along the direction perpendicular to the drum axis.

AT: the distance from the drive transmitting member 91 (cylindrical portion 91*i*) to the regulating portion 90*k*1 as measured along the direction perpendicular to the drum axis.

AS: the distance from the drum axis (the axis of the coupling projection) to the regulating portion 90*k*1, as measured along the direction perpendicular to the drum axis.

AP: the radius of the cylindrical portion 91*i* of the drive transmission member 91.

In Embodiment 1, the gear portion 81*a* of the drive transmission member 81 is regulated by the restricting portion 73*j*.

On the contrary, in this embodiment, the cylindrical portion 91*i* forming the outer peripheral surface of the coupling recess 91*b* is regulated by the regulating portion 90*k*1.

Therefore, the positions of the regulating portion 90*k*1 and the coupling recess portion 91*b* in the axial direction are substantially the same.

As compared with the case where the gear portion 81*a* of the drive transmission member 81 is regulated by the restricting portion (part (a) of FIG. 24), the inclination of the drive transmission member 91 can be accurately regulated, in this embodiment.

By this, even if the gap between the coupling recess 91 and the coupling projection 63*b* is small, they can be engaged with each other. Because the dimensions (sizes) of the coupling recess 91 and coupling projection 63*b* are close to each other, the accuracy of drive transmission is enhanced.

Here, an example of dimensions established when the radius of the drum 62 is 12 mm will be described below. First, the dimensions of the respective parts of the drive transmission member 91 applicable to the drum 62 having a radius of 12 mm in this embodiment are the same as those of the drive transmission member 81 in Embodiment 1, and are as follows: The distance AJ from the center of the coupling recess 91*b* to the apex of the substantially equilateral triangle of the recess 91*b* is 6.5 mm, and the radius AK of the inscribed circle of the approximately triangular shape of the coupling recess 91*b* is 4.65 mm. Here, the substantially equilateral triangle shape of the recessed portion 91*b* is not a pure equilateral triangle but the apex corner is beveled into an arc shape. In addition, the radius AN of the lightening portion 91*b*3 of the coupling recess 91*b* is 4.8 mm, and the radius AP of the cylindrical portion 91*i* of the drive transmission member 91 is 7.05 mm.

The shortest distance AU between the coupling recess 91*b* and the coupling projection 63*b* satisfies the following relationship.

$$0 < AU < 1.7$$

AU is the lower limit when the size of the triangular shape of the coupling recess 91*b* is equal to the size of the triangular shape of the coupling projection 63*b*. On the other hand, AU is the upper limit when the distance from the center of the coupling projection 63*b* to the apex is 4.8 mm which is the radius AC of the lightening portion of the coupling recess 91*b*. At this time, the gap AU between the coupling projection 63*b* and the coupling recess 81*b* is "1.7=6.5−4.8".

Therefore, substituting each value and AU=1.7 into the expression "AP<AS<AP+AU" shown earlier, $$\text{“}7.05 < S < 8.75\text{”}.$$

The fact that the above equation holds will be confirmed, using two examples.

In the first example, the dimensions are shown when the coupling projection 63*b* is enlarged to the maximum within a range that can be engaged with the coupling recess 91*b*. n this case, the clearance AU between the coupling projection 63*b* and the coupling recess 91*b* approaches to the lower limit, and therefore, the allowable inclination of the drive transmission member 81 becomes small. Therefore, in order to reduce the inclination of the drive transmitting member 91, it is necessary to make the regulating portion 90*kl* closest to the regular position of the cylindrical portion 91*i*.

In the second example, the dimensions are shown when the coupling projection 63*b* is made smallest in the range that can be engaged with the coupling recess 91*b*. The gap AU between the coupling projection 63*b* and the coupling recess 91*b* approaches to the upper limit, and therefore, the coupling projection 63*b* and the coupling recess 91*b* can engage with each other even if the drive transmission member 81 is relatively largely inclined. That is, the regulating portion 73*j* can relatively significantly tolerate the inclination of the drive transmission member 91, and therefore, the restricting portion 93*j* can be relatively largely separated from the regular position of the cylindrical portion 91*i*.

In the first example, the coupling projection 63*b* is maximized to maximize the radial amount of coupling between the coupling portions. The distance AQ from the center of the coupling projection 63*b* of the drive side drum flange 63 to the apex is slightly smaller than the distance AJ (6.5 mm) from the center of the coupling recess to the apex of the triangle, which is 6.498 mm. At this time, the radius AR of the triangle inscribed circle of the coupling convexity 63*b* of the drive side drum flange 63 is 4.648 mm.

Also, the radius AP of the cylindrical portion 91*i* of the drive transmission member 91 is 7.05 mm, and therefore, the distance AS from the center of the drum 62 to the regulating portion 90*k*1 of the drum bearing is 7.051 mm which is slightly larger than the radius AP.

As a result, the gap AT between the regulating portion 90*k*1 of the drum bearing and the cylindrical portion 91*i* of the drive transmission member is 0.001 mm (=7.051−7.05). In addition, the gap AU between the coupling projection 63*b* and the coupling recess 91*b* when the phase of the coupling portion is in alignment is 0.002 mm ("6.5−6.498" or "4.65−4.648", whichever is smaller). Therefore, even if the drive transmission member 91 is inclined due to the meshing force, the gap AU between the couplings is larger than the misalignment AT between the coupling portions, and therefore, the coupling projection 63*b* and the coupling recess 91*b* can be coupled with each other. In the first example, it is preferable that the distance in the radial direction from the center of the drum 62 to the regulating portion 90*k*1 is made larger than 7.05 mm.

In the second example, the coupling projection 63*b* is minimized so that the amount of engagement between the coupling portions is minimum.

The distance AQ from the center to the apex of the coupling projection 63*b* provided on the drive side drum flange 63 is made 4.801 mm slightly larger than the radius AN of the lightening portion 91*b*3 of the coupling recess larger than 4.8 mm. At this time, the radius AR of the inscribed circle inscribed in the triangle shape of the coupling projection is 2.951 mm.

The distance AS of the regulating portion 90*k*1 of the drum bearing from the center of the drum 62 is 8.749 mm. By this, the gap AT between the regulating portion 90*k*1 of the drum bearing 90 and the gear portion 91*a* of the drive transmission member 91 is 1.698 mm (=8.748−7.05). In addition, the gap AU between the coupling projection 63*b* and the coupling recess 91*b* when the phase of the coupling portion is in alignment is 1.699 mm ("6.5−4.801" and "4.65−2.951", whichever is smaller). Accordingly, even if the drive transmitting member 91 is inclined due to the meshing force, the gap AU between the couplings is larger than the misalignment AT between the coupling portions, and therefore, the coupling portions can engage with each other.

From the second example, it is understood that the radial distance from the center of the drum 62 to the regulating portion 90*k*1 of the drum bearing is preferably less than 8.75 mm.

In other words, it is preferable that the distance in the radial direction from the center of the drum 62 to the regulating portion 90*k*1 of the drum bearing is larger than 7.05 mm and smaller than 8.75 mm.

The shape of the coupling projection provided on the drum 62 is not limited to a substantially equilateral triangle, and a preferable arrangement of the regulating portion in a case of a more general shape will be considered. Here, the shape of the coupling recess is assumed to the equilateral triangle for convenience. Here, the coupling projection 363*b* (FIGS. 27 and 28) described above is used as a coupling projection having a general shape.

First, the upper limit of the distance from the drum axis to the regulating portion 90*k*1 is considered using the regulating portion 90*k*1 and the drive transmission member 191 shown in FIG. 31.

The position of the restricting portion 90*k*1 depends on the radius of the cylindrical portion 191*i* of the drive transmission member 191. That is, as the radius of the cylindrical portion 191*i* increases, it is necessary to move the regulating portion 90*k*1 away from the axis of the drum. First, as shown in FIG. 31, it is assumed that the diameter of the cylindrical portion 191*i* of the drive transmission member 191 is larger than the diameter of the gear portion (output gear portion) 191*a* of the drive transmission member 191. At this time, the cylindrical portion 191*i* is disposed so as to be sandwiched between the roller portion 132*a* of the developing roller 132 and the developing roller gear 30, and the cylindrical portion 191*i* faces the shaft portion 132*b* of the developing roller 132.

The distance from the center (axis) of the drum 62 to the regulating portion 90*k*1 is a distance BG (distance measured in the direction perpendicular to the axis of the drum). The distance from the center of the drum 62 to the axis of the developing roller is taken as the distance BK (the distance taken in the direction perpendicular to the axis of the drum).

Here, it is preferable that the cylindrical portion 191*i* does not interfere with the shaft portion 32*b* of the developing roller when the drive transmitting member 191 is inclined such that the cylindrical portion 191*i* comes into contact with the regulating portion 90*k*1. That is, it is desired to restrict the movement of the cylindrical portion 191*i* by the restricting portion 90*k*1 so that at least the cylindrical portion 191*i* does not incline beyond the axis of the developing roller. Therefore, it is preferable that the distance BG from the drum center to the regulating portion 90*k*1 is shorter than the distance BK from the drum center to the axis of the developing roller 132.

$$BG<BK$$

Next, referring to FIG. 31, the lower limit of the distance from the drum center to the regulating portion 90*k*1 will be considered. The smallest equilateral triangle BO circumscribing the coupling projection 363*b* (FIG. 28) is taken as a hypothetical coupling projection. The center of gravity of the equilateral triangle BO is set to be on the center of the coupling projection 363*b*.

A circle inscribed in the imaginary coupling projection (regular triangle BO) is a circle BP, and radius thereof is the radius BH. Here, in order for the hypothetical coupling projection BO to engage with the coupling recess portion provided in the cylindrical portion 191*i*, the cylindrical portion 191*i* of the drive transmission member needs to be larger than this inscribed circle BP. This is because if the cylindrical portion 191*i* is smaller than the inscribed circle BP of the hypothetical coupling projection BO, a output coupling portion for transmitting the drive to the hypothetical coupling projection BO cannot be formed in the cylindrical portion 191*i*.

The distance BG from the drum center to the regulating portion 90*k*1 is larger than the radius of the cylindrical portion 191*i*, and therefore, the distance BG is larger than the radius BH of the inscribed surface BP.

Therefore, the distance BG from the drum center of the regulating portion 90*k*1 satisfies, $$BH<BG$$

That is, the preferable range of the regulating portion 90*k*1 is as follows.

$$BH < BG < BK$$

Next, a further preferable range of the regulating portion 90*k*1 will be described below by using the drive transmission member 291 shown in FIG. 32.

Figure 32:
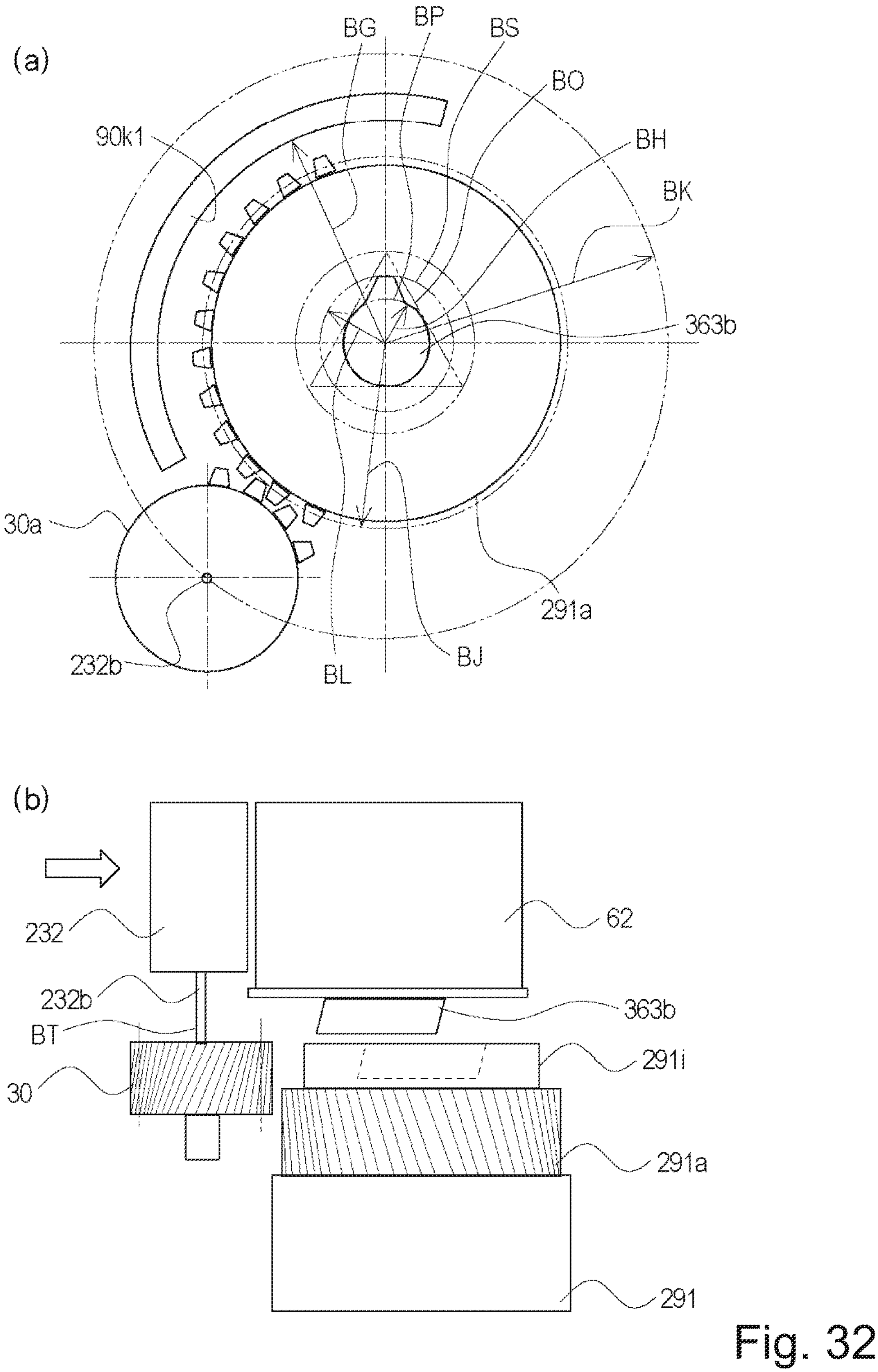
FIG. 32 is an illustration of the regulating portion of the electrophotographic image forming apparatus according to Embodiment 2.

In FIG. 32, the cylindrical portion 291*i* of the drive transmission member 291 is smaller in diameter than the gear portion 291*a* and disposed so as to face the developing roller gear 30. If the diameter of the cylindrical portion 191*i* is enlarged as shown in FIG. 31, the cylindrical portion 191*i* cannot be disposed in the front of the developing roller gear 30, and the cylindrical portion 191*i* needs to be disposed to face the shaft portion of the developing roller. In such a case, it is necessary to increase the length of the shaft portion of the developing roller, or to increase the length of the drive transmission member. On the contrary, if the cylindrical portion 291*i* of the drive transmission member is disposed on the front side of the developing roller gear 30 as shown in FIG. 32, there is no need to increase the lengths of the shaft portion 232*b* of the developing roller 232 and the drive transmission member 291, and therefore, it is possible to downsize cartridges and image forming apparatuses.

First, referring to FIG. 32, the upper limit of the distance from the drum center to the regulating portion 90*k*1 will be considered.

The distance from the center of the drum 162 to the regulating portion 90*k*1 is a distance BG (the distance as measured in a direction perpendicular to the axis of the drum). The shortest distance from the center of the drum 162 to the tooth tip of the gear portion of the developing roller gear 30 is a distance BJ (the distance as measured in a direction perpendicular to the axis of the drum). In order to prevent the cylindrical portion 291*i* from interfering with the gear 30 of the developing roller when the regulating portion 90*k*1 contacts to the cylindrical portion 291*i*, it is preferable that the distance BG from the drum center to the regulating portion 90*k*1 is made shorter than the distance BJ from the drum center to the tooth tip of the developing roller gear.

Therefore, $BG>BJ$

Next, the lower limit of the distance from the drum center to the regulating portion 90*k*1 will be considered. The minimum circle circumscribing the coupling projection 163*a* is BS, and its radius is the radius BL. Here, the circle BS is provided concentrically (coaxially) with the drum 162.

Here, if the cylindrical portion 291*i* of the drive transmission member 291 is larger than the circle BS, a coupling recess that surrounds the entire circumference of the coupling projection 163*a* can be formed in the cylindrical portion 291*i*.

By this, the strength of the output coupling portion (coupling recess) can be enhanced, and the engagement between the couplings can be stabilized.

When the radius of the cylindrical portion 291*i* is larger than the radius BL of the circle BS, the distance BG from the drum center to the regulating portion 90*k*1 is also larger than the radius BL, and therefore, $BG<BL$ That is, the range of the regulating portion 90*j* is as follows.

$$BJ < BG < BL$$

Together with this "BJ<BG<BL" and the aforementioned "BH<BG<BK", the preferable range regarding the regulating portion can be defined as follows:

$$BH < BJ < BG < BL < BK$$

The definition of each value is summarized as follows:

BH: the radius of the inscribed circle inscribed in the equilateral triangle, when drawing the minimum equilateral triangle circumscribing the coupling projection (input coupling portion) while aligning the center of gravity of the equilateral triangle with the axis of the drum (the axis of the coupling projection).

BJ: The shortest distance from the axis of the drum to the tooth tip of the gear portion (input gear portion) 30*a* as measured along the direction perpendicular to the axis of the drum.

BG: the distance from the center of the drum to the regulating portion as measured along the direction perpendicular to the axis of the drum.

BL: the radius of the circumcircle, when the minimum circumscribed circle circumscribing the coupling projection (input coupling portion) is drawn coaxially with the drum.

BK: the distance from the axis of the drum to the axis of the developing roller gear (axis of the developing roller), as measured along a direction perpendicular to the axis of the drum.

The function, material, shape and relative arrangement of the components described in the embodiments or the modifications thereof are not intended to limit the scope of the present invention only to those unless otherwise specified.

INDUSTRIAL APPLICABILITY

An image forming process cartridge including a structure for receiving input of a driving force from the outside is provided.

REFERENCE NUMERALS

30: Developing roller gear
30*a*: Gear portion
32: Developing roller (developer carrying member)
62: Drum (electrophotographic photosensitive drum)
62*a*: Drum center
63: Drive side drum flange (driven transmission member)
63*b*: Coupling projection

What is claimed is:

1. A process cartridge comprising:

a frame including a side surface at a side of the process cartridge;

a photosensitive drum supported by the frame, the photosensitive drum being rotatable about an axis thereof, the photosensitive drum including (i) a first end positioned at the side of the process cartridge and (ii) a second end opposite to the first end in an axial direction of the photosensitive drum;

a projection positioned (i) coaxial with the photosensitive drum and (ii) at the side of the process cartridge, the projection projecting from the side surface of the frame in the axial direction of the photosensitive drum with at least a tip of the projection being exposed to outside of the process cartridge;

a developing roller supported by the frame, the developing roller being rotatable about an axis thereof; and a gear positioned at the side of the process cartridge, the gear being rotatable about an axis thereof, the gear having a plurality of teeth, with at least some of the teeth being exposed teeth that are uncovered by the frame and exposed to outside of the process cartridge, and with a tip of at least one of the exposed teeth facing the axis of the photosensitive drum, wherein, as measured in the axial direction of the photosensitive drum, (i) the tip of the projection is positioned farther from the second end of the photosensitive drum than the first end of the photosensitive drum is positioned from the second end of the photosensitive drum, and (ii) at least a part of the exposed teeth of the gear is positioned farther from the second end of the photosensitive drum than the tip of the projection is positioned from the second end of the photosensitive drum, and wherein, as measured along a line perpendicular to the axis of the photosensitive drum, a shortest distance from the axis of the photosensitive drum to a tip of one of the plurality of teeth is 90% to 110% of a length of a radius of the photosensitive drum.

2. A process cartridge according to claim 1, wherein the gear is a spur gear.

3. A process cartridge according to claim 2, wherein the teeth of the spur gear are 1 mm or less in length along an axial direction of the spur gear.

4. A process cartridge according to claim 1, wherein the teeth of the gear are 1 mm or less in length along an axial direction of the gear.

5. A process cartridge according to claim 1, further comprising a stopper positioned at the side of the process cartridge, the stopper having a surface extending in the axial direction of the photosensitive drum and facing the axis of the photosensitive drum.

6. A process cartridge according to claim 1, wherein the frame includes a slit at the side of the process cartridge, with the slit being open to outside of the frame (i) in a first direction that is perpendicular to the axis of the photosensitive drum and (ii) in a second direction that is perpendicular to the first direction, and wherein, when the process cartridge is oriented such that the axis of the photosensitive drum is positioned above the axis of the gear, the slit is open towards a top side of the process cartridge.

7. A process cartridge according to claim 6, wherein at least one of the exposed teeth faces the slit.

8. A process cartridge according to claim 6, wherein, as measured in the axial direction of the photosensitive drum, at least a part of the slit is positioned farther from the second end of the photosensitive drum than the tip of the projection is positioned from the second end of the photosensitive drum.

9. A process cartridge according to claim 6, wherein the slit runs perpendicular to the axial direction of the photosensitive drum.

10. A process cartridge according to claim 1, wherein the gear is a helical gear.

11. A process cartridge according to claim 10, wherein the gear is operatively connected to the developing roller.

12. A process cartridge according to claim 10, wherein the gear is positioned coaxial with the developing roller.

13. A process cartridge according to claim 1, wherein the gear is operatively connected to the developing roller.

14. A process cartridge according to claim 1, wherein the gear is positioned coaxial with the developing roller.

15. A process cartridge according to claim 1, wherein the frame includes:

a first frame supporting the photosensitive drum; and a second frame supporting the developing roller.

16. A process cartridge according to claim 1, wherein the photosensitive drum and the developing roller are operatively connected to each other.

17. A process cartridge according to claim 1, wherein the frame includes:

a first frame supporting the photosensitive drum; and a second frame supporting the developing roller, and wherein the photosensitive drum and the developing roller are operatively connected to each other.

* * * * *